(12) United States Patent
Petersen et al.

(10) Patent No.: US 10,122,575 B2
(45) Date of Patent: *Nov. 6, 2018

(54) LOG COLLECTION, STRUCTURING AND PROCESSING

(71) Applicant: LogRhythm, Inc., Boulder, CO (US)

(72) Inventors: Chris Petersen, Boulder, CO (US); Phillip Villella, Boulder, CO (US)

(73) Assignee: LogRhythm Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/179,342

(22) Filed: Jun. 10, 2016

(65) Prior Publication Data
US 2016/0301561 A1    Oct. 13, 2016

Related U.S. Application Data

(63) Continuation of application No. 13/175,674, filed on Jul. 1, 2011, now Pat. No. 9,384,112.
(Continued)

(51) Int. Cl.
*H04L 12/24*      (2006.01)
*H04L 29/08*      (2006.01)
(Continued)

(52) U.S. Cl.
CPC ........ *H04L 41/069* (2013.01); *G06F 11/0709* (2013.01); *G06F 11/0748* (2013.01); *G06F 11/0751* (2013.01); *G06F 11/3006* (2013.01); *G06F 11/3089* (2013.01); *G06F 11/327* (2013.01); *G06F 11/3476* (2013.01); *G06F 11/3495* (2013.01); *G06F 21/552* (2013.01); *H04L 41/0604* (2013.01); *H04L 41/0681* (2013.01); *H04L 41/22* (2013.01);
(Continued)

(58) Field of Classification Search
None
See application file for complete search history.

(56) References Cited

U.S. PATENT DOCUMENTS 5,032,979 A    7/1991  Hecht et al.
5,197,116 A    3/1993  Katoh
(Continued)

OTHER PUBLICATIONS

Weiss, Gary, Lanci, Barbara, "Partner Sales Guide," 2002.*
(Continued)

*Primary Examiner* — Scott B Christensen
*Assistant Examiner* — Lam T Do
(74) *Attorney, Agent, or Firm* — Marsh Fischmann & Breyfogle LLP; Jonathon A. Szumny; Jeremy J. Neilson

(57) ABSTRACT

Tools for use in obtaining useful information from processed log messages generated by a variety of network platforms (e.g., Windows servers, Linux servers, UNIX servers, databases, workstations, etc.). The log messages may be processed by one or more processing platforms or "log managers" using any appropriate rule base to identify "events" (i.e., log messages of somewhat heightened importance), and one or more "event managers" may analyze the events to determine whether alarms should be generated therefrom. The tools may be accessed via any appropriate user interface of a console that is in communication with the various log managers, event managers, etc., to perform numerous tasks in relation to logs, events and alarms.

17 Claims, 65 Drawing Sheets

Related U.S. Application Data

(60) Provisional application No. 61/360,815, filed on Jul. 1, 2010.

(51) Int. Cl.
*H04L 12/26* (2006.01)
*G06F 11/34* (2006.01)
*G06F 11/30* (2006.01)
*H04L 29/06* (2006.01)
*G06F 11/32* (2006.01)
*G06F 11/07* (2006.01)
*G06F 21/55* (2013.01)

(52) U.S. Cl.
CPC ........ *H04L 43/028* (2013.01); *H04L 63/1425* (2013.01); *H04L 67/10* (2013.01); *G06F 2201/86* (2013.01); *G06F 2221/2129* (2013.01); *H04L 41/046* (2013.01); *H04L 43/10* (2013.01)

(56) References Cited

U.S. PATENT DOCUMENTS

| | | | |
|---|---|---|---|
| 5,857,190 A | 1/1999 | Brown | |
| 5,917,489 A | 6/1999 | Thurlow | |
| 5,924,096 A | 7/1999 | Draper et al. | |
| 5,978,475 A | 11/1999 | Schneier et al. | |
| 5,978,566 A | 11/1999 | Plank | |
| 5,987,611 A | 11/1999 | Freund | |
| 6,073,255 A | 6/2000 | Nouri et al. | |
| 6,289,379 B1 | 9/2001 | Urano | |
| 6,327,677 B1 | 12/2001 | Garg et al. | |
| 6,347,374 B1 | 2/2002 | Drake et al. | |
| 6,470,384 B1 | 10/2002 | O'Brien et al. | |
| 6,718,489 B1 | 4/2004 | Lee et al. | |
| 6,788,315 B1 | 9/2004 | Kekic | |
| 7,003,560 B1 | 2/2006 | Mullen | |
| 7,035,925 B1 | 4/2006 | Nareddy et al. | |
| 7,140,035 B1 | 11/2006 | Karch | |
| 7,143,442 B2 | 11/2006 | Scarfe | |
| 7,152,242 B2 | 12/2006 | Douglas | |
| 7,155,514 B1 | 12/2006 | Milford | |
| 7,609,625 B2 | 1/2007 | Wei | |
| 7,185,192 B1 | 2/2007 | Kahn | |
| 7,356,545 B2 | 4/2008 | Muralidharan | |
| 7,366,989 B2 | 4/2008 | Naik et al. | |
| 7,376,969 B1 | 5/2008 | Njemanze et al. | |
| 7,383,463 B2 | 6/2008 | Hayden et al. | |
| 7,461,044 B2 | 12/2008 | Slahshour et al. | |
| 7,548,848 B1 | 6/2009 | Deb et al. | |
| 7,600,160 B1 | 10/2009 | Lovy et al. | |
| 7,636,736 B1 | 12/2009 | Kumar | |
| 7,653,633 B2 | 1/2010 | Villella et al. | |
| 7,673,335 B1 | 3/2010 | Chakravarty | |
| 7,685,627 B2 | 3/2010 | Joubert et al. | |
| 7,743,029 B2 | 6/2010 | Frey et al. | |
| 7,814,142 B2 | 10/2010 | Mamou | |
| 7,818,274 B1 | 10/2010 | Ottamalika | |
| 7,873,717 B1 * | 1/2011 | Woolway | G06F 21/552 709/223 |
| 7,886,296 B2 | 2/2011 | Ly et al. | |
| 7,984,513 B1 * | 7/2011 | Kyne | G06F 21/10 706/47 |
| 8,135,610 B1 | 3/2012 | Bryce | |
| 8,156,553 B1 | 4/2012 | Church | |
| 8,484,230 B2 | 7/2013 | Harnett | |
| 8,543,694 B2 | 9/2013 | Petersen | |
| 8,661,539 B2 | 2/2014 | Hodges | |
| 8,700,414 B2 | 4/2014 | Rothermel | |
| 8,739,290 B1 | 5/2014 | Jamail | |
| 2002/0042846 A1 | 4/2002 | Bottan et al. | |
| 2002/0073167 A1 | 6/2002 | Powell et al. | |
| 2002/0093527 A1 | 7/2002 | Sherlock | |
| 2002/0120886 A1 | 8/2002 | Nguyen et al. | |
| 2002/0138582 A1 | 9/2002 | Chandra | |
| 2002/0138762 A1 | 9/2002 | Horne | |
| 2002/0165902 A1 | 11/2002 | Robb et al. | |
| 2002/0165959 A1 | 11/2002 | Urano et al. | |
| 2003/0005082 A1 | 1/2003 | Shah et al. | |
| 2003/0053420 A1 | 3/2003 | Duckett | |
| 2003/0055808 A1 | 3/2003 | Bhat | |
| 2003/0069876 A1 | 4/2003 | Richardson | |
| 2003/0084330 A1 | 5/2003 | Tarquini | |
| 2003/0120663 A1 | 6/2003 | Vining et al. | |
| 2003/0126137 A1 | 7/2003 | McFadden | |
| 2003/0212789 A1 | 11/2003 | Hamel et al. | |
| 2003/0212899 A1 | 11/2003 | Curtis | |
| 2003/0235190 A1 | 12/2003 | Josyula et al. | |
| 2004/0028059 A1 | 2/2004 | Josyula et al. | |
| 2004/0039809 A1 | 2/2004 | Ranous et al. | |
| 2004/0039827 A1 | 2/2004 | Thomas et al. | |
| 2004/0049693 A1 | 3/2004 | Douglas | |
| 2004/0059808 A1 | 3/2004 | Galloway | |
| 2004/0088423 A1 | 5/2004 | Miller | |
| 2004/0111621 A1 | 6/2004 | Himberger | |
| 2004/0128586 A1 | 7/2004 | Bahr et al. | |
| 2004/0153407 A1 | 8/2004 | Clubb et al. | |
| 2004/0153509 A1 | 8/2004 | Alcorn et al. | |
| 2004/0186829 A1 | 9/2004 | Suzuki | |
| 2004/0194114 A1 | 9/2004 | Spiegel | |
| 2004/0254919 A1 | 12/2004 | Giuseppini | |
| 2005/0021701 A1 | 1/2005 | Seki et al. | |
| 2005/0038888 A1 | 2/2005 | Labertz | |
| 2005/0049924 A1 | 3/2005 | DeBettencourt et al. | |
| 2005/0114321 A1 | 5/2005 | DeStefano et al. | |
| 2005/0114508 A1 | 5/2005 | DeStefano | |
| 2005/0114708 A1 | 5/2005 | DeStefano et al. | |
| 2005/0125685 A1 | 6/2005 | Samuelsson | |
| 2005/0192921 A1 | 9/2005 | Chaudhuri | |
| 2005/0193429 A1 | 9/2005 | Demopoulos | |
| 2005/0198111 A1 | 9/2005 | Lamb et al. | |
| 2005/0246522 A1 | 11/2005 | Samuelsson | |
| 2006/0037075 A1 | 2/2006 | Frattura et al. | |
| 2006/0112175 A1 | 5/2006 | Sellers et al. | |
| 2006/0161816 A1 | 7/2006 | Gula et al. | |
| 2006/0184529 A1 | 8/2006 | Berg et al. | |
| 2006/0195297 A1 | 8/2006 | Kubota | |
| 2007/0050777 A1 | 3/2007 | Hutchinson et al. | |
| 2007/0214503 A1 * | 9/2007 | Shulman | G06F 11/2257 726/22 |
| 2007/0226352 A1 * | 9/2007 | Nishio | H04L 67/16 709/227 |
| 2007/0239769 A1 | 10/2007 | Fazal | |
| 2007/0261112 A1 | 11/2007 | Todd | |
| 2007/0283194 A1 | 12/2007 | Villella et al. | |
| 2008/0040191 A1 * | 2/2008 | Chakravarty | G06Q 10/06 705/7.15 |
| 2008/0082650 A1 | 4/2008 | Takata et al. | |
| 2008/0195636 A1 | 8/2008 | Chand | |
| 2008/0195750 A1 | 8/2008 | Sadovsky | |
| 2008/0256250 A1 | 10/2008 | Wakefield | |
| 2008/0301175 A1 | 12/2008 | Applebaum | |
| 2009/0119307 A1 | 5/2009 | Braun et al. | |
| 2009/0119346 A1 * | 5/2009 | Lu | G06F 17/30578 |
| 2009/0265288 A1 | 10/2009 | Chakravarty | |
| 2009/0328222 A1 | 12/2009 | Helman | |
| 2010/0011031 A1 | 1/2010 | Huang et al. | |
| 2010/0211554 A1 | 8/2010 | Reid | |
| 2010/0235494 A1 | 9/2010 | Sood et al. | |
| 2010/0325685 A1 * | 12/2010 | Sanbower | G06F 21/554 726/1 |
| 2011/0119279 A1 | 5/2011 | Wacker | |
| 2011/0119374 A1 | 5/2011 | Ruhl | |
| 2012/0059899 A1 * | 3/2012 | Kashi | H04L 63/105 709/212 |

OTHER PUBLICATIONS

Microsoft, "Understanding How Transport Rules Are Applied," Jan. 1, 2010, https://technet.microsoft.com/en-us/library/bb124703(v=exchg.141).aspx.*

(56) References Cited

OTHER PUBLICATIONS

Tony Bhe, Peter Glasmacher, Jacqueline Meckwood, Guiherme Pereira, and Michael Wallace, "Event Management and Best Practices" Jun. 16, 2004.

Axel Buecker, Ana Veronica Carreno, Norman Field, Christopher Hockings, Daniel Kawer, Sujit Moharity, and Guilherme Monterio, "Enterprise Security Architecture Using IBM Tivoli Security Solutions" Aug. 7, 2007.

Octavian Lascu, Rajeev Palanki, Sorin Todorescu, and Tirapat Uaarak, "Accounting and Auditing on AIX 5L" Dec. 22, 2004.

Foresti, Stefano, et al. "Visual correlation of network alerts." Computer Graphics and Applications, IEEE 26.2 (2006): 48-59. 2006.

Case, Andrew, et al. "FACE: Automated digital evidence discovery and correlation." digital investigation 5 (2008): S65- S75. 2008.

Hemmes, Jeffrey, and Douglas Thain. "Cacheable decentralized groups for grid resource access control." Grid Computing, 7th IEEE/ACM International Conference on. IEEE, 2006 2006.

GFI, "Part 2: Creating new event processing rules;" http://support.gfi.com/manuals/en/esm7manual-I-114.html Nov. 9, 2007.

Zhou, Tao, "Directory Integration and the Metadirectory;" http://windowsitpro.com/activedirectory/directoryintegrationandmetadirectory Jun. 30, 1999.

Simache et al. "Event Log based dependaility analysis of Windows NT and 2k systems." LASS-CNRS. Proceedings of the 2002 Pacific Rim International Symposium on Dependable Computing (PRDC 02). 2002—IEEE. pp. 1-5. 2002.

Bannon et al. "InnoDB Concrete Architecture" Swen.uwaterloo.ca. (pp. 1-16). Feb. 19, 2002.

Fiebig et al. "Anatomy of a nature XML base management system" The VLDB Journal (2002) vol. 11, Issue 4, Dec. 2002, (pp. 292-314). Dec. 2002.

Gao et al. "Learning Knowledge bases for information extraction from multiple text based Websites." Intelligent Agent Technology, 2003 IAT 2003. IEEE/WIC International Conference on Oct. 13-16, 2003. pp. 119-125. Oct. 2003.

* cited by examiner

META-DATA REPORTING FIELDS
THE FOLLOWING FIELDS ARE POPULATED FOR LOG MESSAGES MATCHING A RULE.

| FIELD | OPTIONAL | DESCRIPTION | LOG MANAGER | EVENT MANAGER |
|---|---|---|---|---|
| MsgClassID (INTEGER) | NO | A FOREIGN KEY REFERENCE TO THE LOG'S CLASSIFICATION. | YES | YES |
| CommonEventID (INTEGER) | NO | A FOREIGN KEY REFERENCE TO THE LOG'S COMMON EVENT RECORD. | YES | YES |
| MPERuleID (INTEGER) | NO | A FOREIGN KEY REFERENCE TO THE MPE RULE THAT MATCHED THE LOG MESSAGE. | YES | YES |
| PRIORITY (INTEGER) | NO | THE RISK-BASED PRIORITY CALCULATED FOR THE LOG/EVENT. | YES | YES |
| DIRECTION (INTEGER) | NO | THE DIRECTION OF THE LOG/EVENT. | YES | YES |
| SHostID (INTEGER) | YES | A FOREIGN KEY REFERENCE TO THE LOG/EVENT SOURCE HOST RECORD (IF DETERMINED). | YES | YES |
| DHostID (INTEGER) | YES | A FOREIGN KEY REFERENCE TO THE LOG/EVENT SOURCE HOST RECORD (IF DETERMINED). | YES | YES |
| ServiceID (INTEGER) | YES | A FOREIGN KEY REFERENCE TO THE LOG APPLICABLE SERVICE/PROGRAM (IF DETERMINED). | YES | YES |

FIG.4

PARSED REPORTING FIELDS.

THE FOLLOWING REPORT FIELDS CONTAIN DATA PARSED FROM THE LOG MESSAGE. THESE FIELDS ARE POPULATED BASED ON THE MPE RULE AND THE DATA AVAILABLE IN THE LOG MESSAGE. ALL OF THESE FIELDS ARE OPTIONAL.

| FIELD | OPTIONAL | DESCRIPTION | LOG MANAGER | EVENT MANAGER |
|---|---|---|---|---|
| SIP (INTEGER) | YES | SOURCE IP ADDRESS REPRESENTED AS AN 8 BYTE INTEGER. | YES | YES |
| DIP (INTEGER) | YES | DESTINATION IP ADDRESS REPRESENTED AS AN 8 BYTE INTEGER. | YES | YES |
| SPort (INTEGER) | YES | SOURCE TCP/UDP PORT NUMBER. | YES | YES |
| DPort (INTEGER) | YES | DESTINATION TCP/UDP PORT NUMBER. | YES | YES |
| ProtocolID (INTEGER) | YES | THE PROTOCOL ASSOCIATED WITH THE LOG AS DETERMINED BY PARSING EITHER THE PROTOCOL NAME OR IANA NUMBER. | YES | YES |
| LOGIN (CHAR 50) | YES | THE VALUE PARSED FOR LOGIN. | YES | YES |
| SName (CHAR 100) | YES | VALUE PARSED FOR SOURCE HOST NAME. | YES | YES |
| DName (CHAR 100) | YES | VALUE PARSED FOR DESTINATION HOST NAME. | YES | YES |
| PERSON (CHAR 50) | YES | VALUE PARSED PERSON FIELD (E.G., JOE BLOW, JANE DOE). | NO | YES |
| ACTION (CHAR 50) | YES | VALUE PARSED FOR ACTION (E.G., LOGIN, LOGOUT, REBOOT) | NO | YES |
| RESULT (CHAR 50) | YES | VALUE PARSED FOR RESULT (E.G., SUCCESS, FAILURE, ERROR) | NO | YES |
| PROGRAM (CHAR 50) | YES | VALUE PARSED FOR PROGRAM (E.G., PROGRAM NAME, PID) | NO | YES |
| OBJECT (CHAR 255) | YES | VALUE PARSED FOR OBJECT (E.G., C:\WINNT\CMD.EXE) | NO | YES |
| UserField1 (CHAR 50) | YES | VALUE PARSED FOR STORAGE IN USER FIELD 1 | NO | YES |
| UserField2 (CHAR 50) | YES | VALUE PARSED FOR STORAGE IN USER FIELD 2 | NO | YES |
| UserField3 (CHAR 50) | YES | VALUE PARSED FOR STORAGE IN USER FIELD 3 | NO | YES |

FIG.5

| FIELD | OPTIONAL | DESCRIPTION | LOG MANAGER | EVENT MANAGER |
|---|---|---|---|---|
| UserField4 (CHAR 255) | YES | VALUE PARSED FOR STORAGE IN USER FIELD 4 | NO | YES |
| UserField5 (CHAR 255) | YES | VALUE PARSED FOR STORAGE IN USER FIELD 5 | NO | YES |

Sub-Rule Properties (Read Only)

Rule Name
pix-3-106010: Denied Inbound TCP Connection

FullName
pix-3-106010: Denied Inbound TCP Connection

Common Event
Denied Inbound TCP Connection

Rule Status
○ Production    ⊙ Test    ○ Development

Default Event Settings
☑ Transform and forward as event
False Alarm Rating
0 - No Rating
1 - Low-Low
2 - Low-Medium
3 - Low-High
4 - Medium-Low

| Mapping Tags | Technology Associations | Description |

Mapping Tag 1:
106010

Mapping Tag 2:
tcp

Mapping Tag 3:

Mapping Tag 4:

Mapping Tag 5:

— 190

Sub-Rule Processing Settings

Default time-to-live (TTL)  [ 7 ]    ☑ Archive log messages by default

Source/Destination Context:         Tags Normal - Destination determined by destination tags (e.g., <dip>, source by source (e.g., <sip>) ▼
Source/Client is Determined by:     Tags - Values parsed from source tags (<sip> or <sname>) ▼
Destination/Server is determined by: Tags - Values parsed from destination tags (<dip> or <dname>) ▼
Program/Service is determined by:   Tags Normal - Service determined by value parsed from destination port (<dport>) and protocol tag (<  ▼
Direct Assignment:                  [...]

[ OK ]    [ Cancel ]

FIG.19

| Alarm List | | | | |
|---|---|---|---|---|
| Alarm Date ▽ | Alarm Rule Name | | Events | Priority |
| 11/11 10:39 AM | Suspicious Host(quick) | | 3 | 8.00 |
| 11/11 10:38 AM | Suspicious Host(quick) | | 3 | 8.00 |
| 11/11 10:36 AM | Multiple Authentication Failures(quick) | | 4 | 8.00 |
| 11/11 10:25 AM | Suspicious Host(quick) | | 4 | 8.00 |
| 11/11 10:23 AM | LogRhythm Component Error | | 15 | 32.00 |
| 11/11 10:20 AM | Off-Hour Authentication Activity | | 4 | 6.00 |
| 11/11 10:18 AM | Production Windows Server Error | | 2 | 32.00 |
| 11/11 09:52 AM | LogRhythm Component Error | | 30 | 32.00 |
| 11/11 09:52 AM | Suspicious Host(quick) | | 82 | 28.00 |
| 11/11 09:48 AM | Production Windows Server Error | | 3 | 32.00 |
| 11/11 09:38 AM | Production Windows Server Error | | 1 | 32.00 |
| 11/11 09:34 AM | Suspicious Host(quick) | | 3 | 8.00 |
| 11/11 09:31 AM | Suspicious Host(quick) | | 4 | 8.00 |
| 11/11 09:24 AM | Multiple System Errors | | 76 | 32.00 |
| 11/11 09:21 AM | LogRhythm Component Error | | 30 | 32.00 |
| 11/11 09:20 AM | Suspicious Host(quick) | | 8 | 8.00 |
| 11/11 09:10 AM | Off-Hour Authentication Activity | | 8 | 6.00 |
| 11/11 08:52 AM | Multiple System Errors | | 9 | 32.00 |
| 11/11 08:52 AM | Production Windows Server Error | | 3 | 32.00 |
| 11/11 08:51 AM | LogRhythm Component Error | | 29 | 32.00 |
| 11/11 08:51 AM | Suspicious Host(quick) | | 72 | 28.00 |

| Alarm Properties | |
|---|---|
| Property | Value |
| Alarm Date | 11/11/06 10:39:03 |
| Alarm Name | Suspicious Host (quick) |
| Alarm Description | |
| Common Events | Dropped Packet |
| Originating Systems | ns1.telemar-ba.net.br (200.223.0.135) |
| Impacted Systems | SonicwallCentral |
| Impacted Applications | |
| Logins | |

LOG COLLECTION, STRUCTURING AND PROCESSING

CROSS REFERENCE TO RELATED APPLICATIONS

This application is a continuation of U.S. patent application Ser. No. 13/175,674, entitled "LOG COLLECTION, STRUCTURING AND PROCESSING," and filed on Jul. 1, 2011, which claims the benefit of U.S. Provisional Application No. 61/360,815, entitled "SYSTEM FOR LOG COLLECTION, STRUCTURING AND PROCESSING," filed on Jul. 1, 2010, the entire contents of which are hereby incorporated within by reference.

FIELD OF THE INVENTION

The present invention relates in general to network monitoring and information management that allows for event detection and analysis based on the processing and organization of log messages, and more particularly to tools and features (e.g., that are accessible via any appropriate user interface) for obtaining useful information from processed log messages.

BACKGROUND

Modern business operations typically require many communication devices and technologies that include routers, firewalls, switches, file servers, business applications (e.g., ERP, CRM, manufacturing), etc. operating in physical, virtual, or "cloud" environments. Generally, such devices and technologies report their health and status by writing log files. For example, computer processors are responsible for processing vast amounts of data for a variety of applications. To determine how a certain application may be processed by a computer processor, engineers typically design the application with a log file that records various functional and auditing outputs within the application. That is, certain functions within the application may output data to the log file so that the engineers may diagnose problems (e.g., software bugs) and/or observe general operational characteristics of the application.

By observing the general operational characteristics of an application, certain valuable information may also be ascertained. For example, log files generated by a file server may record logins. In this regard, certain logins may be unauthorized and their prevention desired. However, with the multitude of devices, hosts and their corresponding applications available, a bewildering array of log data may be generated across the IT environment or network. Additionally, networks are often augmented and upgraded with additional systems that provide even more logs. Adding to the complexity of the situation, devices and applications of these networks vary in so many ways and so do their corresponding log file formats. Attempting to comprehensively review log files across so many technologies has generally been impractical.

SUMMARY OF THE INVENTION

The present invention generally relates to text and log message processing in data systems and, in particular, to tools and other features that may be used (e.g., in conjunction with a console or user interface) to extract and/or obtain useful information from processed log messages, automatically distribute log messages to one or more receiving entities, globally configure data management settings, and the like. Log messages may be generated by a variety of network platforms including, for instance, Windows servers, Linux servers, UNIX servers, routers, switches, firewalls, intrusion detection systems, databases, commercial applications (e.g., ERP, CRM), and homegrown applications. The log data can be collected using standard network logging and messaging protocols, such as, for instance, Syslog, SNMP, SMTP and other proprietary and non-proprietary protocols. Moreover, the log file may be text based, a proprietary format, a binary format, etc. In addition, the logs may be written to databases such as Oracle, Sybase, MySQL, etc. As a result, a data system may generate a large number of logs in different formats, and it may be desired to monitor or analyze these logs for a variety of purposes. Fields of information within such log messages can be identified and the messages can be selectively processed in accordance with rules based on those fields. In this manner, enhanced processing of textual messages including log messages may be achieved along with improved audit and compliance analysis, application monitoring, security monitoring, and operations analysis. Moreover, large networks may be supported and growing networks may be adapted to.

In accordance with one aspect, a utility (e.g., method, apparatus and/or system) is provided for distributing logs from one or more platforms of a data system to one or more receiving entities (such as but not limited to internal users of the data system, third-party applications, and service providers) on the data system. The utility involves: establishing, on a processing platform (e.g., a "Log Manager"), at least one log processing rule for selectively processing logs associated with one or more monitored platforms. For instance, the at least one log processing rule may be stored or otherwise associated with a storage module (e.g., memory, hard drive). The utility also includes receiving, at the processing platform (e.g., via any appropriate receiving module or interface), logs associated with the one or more monitored platforms; processing, at the processing platform (e.g., via a processor), the received logs using the at least one log processing rule; identifying, from the processing step, a first subset of the received logs based on one or more metadata fields of the received logs and a classification of the received logs; and distributing, from the processing platform (e.g., via the processor), information related to the first subset to a receiving entity (e.g., via utilizing user datagram protocol ("UDP") or transmission control protocol ("TCP") based Syslog).

In one embodiment, the receiving entity may be appropriately selected, for instance, by checking one or more boxes on a user interface. For example, properties (e.g., remote host IP, network protocol) associated with the receiving entities may also be configured on such a user interface. In another embodiment, the utility may further include selecting at least one policy (including the at least one processing rule) for use in identifying the first subset. For instance, a user may be directed to a screen or pop-up window on the console whereby the user can choose one of a number of policies to assign to one of the receiving entities.

As another example, the at least one policy may include additional log processing rules such as a second log processing rule for use in identifying a second subset of logs. In this case, the method may include processing, at the processing platform, the received logs using said second log processing rule; identifying, from the second log processing rule processing step, a second subset of the received logs based on one or more metadata fields of the received logs and a classification of the received logs; and distributing, from the processing platform to the receiving entity, information related to the second subset.

In one arrangement, the various log processing rules may essentially carry out various include and exclude filters which allow a user to customize a particular policy. Additionally, the information related to the first subset may include at least one of original text of the received logs, at least one event designated from the received logs, and at least one alarm related to the received logs.

In accordance with another aspect, a utility is provided for use in monitoring one or more platforms of a data system. The utility includes: establishing, on a processing platform, a number of log processing rules for selectively processing logs associated with one or more monitored platforms; establishing, on the processing platform, an override setting in relation to at least one data management setting for logs that match at least one of the log processing rules, the at least one data management setting specifying whether or not an action is to be taken in relation to the logs matching the least one log processing rule; receiving, at the processing platform, logs from the one or more monitored platforms; operating the processing platform to identify received logs that match the at least one log processing rule; and processing, at the processing platform, the matching received logs according to the override setting. This utility advantageously allows data management settings (e.g., which logs are to be archived) to be applied across all processing platforms (e.g., log managers, log sources) to logs that meet specific criteria (e.g., it allows for fine-grained data management on a log-by-log basis). Also, users may be provided a manageable manner of determining how logs will be processed around the data system regardless of various disparate settings used by various log sources and/or log processing policies.

In one arrangement, the at least one data management setting includes one of taking and not taking the action, and the override setting includes the other of taking and not taking the action. For instance, actions may include but are not limited to at least one of archiving the logs, indexing the logs, online storing of the logs, aggregation of the logs, forwarding of events identified from the logs, forwarding the logs to a data warehouse, false alarm rating of alarms designated from events, and combinations thereof. The data management setting(s) may be created either before or after the override setting(s) is or are established or specified.

In another arrangement, the received logs that match the at least one log processing rule may be selected based on a classification of the received logs, such as but not limited to auditing, operations, and security. Additionally or alternatively, the received logs that match the at least one log processing rule may be selected based on content of one or more metadata fields of the received logs. For instance, the method may include, before the operating step, processing the received logs to enrich the logs with the one or more metadata fields (which metadata fields may be used in the operating step). In a further arrangement, the method may include establishing an expiration period after which received logs are no longer processed according to the override setting and are thereafter processed according to the at least one data management setting. This may allow an administrator or other user to temporarily enact a "global log processing rule" without having to remember to "turn off" the rule at some point in the future.

In accordance with another aspect, a utility is provided for use in monitoring one or more platforms of a data system. The utility includes: identifying a set of circumstances with respect to at least one type of storage device (e.g., hard drive, flash drive, and an optical disc) usable with the data system; establishing, using a processing platform of said data system, at least one log processing rule to identify logs of the one or more monitored platforms matching the set of circumstances; receiving, at the processing platform, logs from one or more monitored platforms; operating the processing platform to identify received logs that match the set of circumstances; and taking at least one action with respect to the at least one type of storage device in response to the operating step.

For instance, the set of circumstances may include at least one of a) any movement of data to or from the at least one type of storage device, b) one or more particular users (e.g., disgruntled or former employees, lower level employees, competitors) of the data system that are moving data within the data system (e.g., onto or from the at least one type of storage device), and c) one or more particular types of data (e.g., trade secrets) being moved within the data system such as onto or from the at least one type of storage device.

Numerous actions may be taken in response to the operating step. In one embodiment, the at least one action may include simply generating a log message indicative of the occurrence of the set of circumstances (e.g., where the set of circumstances includes any movement of data to or from the at least one type of storage device). In another embodiment, the action may includes sending, from the processing platform to a device (e.g., server) associated with the data system that is operable to write data to the storage device, a request to limit data from being written to the at least one storage device. In one variation, this may include a request to eject the at least one storage device from the data system. The sending step may occur before the set of circumstances is completed (e.g., before a user has completed the download of data onto a storage device). In another embodiment, the action may include sending, from the processing platform, an alert to at least one receiving entity (e.g. administrator, troubleshooter). In a further embodiment, any logs generated due to the set of circumstances occurring may be flagged as events and/or alarms.

In accordance with another aspect, a utility is provided for use in monitoring one or more platforms of a data system. The utility includes synchronizing a database of the data system with information (e.g., logins, logoffs, logon session duration, total number of logins, initial password creation date, most recent password change date, most recent incorrect password entry date, and combinations thereof) from at least one directory service of the data system; first operating a processing platform to establish at least one correlation filter based on one or more data fields of the synchronized database; and second operating the processing platform to correlate logs previously received and processed by the processing platform using the at least one correlation filter.

In one arrangement, the at least one correlation filter may include at least one of a user name and group name, and the second operating step may entail identifying logs previously received and processed by the processing platform including the at least one user name or group name. In a variation, the at least one correlation filter may include at least one group name, and the method further may further include resolving the at least one group name into at least one user name (where the identified logs include the at least one resolved user name). In this regard, administrators can correlate logs and other data based on group names received from the directory service instead of having to separately correlate based on each of the individual members of the group. In another variation, the previously received and processed logs correlated by the processing platform may have been generated by at least two different devices or hosts.

In accordance with another aspect, a utility is provided for use in monitoring one or more platforms of a data system. The utility includes: establishing, on a processing platform, a number of log processing rules for selectively processing logs associated with one or more monitored platforms based on a content of one or more data fields of the logs; receiving, at the processing platform, logs associated with the one or more monitored platforms; processing, at the processing platform, the received logs using the number of log processing rules; identifying, using the processing platform, a processed log (e.g., by selecting the log message on a console or user interface associated with the processing platform using any appropriate user manipulable feature); and first operating the processing platform to establish at least one new log processing rule based on one or more data fields of the identified, processed log.

In one arrangement, the utility may further include second operating the processing platform to process the logs associated with the one or more monitored platforms using the at least one new log processing rule (it is noted that the use of identifiers such as "first" processing or operating, "second" processing or operating as used throughout the present disclosure may not necessarily connect any order of such processing or operating steps, unless otherwise noted). For instance, the newly created log processing rule may identify at least one event from the received logs. In another arrangement, the utility may include identifying, using the processing platform, at least one event from the received logs using the number of log processing rules. Here, the utility may include second operating the processing platform to process the at least one event using the at least one new log processing rule (e.g., to designate at least one alarm from the at least one event). It is also envisioned that event and alarm rules could be created from alarms. In any event, another arrangement contemplates customizing the at least one new log processing rule. For instance, the customizing may include modifying, in the at least one new log processing rule, at least one of said one or more data fields of the identified log message that the at least one new log processing rule is based on.

In accordance with another aspect, a utility is provided for use in monitoring one or more platforms of a data system. The utility includes establishing, on a processing platform, a number of log processing rules for selectively processing logs associated with one or more monitored platforms based on a content of one or more data fields of the logs; receiving, at the processing platform, logs associated with the one or more monitored platforms; first operating the processing platform to process the logs associated with the one or more monitored platforms using the number of log processing rules; identifying, using the processing platform and in response to the first operating step, at least one event from the logs associated with one of the one or more monitored platforms for further processing; and second operating the processing platform to establish at least one new log processing rule based on one or more data fields of the identified event.

In one arrangement, the utility may further include second operating the processing platform to process the logs associated with the one or more monitored platforms using the at least one new log processing rule. This new log processing rule may identify at least one event from the received logs. In another arrangement, the utility may further include second operating the processing platform to process events identified from the logs associated with one of said one or more monitored platforms using the at least one new log processing rule. Here, the at least one new log processing rule may designate at least one alarm from the at least one event.

In accordance with another aspect, a utility is provided for use in monitoring one or more platforms of a data system. The utility includes: establishing, on a processing platform, a number of log processing rules for selectively processing logs associated with one or more monitored platforms based on a content of one or more data fields of the logs; identifying, using the processing platform, a log message associated with one of the one or more monitored platforms (e.g., selecting said log message on a user interface associated with said processing platform); first operating the processing platform to establish at least one correlation filter (e.g., classification, impacted country, impacted origin, direction and domain) based on one or more metadata fields of the identified log message; and second operating the processing platform to correlate logs previously received and processed by the processing platform using the at least one correlation filter.

In one arrangement, the step of second operating may include searching for logs previously received and processed by the processing platform that match the correlation filter of the identified log message. More specifically, and in the case where an initial search has resulted in a table having a number of rows and columns being populated with logs and/or events along with a number of metadata fields corresponding to each of the logs and/or events, the logs or events may be rearranged according to the correlation filter. As just one example, in the case where the correlation filter was a "common event" (e.g., logon, process started), those logs or events having the same common event could be bunched together in the table. Numerous other types of correlation filters are also envisioned and encompassed within the scope of this disclosure (e.g., domain, impacted country, etc.). In another arrangement, the previously received and processed logs correlated by the processing platform may have been generated by at least two different devices or hosts.

In accordance with another aspect, a utility is provided for use on one or more platforms of a data system. The utility includes: specifying, at a user interface, whether or not to take at least one action in relation to a plurality of logs received from one or more monitored platforms of the data system based on a classification (e.g., security, audit and operations) of the received logs; receiving, at a processing platform in communication with the user interface, logs from the one or more monitored platforms; and operating the processing platform process the received logs in accordance with the specifying step.

The at least one action may include at least one of archiving of the received logs, the storage of the received logs in a database associated with said processing platform, and the forwarding of the received logs to a tool that can aggregate numerous received logs in a single view on said user interface (although numerous other actions are also envisioned and encompassed within the present disclosure). In one arrangement, the at least one action may be enabled (e.g., by checking a box on the user interface). In another arrangement, the specifying step takes precedence over at least one other conflicting setting of the processing platform. For instance, the at least one other conflicting setting may specify whether or not to take at least one action in relation to the plurality of received logs based on a log source of the received logs.

It should be appreciated that the various aspects discussed herein may be implemented via any appropriate number and/or type of platforms, modules, processors, memory, etc., each of which may be embodied in hardware, software, firmware, middleware, and the like.

BRIEF DESCRIPTION OF THE DRAWINGS

FIGS. 4 and 5 are tables of reporting fields used by the Message Processing Engine ("MPE") of a log manager.

FIG. 12 is a screen capture of an application interface used to customize sub-rules for the MPE.

FIGS. 18 through 19 illustrate other dashboard interfaces that may provide additional information relating to event collection by an event manager.

FIG. 21 illustrates a rule manager interface.

FIG. 26 illustrates an itemized list of all the logs making up the events shown in FIG. 25.

FIG. 29 illustrates one pop-up window resulting from a decision to create an alarm rule in the drop-down menu of FIG. 28, where the pop-up window queries as to whether the user desires to create an alarm rule with information from the log manipulated in FIG. 28 or with limited information from such log.

FIG. 30 illustrates another pop-up window in the creation of the alarm rule from FIGS. 28-29, where the pop-up window queries as to whether the user desires to create a global alarm rule that is manageable by all global administrators.

FIG. 33 illustrates an itemized list of logs/events resulting from a search using a quick-search tool bar of the user interface of FIG. 23.

Figure 41:
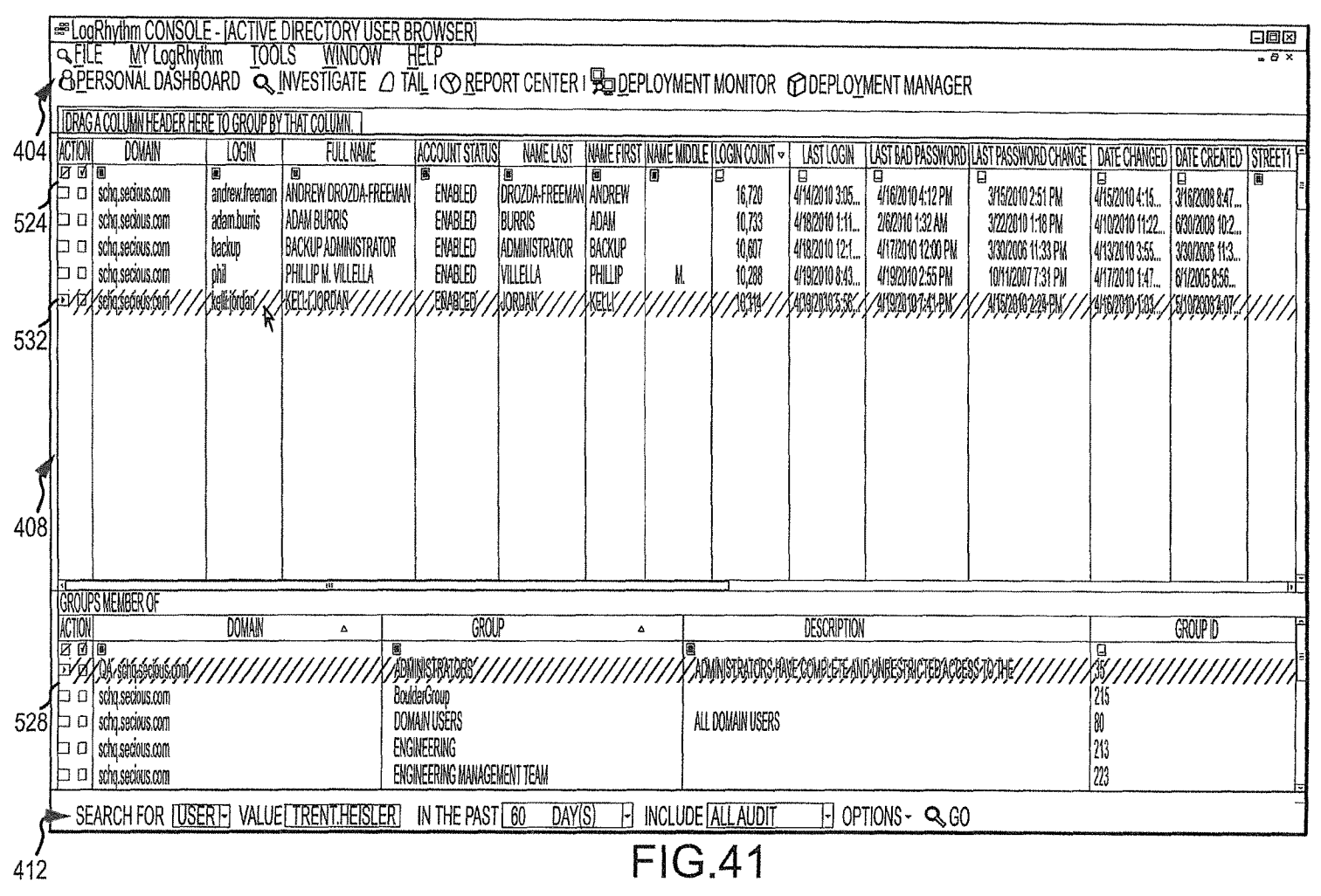

FIG. 41 illustrates a grid of users and corresponding activities after manipulation of an "active directory user browser" button in FIG. 40.

FIG. 42 illustrates drop down menus available after manipulation of one of the lines of the grid of FIG. 41.

FIG. 46 illustrates a grid of user groups and corresponding users after manipulation of the active directory group browser button of FIG. 45.

FIG. 51 illustrates the drop-down menus of FIG. 49, but with a "policy manager" button having been selected.

FIG. 55 illustrates the pop-up window of FIG. 53, where a pop-up window allows a user to specify log distribution receivers that this particular distribution policy can be assigned to.

FIG. 60 illustrates various pop-up windows resulting from the selection of a "new" button in the drop-down menu of FIG. 59, where selection of the new button indicates a desire to create a new global log processing rule, and where the pop-up windows allow a user to select particular log classifications to which this new global log processing rule may be applied to.

DETAILED DESCRIPTION OF THE DRAWINGS

Figure 1:
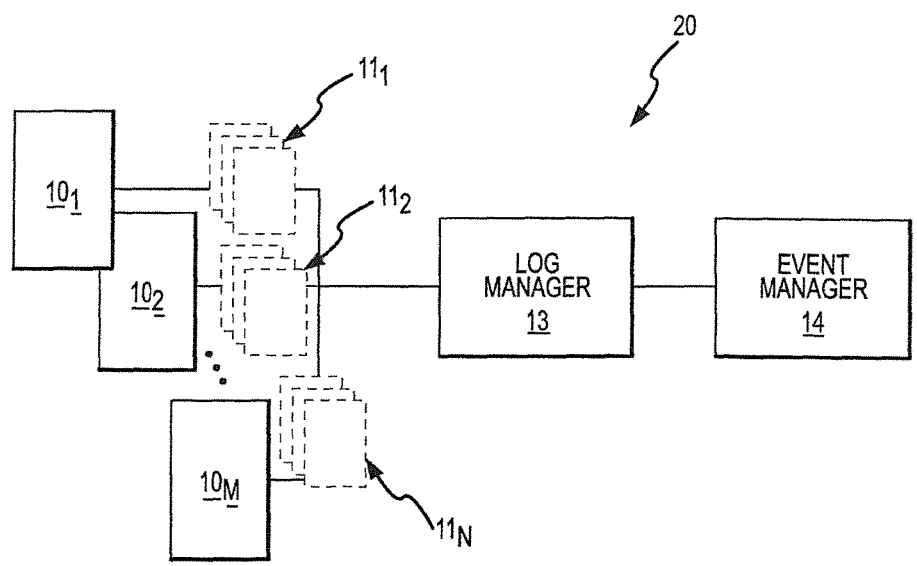
FIG. 1 is a block diagram of a system that provides for log management and events associated therewith.

The present invention relates to network monitoring and information management through the processing of log messages. In the following description, the invention is set forth in the context of log messages that are generated by computers within a computer network, for purposes of illustration. However, it will be appreciated that the invention is applicable to a broader variety of applications. For example, the log message processing may provide for the detection of a particular event for virtually any type of system that generates log messages (e.g., computer servers, mainframes, network devices, security devices, access control devices, etc.). In addition, certain aspects of the invention are applicable in contexts other than log processing Generally, the invention regards systems and methods that provide for the collection, processing, management, and analysis of the log messages. In FIG. 1, log messages are generally identified by the reference numbers $11_1 \ldots 11_N$ and are generated by their respective computers $10_1 \ldots 10_M$ (where M and N are both integers greater than 1). In this regard, the computers $10_1 \ldots 10_M$ may each generate a plurality of text files describing various events associated with the computers' operations. The generated text files are also routinely updated by the computers $10_1 \ldots 10_M$ as various events transpire during the computers' operations, a process that is generally referred to as "logging". Additionally, while log messages may come in other formats, text files are often used for logging because of their readily manageable format and because a person can more easily understand the information contained therein for diagnostic purposes when problems arise.

Generally, the computers $10_1 \ldots 10_M$ that generate logs $11_1 \ldots 11_N$ come in a variety of configurations with each being capable of generating tremendous numbers of logs. For example, the computer $10_1$ may represent a server operable within a computer network configuration. In this regard, the server may be responsible for delivering applications to computers within the computer network, administering communications among computers within the computer network, controlling various features of the computer network etc. In the process of performing these functions, although partially dependent upon the number of computers within the network, the server typically generates thousands of log entries per day. To illustrate, when a user incorrectly attempts to logon to a single computer on the computer network, the server may generate a log entry noting at a particular time (e.g., timestamp) that an improper procedure was performed. Of course, the invention is not intended to be limited to log entries that merely reflect improper login attempts. Rather, computers regularly generate log entries for a variety of actions, such as application launch failures, audit activity, attacks, operating system errors, etc. Other examples of computers may include individual computers (e.g., desktops and notebooks/laptops), computer workstations, mainframe systems, etc.

Figure 2:
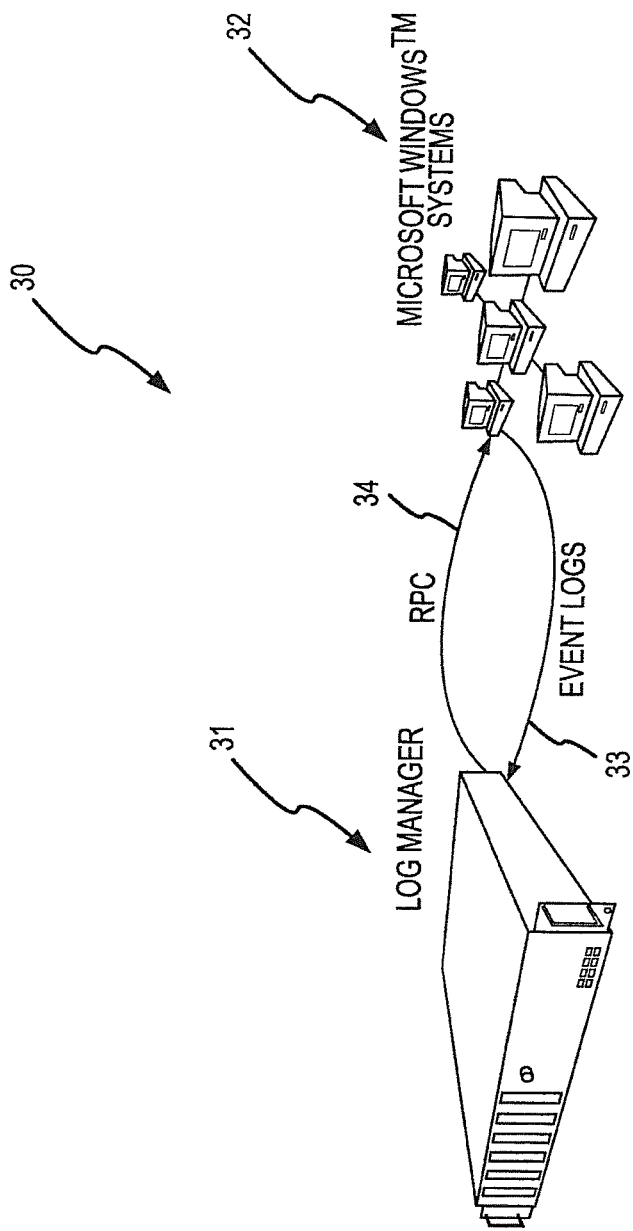
FIG. 2 is a block diagram of a log manager operable with a computer network employing Microsoft Windows operating systems.

The system 20 of the present invention provides for the rapid/automated extraction of viable information from the logs $11_1 \ldots 11_N$. Namely, the system 20 provides for a log manager 13 that is communicatively coupled to the various computers $10_1 \ldots 10_M$ to receive the logs $11_1 \ldots 11_N$ generated therefrom (e.g., collection). In this regard, the log manager 13 may use various protocols to communicate with the computer $10_1 \ldots 10_M$. For example, the system 20 may employ log agents (e.g., software) that operate on the individual computers $10_1 \ldots 10_M$ to extract log entries from the logs of the computers. In some instances, the log agents are software protocols that are innate to the operating system of a particular computer. For example, the log manager 13 may be communicatively coupled to a computer using the Windows Operating System by Microsoft, Inc. and, as such, may communicate with the computer using Windows Networking/Remote Procedure Calls (RPC). Such is illustrated in the system 20 of FIG. 2 with the log manager 31 communicating with a computer network 32 that runs Microsoft Windows operating systems. The log manager 31 may use the RPCs 34 to extract various log entries 33 generated by the various computers of the computer network 32 for processing by the log manager. In other instances, a software log agent may be configured to operate on the computer to exclusively communicate with the log manager 13. In such an embodiment, the log agent may transfer log entries to the log manager 13 via proprietary protocols. This and other examples of log manager communications are illustrated in greater detail below in FIGS. 3 through 5.

The information that the log manager 13 may extract from the logs may ultimately be used to generate alarm messages that may be useful to an end user. For example, the log manager 13 may process thousands of log messages and detect certain events from the volume of data contained therein. The log manager 13 may aggregate log data into a manageable format that summarizes, for example, the frequency of a particular event. Additionally, the log manager 13 may archive the above data for future reporting uses. This aggregation and archival may generally be referred to as management.

To illustrate some of the management aspects of the log manager 13, a computer in a network (e.g., computer $10_1$) may log an entry that a particular Internet Protocol (IP) address is attempting access to the computer. Similarly, another computer (e.g., computer $10_2$) in the network may log an entry that the same IP address is attempting access to the computer. The log manager 13 surmises that the same events are occurring on different computers. The log manager 13 may, in turn, generate an event message stating that the IP address is attempting access on various computers of the network. In this regard, the system 20 is generally configured with the event manager 14 to process the event messages to determine whether an alarm should be generated (e.g., analysis). If the IP address of this example is that of a computer that routinely communicates to the computer network as part of an authorized process, the event may simply be registered by the event manager for future use, if any. However, if the IP address belongs to a computer system that is, for example, attempting to bombard the network with message traffic, the event manager 14 may generate an alarm that a denial of service attack is underway so that a system administrator may take appropriate steps to limit or prevent any damage. Additionally, the utility may detect trends of events and/or alarm generation and provide reports pertaining to those trends, also falling generally under the purview of analysis.

Figure 3:
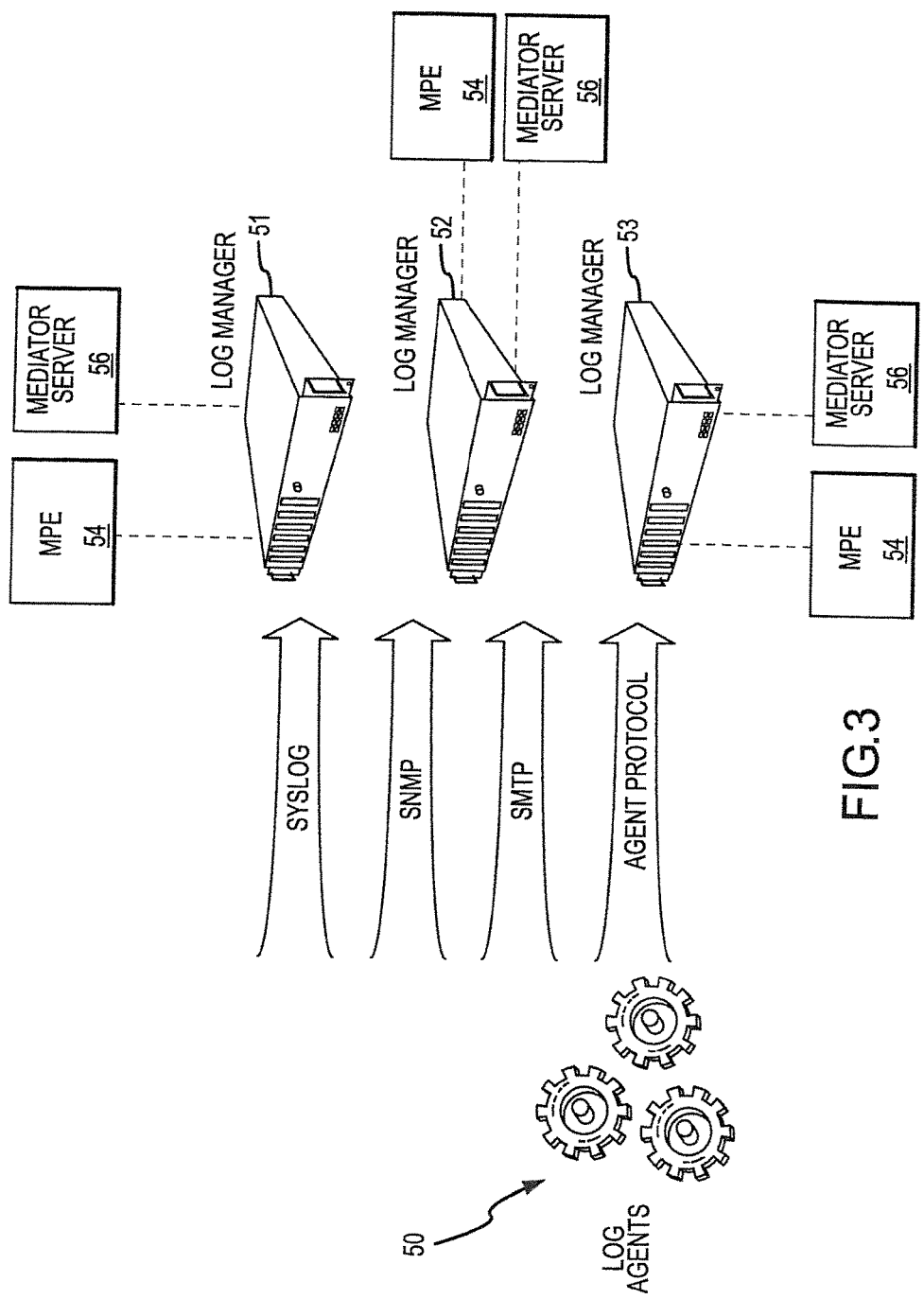
FIG. 3 is a block diagram of multiple log managers with each being configured to communicate to a computer network in a variety of manners.

Turning now to a more specific example, FIG. 3 shows a block diagram of the log managers 51-53 with each being configured to communicate with a computer system (e.g., a computer network, a single computer, a work station, a server, a mainframe, routers, switches, network devices, firewalls, etc.) and thereby operate as a front end to an event manager (e.g., event manager 14 of FIG. 1). For example, the log manager 51 may be configured to communicate with a UNIX-based computer system. In this regard, the log manager 51 may use syslog protocols that are inherent to the UNIX operating system to receive log messages from the computer system. The log manager 52, on the other hand, may be configured to exclusively operate using SNMP (Simple Network Management Protocol) and SMTP (Simple Mail Transfer Protocol) to receive log messages via the Internet or computers using Internet protocols. Those skilled in the art readily recognize SNMP as a means to monitor and control network devices, and to manage configurations, statistics collection, performance, and security and SMTP as a network management protocol used almost exclusively in TCP/IP networks to send and receive electronic mail.

Another example of transfer protocols that may be used are the Netflow protocols produced by Cisco Systems Inc. For example, the log manager can be configured to monitor a specified UDP ("User Data Protocol") port for incoming Netflow data. In this regard, the Netflow data may be received as UDP packets containing one or more flows collected by the sending device. A set of processing rules may be assigned to a Netflow policy such that Netflow data may be tagged as originating from a Netflow Log Message Source. Additionally, Netflow may be used within virtual source handling process (described below) in order to assign the Netflow data from different devices to specific log message sources (e.g., within system 20 of FIG. 1).

In one embodiment, the log managers are configured with a server process, called a message processing engine ("MPE"), that is responsible for processing each log message against a rule base. For example, log manager 53 is illustrated as being configured with the software component MPE 54 that provides for the identification of specific log messages, the parsing of data from the log message to reporting fields (e.g., IP addresses, logins), log message "aging" (e.g., deletion periods) and archiving, and the forwarding of a subset of log messages to an event manager (e.g., event manager 14 above). Because log messages vary in format and the data they contain, a flexible and powerful text comparison capability is employed. The text comparison is generally implemented using regular expressions, similar to those used in the UNIX operating system environment. The regular expressions assist in identifying and parsing log messages.

In this regard, the MPE 54 may also be configured with rules to implement such processing. For example, the MPE 54 may use a set of rules that are a combination of Microsoft .NETS regular expression syntax (modeled after industry standard regular expression syntax) and a unique tagging notation. The tagging notation additionally identifies sections of the log message that should be parsed into report fields, such as source IP addresses, destination IP address, and Login information. When an MPE rule is prepared (e.g., via the exemplary interfaces of FIGS. 11 and 12 described below), the tagging notation is converted to regular expression notation such that the MPE 54 can process log messages by comparing them to applicable rules (per a policy). More specifically, when a log entry matches a particular rule, the following is generally performed:

1. The log message direction is determined (e.g., external, internal);
2. A risk-based priority is calculated;
3. Meta-data is parsed from the log message text 4. The original log message text, the parsed meta-data, and any prepared data (e.g., direction, risk-based priority, time-to-live, archive settings) is written to the Log Manager database; and 5. An event is generated and forwarded to the event manager (e.g., if the feature is activated).

The event record that is generated by the MPE 54 generally contains the same information as the updated log message record with additional reporting fields. Examples of those reporting fields are shown and described in FIGS. 4 and 5. These reporting fields (i.e., of FIGS. 4 and 5) are updated by the MPE 54. The reporting fields may include meta-data associated with log messages and data that is parsed from the log.

In yet another example of possible communications between the log manager and a computer system, log manager 53 is configured to communicate with a computer system via log agent protocols that operate with the computer system being monitored. For example, a software application (i.e., log agent 50) may be configured to specifically operate within a particular computing environment (e.g., an operating system). The log agent 50, when executed by the computing environment, may retrieve generated log messages from the computing environment and transfer those messages to a log manager, such as log manager 53. Such is generally referred to as an "agent-based" configuration. In one embodiment, the log agent 50 collects log data from various sources and forwards the data to a log manager (e.g., log manger 53) via authenticated TCP or other transport protocol. Additionally, the log agent 50 may encrypt log data from the log messages of its respective computer system and then configure the encrypted log data within the transport protocol that allows for the encrypted log data to be transferred from the computer system to the log manager 53. For example, the log agent 50 may be configured to encrypt the log entries before transfer to the log manager 53 to provide reporting assurance, as described hereinbelow. The log manager 53, upon receiving encrypted logs, may decrypt the logs and begin processing them to extract useful information. Examples of the encryption technology used by the log agent 50 may include, but are not limited to, the Blowfish encryption algorithm or the Advanced Encryption Standard ("AES"). The log agent may additionally compress log messages before being sent over the network.

The log agent may monitor and forward textual log data of a variety of sources, such as firewall logs, web proxies, intrusion detection alarms, audit logs or system logs. When log data is not textual in nature, specific log collection adapters may be configured (e.g., as in the case of a Windows Event Log). The log agent can also be configured to forward logs to one or more backup log managers when a primary log manager is unavailable. This ability to "failover" to a backup log manager helps assure reliable delivery of log data.

Additionally, the log agent 50 may be configured to communicate with the log manager 53 and observe the log messages that are being received by the log manager. To illustrate, log manager 51 is shown with the application interface 55 software module that enables communications between the log manager 51 and a computer coupled thereto. The log agent 50 may be configured to observe items such as the number of Netflow packets in a disk buffer (e.g., the number of Netflow packets that have been spooled to disk), the number of Netflow packets in an unprocessed queue (e.g., indicating the number of Netflow packets that are awaiting processing), the number of Netflow packets received (e.g., indicating the number of Netflow packets that have been received by the agent since it last started), the number of Netflow packets received per second.

Generally, the Netflow server is governed through four (4) configuration parameters in the configuration file of the log agent 50. The configuration parameters include the Netflow_server (e.g., used to enable or disable the Netflow server), Netflow_server_nic (e.g., used to specify the interface to receive Netflow data, determine a network interface card to use), Netflow_server_port (e.g., used to specify a port on which the Netflow server will receive Netflow packets), and Netflow_server_crypto (e.g., used to specify whether the Netflow message source will encrypt data).

Although described with each log manager being configured to operate/communicate with a single protocol, this description is merely intended to make the reader more readily familiar with the manner in which the log managers operate. Alternatively, log managers 51 through 53 may each be configured to operate/communicate with a variety of computer systems to collect and process log messages such that events may be generated by the event manager. For example, each log manager may be configured to communicate via a variety of protocols (e.g., syslog, SNMP, SMTP, RPC, log agent 50 protocols, etc.) such that the log manager can be flexibly configured to communicate with a number of computer systems. Additionally, while FIG. 3 illustrates log managers 51-53, the invention is not intended to be limited to the number of illustrated log managers. Rather, the illustrated embodiment is merely intended to assist the reader in the communication protocols between the log managers and various computer systems/log agents. Those skilled in the art should readily recognize that other embodiments may call for fewer or more log managers as a matter of design choice. For example, the number of log managers may be scaled based on a variety of factors such as the aggregate numbers of log messages forwarded per second and the number of connected log agents. Also, process of providing additional log storage may be accomplished through the addition of log managers operating in parallel.

Figure 6:
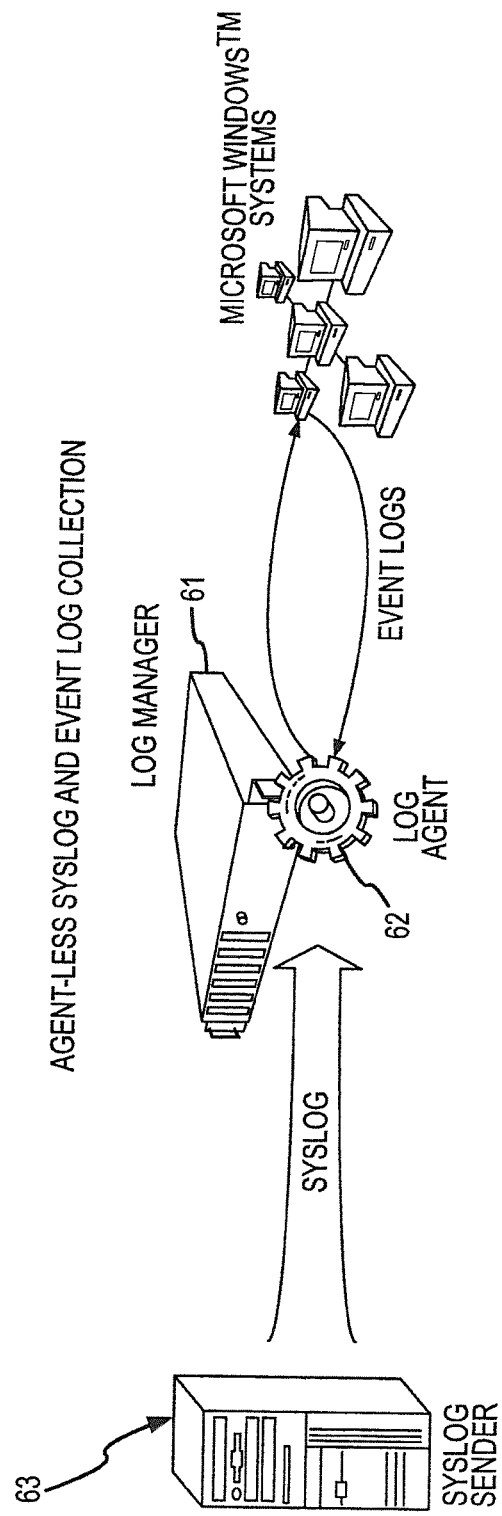
FIG. 6 is a block diagram of an agentless log manager configuration.

While log agents may reside on the computer hosting the logs of interest, certain scenarios exist in which the log agent can collect log data from remote systems. For example, log agents may be configured as agent-less. In such a configuration, a log agent 62 may be installed as a "log aggregation server", as shown in FIG. 6. This configuration may even be within the log manager itself (i.e., log manager 61. In this regard, the log agent 62 may serve as a central log data collector that forwards collected logs to a log manager. For example, a log agent may have a built in syslog server that can accept log data from a device 63 that is sending syslog data and forward such log data directly to a log manager. Such a capability may provide flexible support for collecting logs from devices and hosts that use the syslog protocol, such as routers, switches, and Unix servers.

Figure 7:
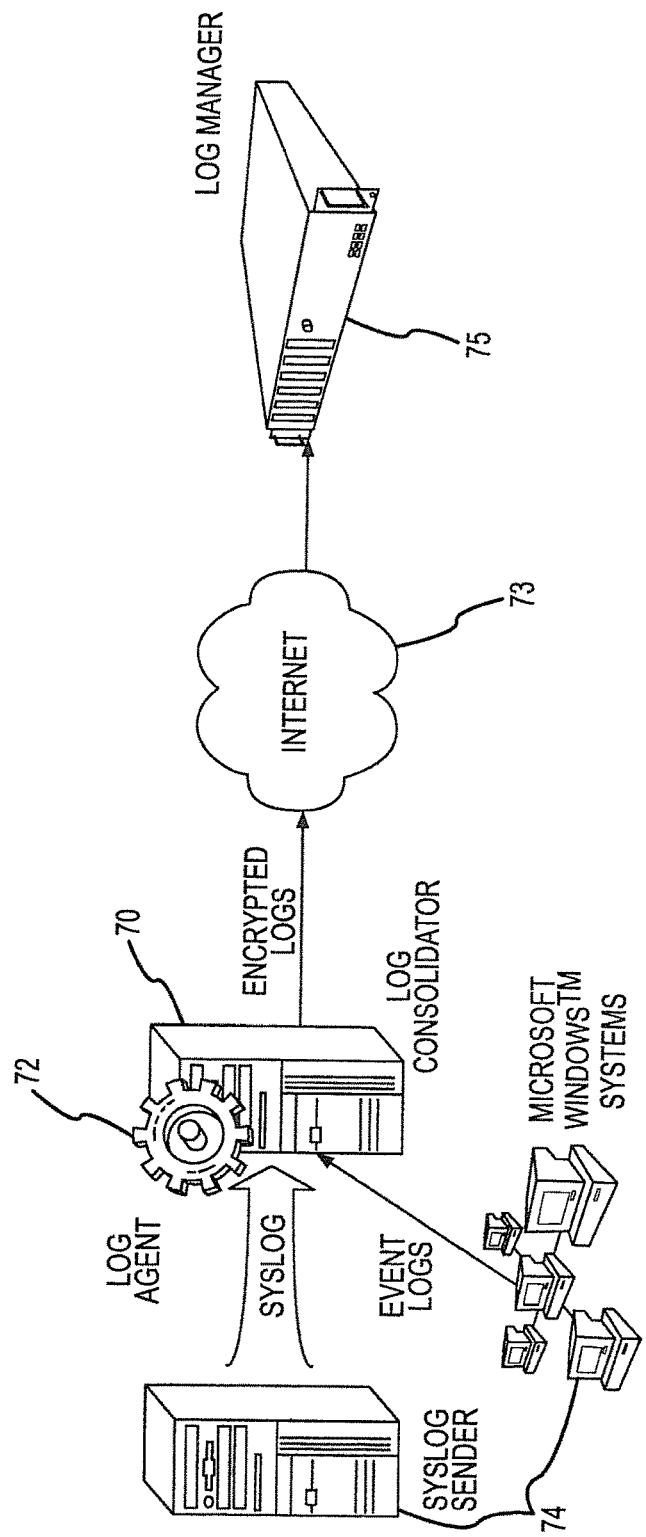
FIG. 7 is a block diagram of a remote log agent configuration.

Additionally, by using native Windows protocols, the log agent can connect to and collect event logs from remote systems, as shown in FIG. 7. For example, the log agent 72 may be installed on a system 70 and configured to collect, consolidate, and forward the event logs of remote systems 74 over the Internet 73. In this regard, the log agent 72 can support the forwarding of event logs of Windows based servers without requiring an agent on each remote system 74. For example, many businesses have information technology ("IT") devices and servers deployed at remote sites where administration and monitoring is done centrally. A major challenge in managing remote sites is the ability to effectively monitor security and availability of those sites because the sites typically have no IT support present. A single log agent can be configured to run as a syslog server and a remote Windows event log consolidator with installation of such on a single server at the remote site. In this regard, the log agent may collect logs from communicatively coupled network devices (e.g., routers and firewalls via a syslog server) and/or Windows servers. The log agent can then forward the logs across the internet 73 via encrypted and authenticated TCP communication protocol. The logs may then be securely forwarded to a log manager 75 through firewalls. Once the logs are collected by the log manager 75, the logs can be transformed into events for central monitoring alarm generation when applicable.

Regarding consolidation, the log agent 72 may consolidate log messages by counting the number of times a unique log message is collected and/or observed within a certain timeframe. For example, the log agent 72 may retrieve/receive log messages and observed various portions of metadata associated with those files. The log agent 72 may then consolidate a plurality of log messages into one message to the log manager indicating that the same log message has been observed for a certain number of times or at some frequency. In one embodiment, the log manager may include an application programming interface ("API") that allows a user to aggregate reports based on predetermined criteria. In this regard, the user may program the log agent 72 via the API to retrieve of log messages according to a metadata set as selected by the user.

Figure 8:
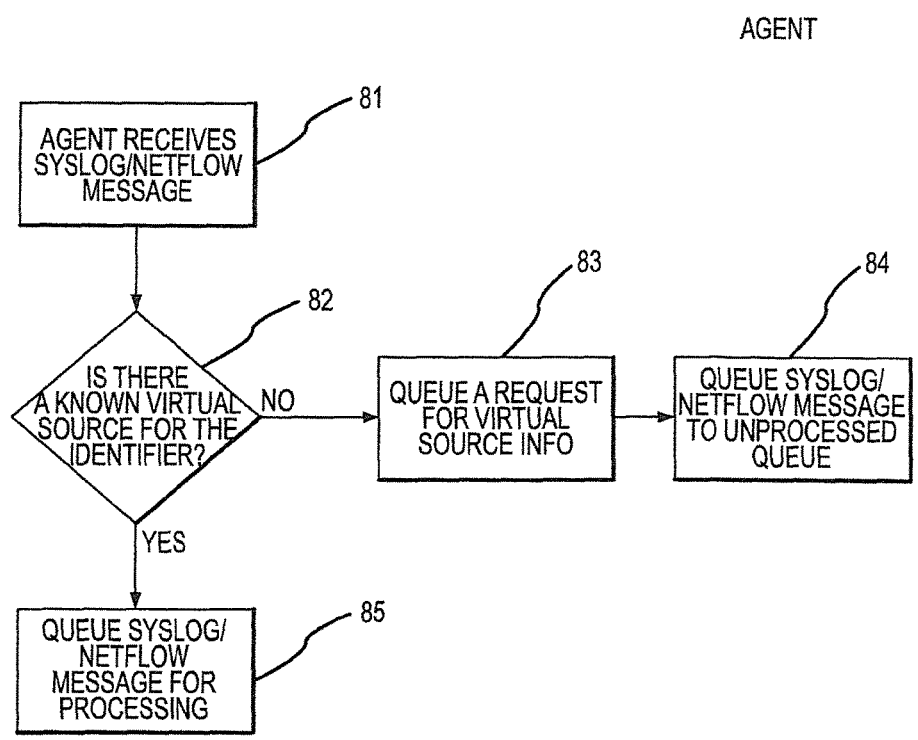
FIGS. 8 and 9 are flowcharts of exemplary log agent processes.
Figure 9:
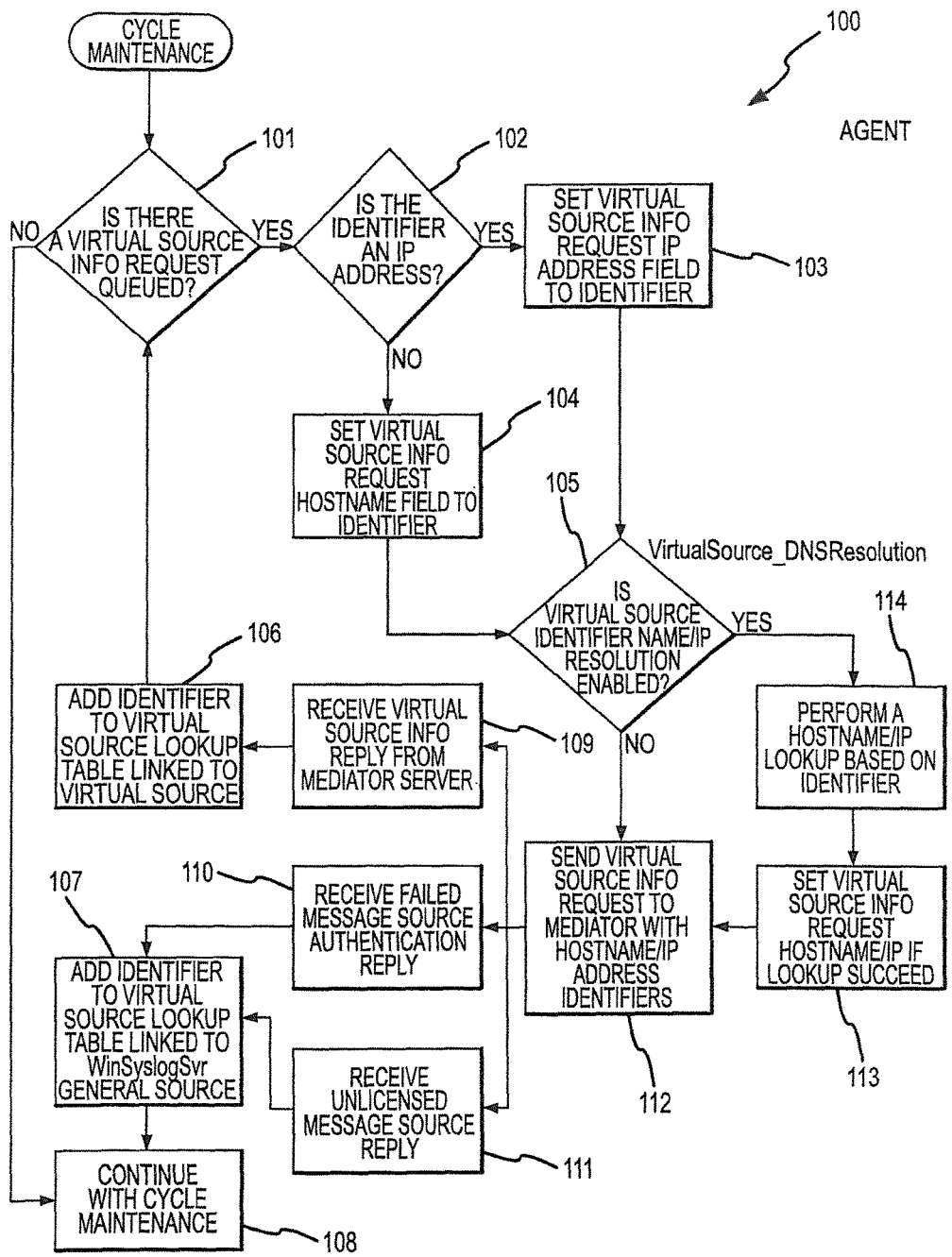

FIGS. 8 and 9 are flowcharts of exemplary log agent processes that provide for virtual source handling. Virtual source handling is the process of associating log messages, based on values contained in the log message, to a logical container that represents the source of the log data. In flowchart 80, a log agent (e.g., log agent 50 of FIG. 3) receives a syslog/Netflow message in process element 81. The log agent then determines whether there is a known virtual source for the identifier, in process element 82. For example, the log agent may query a log manager for virtual log message source information. When the log agent receives syslog or Netflow data, an identifier may be parsed out of the log. This identifier is frequently an IP address (but can also be a hostname, application name, or other unique descriptive value) which can be used to map log data to a specific virtual source. If there is no known virtual source for the identifier, the log agent may queue a request for the virtual source information to the log manager, in process element 83. Subsequently, the log agent may queue the syslog/Netflow message to an unprocessed queue, in process element 84. If there is a known virtual source for the identifier, then the log agent assigns the virtual source to the the syslog/Netflow message for processing by the log manager, in process element 85.

Flowchart 100 of FIG. 9 illustrates the process of the log agent/log manager interaction when a virtual source information request is queued (i.e., process element 101), generally referred to as a mediator server maintenance process. Such is illustrated with the following syslog data:

Jul 16 16:53:49 192.168.1.20 dhclient: DHCPREQUEST on eth0 to 192.168.1.10 port 67

If the log agent parses out an IP address identifier (i.e., process element 102), the log agent may perform a forward DNS lookup in an attempt to gather a fully qualified domain name for the IP address. Such may be performed by setting the virtual source information request IP address field to the identifier, in process element 103. Conversely, if the log agent parses out a hostname or fully qualified domain name (e.g., process element 102) it may perform a reverse DNS lookup in an attempt to gather an IP address. Generally, this results in setting the virtual source info request hostname field to the identifier, in process element 104. The DNS lookups can be enabled/disabled via a VirtualSource_DNSResolution configuration parameter in the log agent's configuration file, in process element 105. The VirtualSource_DNSResolution, when enabled, may cause the log agent to attempt to resolve hostnames for syslog sending devices that send IP addresses as the identifier. This configuration parameter may also cause a log agent to attempt to resolve IP addresses for syslog sending devices that send hostnames as the identifier. Additionally, this configuration parameter may cause the log agent to perform forward and reverse DNS lookups on identifiers parsed from syslog and Netflow data. Thus, if the DNS lookups are enabled, the log agent may perform a hostname/IP lookup based on the identifier, in process element 114, and set the virtual source info request hostname/IP if the DNS lookup is successful, in process element 113.

Figure 10:
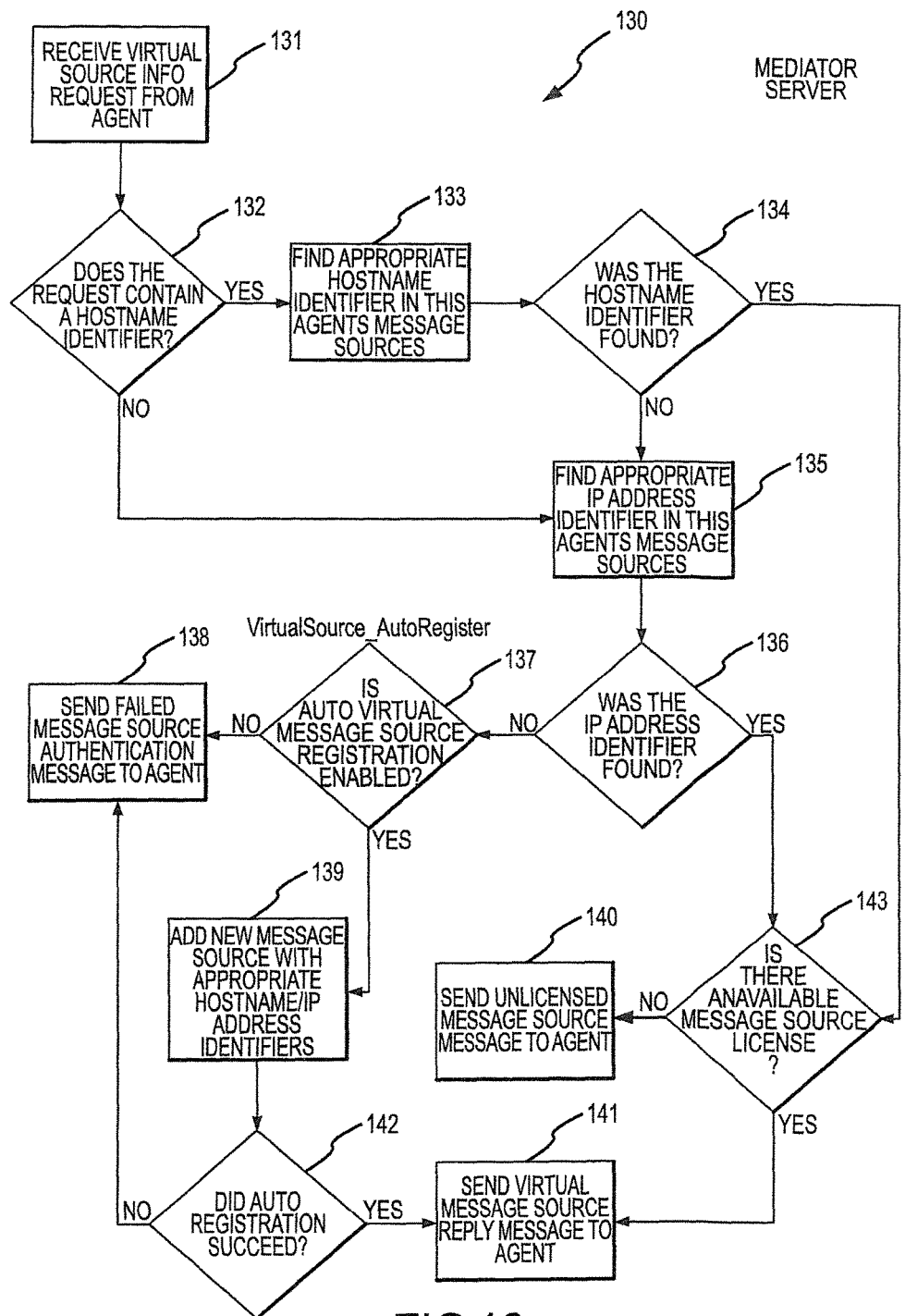
FIG. 10 is a flowchart of an exemplary agent and mediator server process for automatically recognizing hosts sending log data to a log manager (e.g., "auto-registration").

The log agent may subsequently send a virtual source information request to a mediator server within the log manager (described in greater detail below in FIGS. 10 through 12) containing the identifier parsed out of the log along with any information gathered through the DNS queries, in process element 112. Such may also occur if the virtual source identifier name/IP resolution is disabled (e.g., process element 105). When the mediator server receives a virtual source information request from a log agent, the mediator server examines virtual sources loaded from a configuration database (e.g., a configuration database of system 20) to see if the identifier is assigned to a virtual source. If the identifier is assigned to a virtual source, then the mediator server may return a virtual source information reply containing an appropriate log message source information to the log agent, in process element 109. The log agent may then assign all syslog or Netflow data from the identifier to the virtual source. That is, the log agent may add the identifier to a virtual source lookup table that is linked to the virtual source, in process element 106. From there, flowchart 100 may cycle to determine whether there is a virtual source info request being queued, in process element 101.

If, however, the identifier is not assigned to a virtual source (and the mediator server is configured to auto register virtual sources), then the mediator server may create a new virtual message source for the agent that sent the virtual source information request. The newly created virtual source generally has the identifier automatically assigned to it. Newly created syslog sources are generally created with the log message source type of Syslog-Autoregistered. Newly created Netflow sources, on the other hand, are generally are created with the log message source type of Cisco Netflow.

Additionally, if the identifier is not assigned to a virtual source and the mediator server is not configured to auto register virtual sources, the mediator server may return a failed message source authentication message to the log agent, in process element 110. In the event that the log agent receives a failed message source authentication message from the Mediator Server or the virtual source information request fails (e.g. the virtual source does not exist and the Mediator Server is configured to not auto register virtual sources) the log agent may assign syslog/Netflow data from the identifier in question to the generic WinSyslogSvr/WinNetflowSvr source, in process element 107. Similarly, if the log agent receives an unlicensed message source reply from the mediator server, in process element 111, the log agent may assign syslog/Netflow data from the identifier in question to the generic WinSyslogSvr/WinNetflowSvr source, in process element 107. In either case, flowchart 100 may continue with cycle maintenance in process element 108 by returning to process element 101.

As mentioned, the log agent may send a virtual source information request to a mediator server within the log manager for log message processing. The mediator server process, however, is not the end of processing by the log managers. Generally, log managers, such as log managers 51-53 of FIG. 3, have at least three components, a relational database management system, a mediator server, and a message processing engine. The relational database management system ("RDBMS"), such as Microsoft SQL Server, stores log data. The RDBMS generally provides full backup and recovery facilities and ensures transactional integrity.

The mediator server (generally operable within a Windows OS environment) handles connections from log agents, inserts forwarded log data into the database, and handles the archiving or destruction of log data according to a user configurable policy. The mediator server process is responsible for managing interactions and communications with log agents and is illustrated in flowchart 130 of FIG. 10.

The mediator server process initiates when a virtual source information request is received from a log agent, in process element 131. That is, a log agent may initiate a virtual source information request to which the mediator server responds by satisfying the requests. In doing so, the mediator server may determine whether a request contains a hostname identifier, in process element 132. If so, the mediator server finds the appropriate hostname identifier associated with that particular log agent's message sources, in process element 137. For example, a log agent may operate with a plurality of devices such as that described in the remote agent-less log management system described herein above. Accordingly, the log agent may receive log messages from a variety of different devices, each of which may have a hostname identifier. The mediator server may look up the hostname identifier that is associated with that log agent (i.e., process element 134). If a hostname identifier is found, the mediator server may determine if there is an available message source license, in process element 143. For example, a log manager may have a license that is used in determining the maximum number of log sources that can send log data to the log manager simultaneously. In this regard, the log manager may check for an available license to determine whether a maximum log source limit has been reached. In one embodiment, each log source may be individually licensed. The mediator server may determine whether log messages from a particular source are authorized, or licensed. The mediator server may then obtain the license of the particular device to begin processing of log messages. If not, the mediator server may find the appropriate IP address identifier of the log agent's message sources, in process element 135. Such may also be performed if the original request does not contain a hostname identifier, in process only 132.

Upon searching for the IP address identifier in the log agent's message sources, the mediator server may determine whether the IP address identifier was found, in process element 136. If so, the mediator server may determine whether there is an available message source license, in process element 143. If there is no IP address identifier found, the mediator server may determine whether auto virtual message source registration is enabled, in process element 137. For example, when the VirtualSource_AutoRegister is enabled, the mediator server may automatically register new virtual sources for unknown syslog/Netflow sending devices, in a manner similar to plug-and-play registration of devices with computers. Such is generally performed upon receiving syslog or Netflow data with an identifier not already assigned to a virtual source. This may create a message source in the event manager database for the syslog/Netflow sending device. Virtual sources can also be created manually via a log agent. Virtual sources are generally created and managed in the same way as other log message sources so long as they are created within the agent that is running the syslog or Netflow server.

If the auto virtual message source registration is not enabled, the mediator server may send a failed message source authentication message to the log agent and communication therewith, in process element 138. If, however the auto virtual message source registration is enabled, the mediator server may add the new message source to the database according to the appropriate hostname/IP address identifiers, in process element 139. If the auto virtual message source registration process is successful, in process element 142, the mediator server may send a virtual message source reply message to the log agent, in process element 141, such that log messages from those registered devices may be properly processed. If the auto virtual message source registration is not successful, the mediator server may alternatively send a failed message source authentication message to the log agent, in process element 138, to, e.g., alert the log agent that those particular log messages are not to be forwarded to the log manager. Similarly, if no available message source license exists (i.e., process element 143), the mediator server may send an unlicensed message source message to the log agent, in process element 140 to similarly discontinue processing of log messages.

The mediator server process ensures that only authorized and authenticated log agents connect to the log manager by terminating unauthorized connections. The server process inserts forwarded log messages into the log manager database setting default on-line lifetimes (e.g., the time that a particular log message is available and generally referred to as the time-to-live of a log) and archiving parameters. Communications between the log agents and the mediator server process are generally TCP based and can be encrypted, as described above. Additionally, the mediator server monitors system loads and communicates such information to log agents to ensure log message peaks do not overwhelm the system. In cases where the mediator server process becomes to busy or goes into its daily maintenance cycle, the server can direct connected log agents to fail-over to backup log managers. The log agents may then periodically try to reconnect to their primary log manager.

The mediator server maintenance process (described in flowchart 100 of FIG. 9) is generally responsible for performing routine system maintenance tasks and archiving log messages for off-line storage. This process is typically scheduled to run once daily during off-peak hours. During each maintenance cycle, log messages are evaluated to determine if their on-line lifetime has expired. However, archiving may be performed according to a user configured schedule, without regard to the maintenance cycle. In such an embodiment, the maintenance process removes logs that have expired according to the time-to-live value and a seperate process archives log messages. This process can run continuously (e.g., always checking for new logs to archive) and/or it may be configured to run periodically (e.g., check for new logs every 5 minutes). Alternatively or additionally, the archive process can be run within a window of time (e.g., start archiving logs between the hours of 5 PM and 5 AM)

A time-to-live value generally determines the number of days the log message should be stored on-line in the log manager database. Messages having an expired time-to-live are deleted or archived based on the archive setting for the source of the log. Logs having an expired time-to-live and marked for archiving are written to an archive file and then deleted from the log manager database. That is, the logs that are marked for archive are written to the archive files independent of the time-to-live value. In this regard, they may be archived days before the time-to-live expires. Once the time-to-live has expired and once the log has been archived, the log removed from the on-line database. Additionally, archive files can be automatically compressed to save space before being moved to long term storage. Archive files can be imported back into a log manager to support historic analysis requirements as in the case of a forensics investigation or audit. Archiving is shown and described in greater detail in FIGS. 13 and 14.

As mentioned, the log managers also have an MPE, such as MPE 54, which processes each log entry in the database against event rules and policies and forwards the log entries as events to an event manager, such as event manager 14. The MPE can run as an independent service in the log manager or be compiled into the mediator server in the log manager. The MPE identifies, classifies, and transfers log messages as events to the event manager by means of a rules engine that compares log messages against a list of user configurable MPE rules. As mentioned above, the MPE rules are generally written in a standard regular expression notation combined with a tagging system to identify and parse common log information such as IP addresses, TCP/UDP port numbers, and login names. A rule builder tool exists that facilitates the development and testing of MPE rules such that customized rule development is possible. The rule builder tool generally is assigned default values for log messages that include, among other things, time-to-live for the log message, archival decisions, event manager forwarding decisions, and risk analysis. However, these default values may be overridden at a user's discretion.

The management of MPE rules is policy based. For example, rules are assigned to one or more policies. Within a policy, the rules default values for time-to-live, archiving, event forwarding, and risk can be customized. Policies are then assigned to message sources (e.g., a specific source of log messages forwarded by a log agent). Security event log of an IIS web server as well as individual syslog files on a Linux server may be considered exemplary message sources within the context of the log management system. Additionally, these MPE rules may assign shared or custom MPE rule policies at the message source level which provides low-level control over log message management. For example, a failed login message from one system could be ignored while the same message from a different system could be promoted to an event and forwarded to the event manager.

Figure 11:
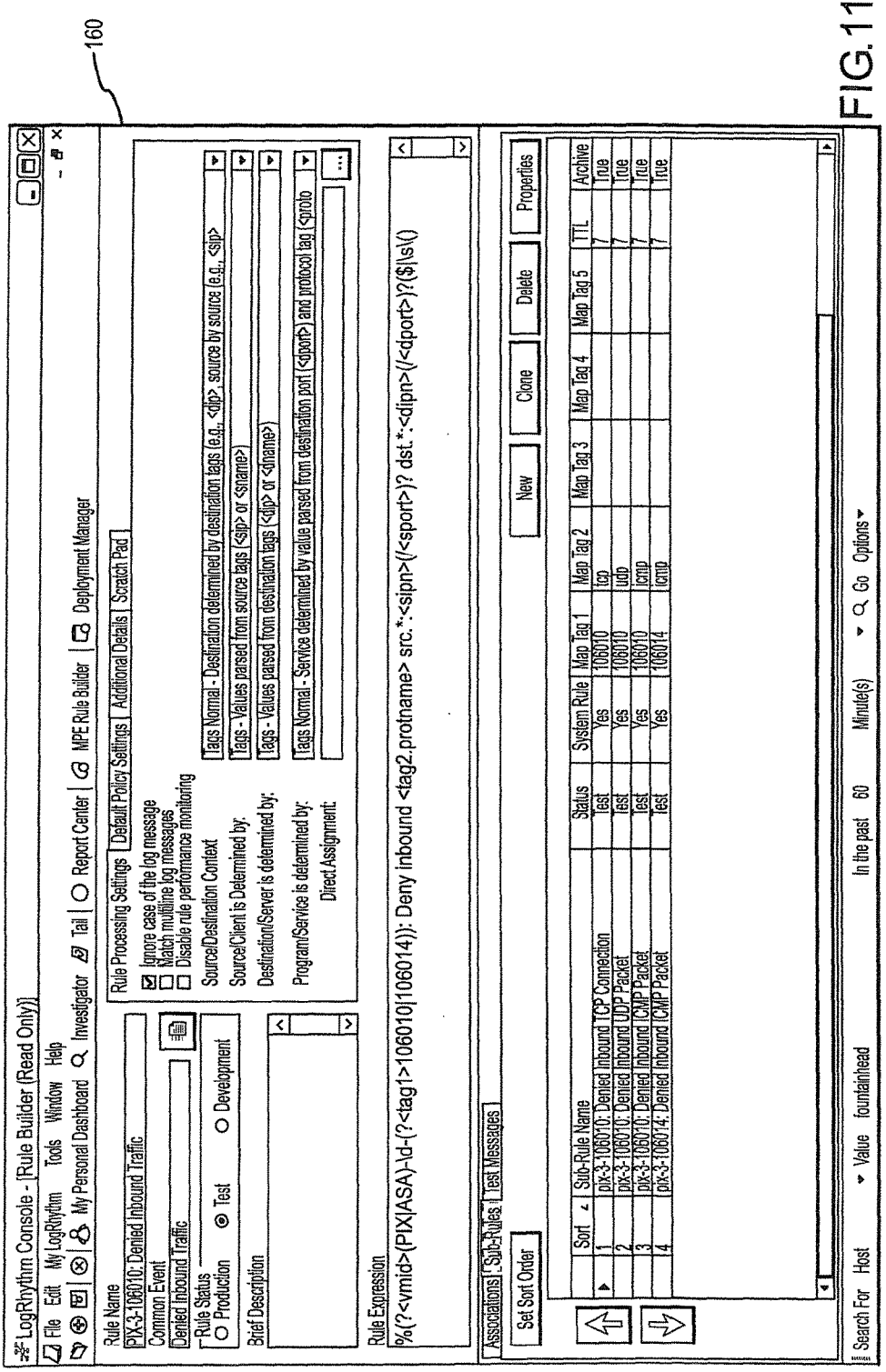
FIG. 11 is a screen capture of an application interface used to customize rules for the MPE.

The customization of MPE rules is illustrated with the application interface 160 FIG. 11. Each MPE rule generally consists of a base rule and one or more optional sub-rules. A base rule includes a tagged regular expression code. Sub-rules, however, generally do not include regular expressions; rather, sub-rules use "map tags" to extend the base-rule. However, the base rules and the sub rules for each are configured with certain process settings that control how similar log messages are processed, many of which can be overridden based on user preference. Examples of these settings are illustrated in application interface 160 and include default time-to-live (e.g., which controls the number of days matching log messages should remain available with the mediator before being archived and/or permanently deleted), default archive (e.g., which controls whether matching log messages should be archived when TTL expires), ignore case (e.g., controls whether the regular expression should ignore the case of text characters when comparing log messages against certain rules), match multiline log messages (e.g., controls whether the MPE should match log messages after any "new line" characters), source/destination context (e.g., controls how the source and destination of an event are determined), source/client is determined by (e.g., controls how a source is identified), destination/client is determined by (e.g., controls how a destination is identified), and program/service is determined by (e.g., controls how to associate the correct program/service with the log entry). Other attributes include a brief description (e.g., 255 characters), additional details (e.g., roughly 2000 characters), scratch pad (e.g., a temporary area text that can be used in developing rules, but generally not saved), and rule expression (e.g., a tagged regular expression that identifies and parses data from log messages).

To illustrate rule development with respect to parsing tags, default regular expression code may be included as part of the tag. To use the default regular expression code, a tag name should be placed directly between less than (<) and greater than (>) signs. For example, to parse the source IP, one would place <sip> at the point in the log message where the source IP address is located. To parse a login, one would place <login> at the point in the message where the login information is located. The tag generally includes regular expression code to more readily facilitate rule development. An exemplary log message is now shown to illustrate the parsing that is available with the rule development.

Oct 21 15:45:47 Trinity sshd[632]: Failed password for root from 10.1.1.103 port 53495 ssh2

One rule that may be developed to parse the log message would be:

*Failed password for <login> from <sip> port <sport>.*

This rule matches anything up to the words "Failed password for". Afterwards, the rule may match a default regular expression for login, followed by matches for the word "from", the default regular expression for a source IP address and a source port.

Occasionally, customized regular expression may provide more beneficial results than the default regular expression. Accordingly, an MPE may process a more specific rule faster. Implementing such may be done using the expression (?<tag>regex), where tag is the tag name (e.g., sip, dip, sport, login) and regex is the regular expression code used for matching the part of the log data to be stored in the report field associated with the tag. To illustrate, an exemplary log message is now shown with the parsing that is available with the rule development.

Oct 21 15:45:47 Trinity sshd[632]: Failed password for root from 0.1.1.103 port 53495 ssh2

One rule that may be developed to parse this log message would be:

*Failed password for (?<login>\w+) from <sip> port (?<sport>\d+).*

This rule may match anything up to the words "Failed password for". Afterwards, the rule may match "\w+" (e.g., one or more word characters), parse the data as the login field, match "port", and match "\d+" (e.g., one or more digit characters), and parse the data as a source port.

To illustrate sub-rule development with respect to mapping tags, the following log message is provided:

Jul22 02:33:22 deny inbound packet src=66.4.4.2:56543 dst=89.2.2.1:25 prot=6 For this log message, there are five capturable report fields: source IP; source port; destination IP; destination port; and protocol. To capture these 5 fields, a rule may be configured as follows:

deny inbound packet src<sip>:<sport>dst=<dip>:<dport> prot=protnum>

However, this rule may be easily modified as another rule by using mapping tags that, for example, identifies dropped packets to specific servers or ports. In this regard, the rule may use mapping tags to create sub-rules. To do so, the rule may be configured as follows:

deny inbound packet src<sip>:<sport>dst=<tag1>: <tag2>prot=<protnum>

The MPE may accordingly compare the data matched by tag1 and tag2 against a list of sub-rules. If a matching IP address and port number is found, the log message may be associated with the sub-rule. If a matching sub-rule is not found, the base rule may be associated with the log message.

A problem, however, may exist with the modified rule because the <dip> and <dport> tags result in the destination server and destination port report fields no longer being populated. Such may be taken into account via the combination of mapping tags with parsing tags. Generally, there are five mapping tags are available for use shown in the following table:

| Mapping Tag | Matched Characters | Default Regular Expression |
|---|---|---|
| tag1 | 100 | .* |
| tag2 | 100 | .* |
| tag3 | 100 | .* |
| tag4 | 255 | .* |
| tag5 | 1000 | .* |

The default regular expression is the same for each (i.e., ".*") with the only differences being in the amount of data that the expressions match against. When data in a log message is used for both mapping and reporting purposes, it is possible to combine a map tag with a parse tags. The notation for a mapping tag/parsing tag combination is <[maptag].[parsetag]> and an example of such is <tag1.login>. This notation is much shorter than using a defined expression that includes the regular expression code. For example, the notation of a defined expression would be in the format of (?<[maptag].[parsetag]>[regexcode]) and an example of such is (?<tag1.login>\w+). Examples of tags and their associated definitions are illustrated in Appendix A to the patent application. Examples, of regular expressions and their associated definitions are illustrated in Appendix B to the patent application.

The customization of MPE sub-rules is illustrated with the application interface 190 FIG. 12. When creating a sub-rule, unique values for the rule may be assigned including name, default TTL, risk ratings, etc. Log messages matching a sub-rule may be associated with the sub-rule and assume applicable sub-rule values. As mentioned, one difference between creating a sub-rule and creating a base-rule regards the use of mapping tag to enter specific matches of the base-rule based on the data matched by the mapping tags. The sub-rule is generally not directly associated to a message source type. Rather, this association is derived from the base-rule. When creating sub-rules, it is possible to specify wildcard values for a given map tag value. The preferable wildcard character is an asterisk, as is typical in many wildcard notations. The wildcard may be used when the sub-rule is intended to match any value for a specified mapping tag.

Based on such MPE rule configuration, a user can configure an MPE rule that assists in the identification and classification of log messages. For example, when a log message matches an MPE rule, the message may be updated by the log manager to reflect the rule settings for time-to-live and whether the message should be archived. Irrelevant log messages are thereby tagged for removal with other log messages (e.g., those with no reporting value) may be tagged for archival and subsequent removal. Messages that have reporting value are updated with the appropriate time-to-live and are accordingly archived or deleted when time-to-live expires The MPE rules may also assist with event preparation. For example, when a log message matches a particular rule, the log is prepared for analysis, monitoring, and reporting by parsing useful information from the text of the log into reporting fields. Examples of such parsable information include source IP addresses, source names, destination IP addresses, destination names, source ports, destination ports, protocols, and logins. Additionally, users can parse other information into customizable user fields. After the MPE has prepared the event, the log record stored in the log manager is updated. If forwarding is enabled, the log and the parsed report fields are saved in the event manager for use in monitoring, analytics, alarming, and reporting, discussed hereinbelow.

Figure 13:
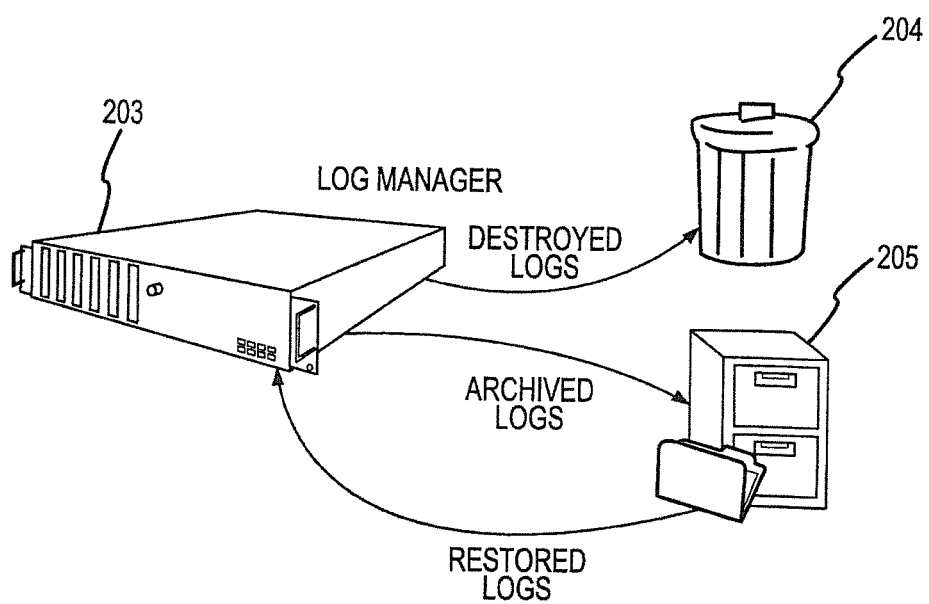
FIG. 13 is a block diagram of a log manager illustrating archival and destruction of retrieved logs.
Figure 14:
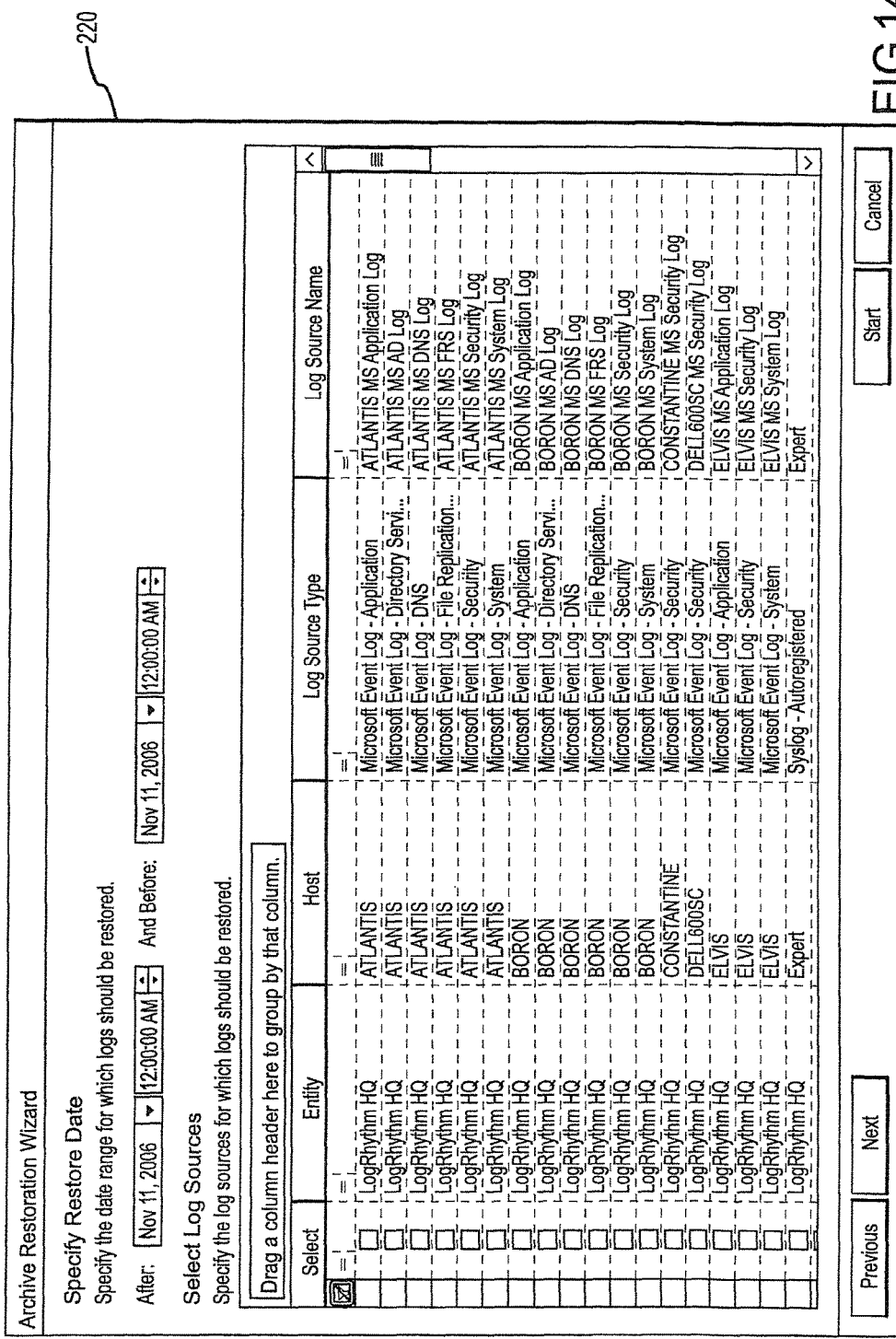
FIG. 14 illustrates an exemplary archive file control interface.

Before discussing aspects of the event manager (e.g., event manager 14 of FIG. 1), however, another aspect of the log manager is now discussed. In this regard, FIG. 13 illustrates archival and destruction of retrieved logs a log manager 203. The log manager 203, according to rule settings described here and above, may automatically archive or destroy certain logs. For example, a user of the log manager 203 may develop a rule that collects a particular type of log message. The log entries may be stored in original form, tagged with meta data, and assigned a "normal date" (e.g., a timestamp of the log entry date synchronized to a Standard Time, such as Mountain Standard Time). The log manager 203 may collect those log messages for a certain period of time and write those messages to archive files In this regard, the log messages may be retrieved (i.e., restored) for viewing thereafter.

In one embodiment, a user may configure customized rules that archive log messages as the user desires. For example, a rule may be configured that writes log messages to an archive file based on various features and/or parameters of the log message (e.g., the IP address and/or the name of the system that generated the message), metadata associated with the log message, date/time, etc. In this regard, a user may retrieve archived log messages according to one or more of these features and/or parameters when desired. For example, a log message that is stored based on its associated metadata may also be treated based on that metadata.

This capability may provide certain advantages in regards to reporting. For example, in light of certain laws, regulations, and/or guidelines, computer use documentation and reporting has now become a requirement to some companies. Examples of such laws, regulations, and guidelines include the Sarbanes-Oxley Act, the Health Insurance Portability and Accountability Act, Gramm-Leach-Bliley Act, the Basel Accord II, the Visa Cardholder Information Security Program, Federal Financial Institutions Examination Council guidelines, the Federal Information Security Management Act, etc. The ability of the log manager 203 to archive log messages may assist in that reporting (e.g., by recording the normal time of a log message that indicates that a certain document that was deleted thereby providing evidence that the document existed). Alternatively, other types of logs may be deemed unnecessary or unwanted after a certain period of time. In this regard, the archival process may be implemented by configuring a rule according to the time-to-live functionality described hereinabove such that logs may be destroyed (i.e., removed from memory 204). Additionally, the time-to-live parameter may be used to implement the archival. For example, a log may remain active for a certain period of time. After that period of time has passed, the log message may be written to an archive file. An exemplary interface for archive restoration or destruction is illustrated the archive restoration interface 220 of FIG. 14.

In one embodiment, the log manager 203 consolidates logs for archival and database 205. For example, a log message may be collected by the log manager 203 over a period of time, such as a year. The data that is conceivably collected during this period may be tremendously large (e.g., on the order of terabytes). To reduce storage requirements, the log manager 203 may simply note the time (e.g., be a timestamp) and/or frequency of the log message within the collection period. Alternatively, log messages may be compressed using data compression means (e.g., by creating zip files) to provide reduced storage requirements. In some instances, log messages may be compressed to 5 to 10% of their original size. In yet another embodiment, log managers may be distributed to provide distributed archival. For example, multiple log managers may be assigned the task of collecting a certain type of log message. The distributed log managers may cooperatively archive these log messages in the manner described, thereby providing increased reporting capability and/or storage capability. Alternatively, storage of the logs may be performed on a separate server (e.g., separate from the log manager 203) so as to provide a larger storage capacity. For example, server and storage architectures may be configured to provide vast amounts of storage and redundancy (e.g., RAID storage systems) that can be communicatively coupled to a log manager to offload the archival processing of the log manager.

In one embodiment, the archiving is performed in real-time. That is, logs that are marked for archive may be archived as soon as the logs are collected. Other logs may be processed according to MPE rules and immediately be deemed unwanted or unnecessary. As such, these logs may be destroyed upon collection (i.e., remove from memory 204). Still, even though such logs may be removed from memory, MPE rules may be configured to record certain information about a particular log such that the log may be reconstructed at a later date. In this embodiment, the archival process may be configured with a local configuration file that provides for event manager database credentials such that events may be constructed from archived logs. Additionally, this configuration file provide for access to the archived logs through log manager accounts.

The archival process may maintain a local state file and periodically update that file. For example, the local state file may include a central state parameter that controls the manner in which log messages are automatically archived in an external archive database. In this regard, the log manager 203 may periodically update the central state parameter in a manner that coincides with the archival objectives of the log manager. Additionally, the archival process may maintain a model of active and inactive archive files. For example, certain log messages from a particular computer system may be consolidated and/or compressed into a single file. This file may be updated with other log messages that are collected from the computer system. When collection of the computer system ceases, the archival process may maintain the file and categorize it as inactive but maintained it for subsequent viewing.

In one embodiment, these archived files are hashed or digitally signed to ensure the files have not been tampered with between writes. One example of a hash is the SHA1. In such an embodiment, the file may be hashed using the SHA1 such that the data of the file may be verified as accurate via a hash fingerprint comparison. In another embodiment, digital signatures may be used to sign archive files. In this regard, public and private digital signature keys may be generated for archive signing (e.g., public/private keys of PGP, Inc.'s encryption algorithms). The private key is used for signing archive files and may remain in memory until new keys are generated. The public key and associated parameters may be stored in a table maintained by the event manager database such that other processes can verify the integrity of archive files via the digital signature verification mechanism. New signing key pairs are periodically generated. For example, signing key pairs may be generated each time a new archiving process starts or after a certain period of time has been reached (e.g., a digital signature maximum age configuration parameter as determined by a predetermined retirement date for the digital signature).

In one embodiment, active archive files are protected with a SHA1 hash code, or fingerprint. The SHA1 hash fingerprint is used by the archiving process to ensure that active archive files are not tampered with between writes. The collection of SHA1 hashes for the active archive files is persisted to disk if the archiving process is shut down to be read when the archiving process is restarted. Once an active archive is changed to an inactive archive file, the inactive archive file may be digitally signed and then compressed. The inactive archive file is generally signed with the private key of a private-public key pair. The public key of this pair along with additional data describing the archive file (e.g., filename and/or file meta-data) is stored in the event manager database for use in later signature verification. When the inactive archive file is accessed for log message restoration purposes, the public key along with the signature data in the event manager database may be used to verify the file signature. If the signature verification succeeds, the inactive archive file is opened and the logs within are restored for analysis. If the signature verification fails, the user is notified that the file has been tampered with and the file is moved to a quarantine location.

Figure 15:
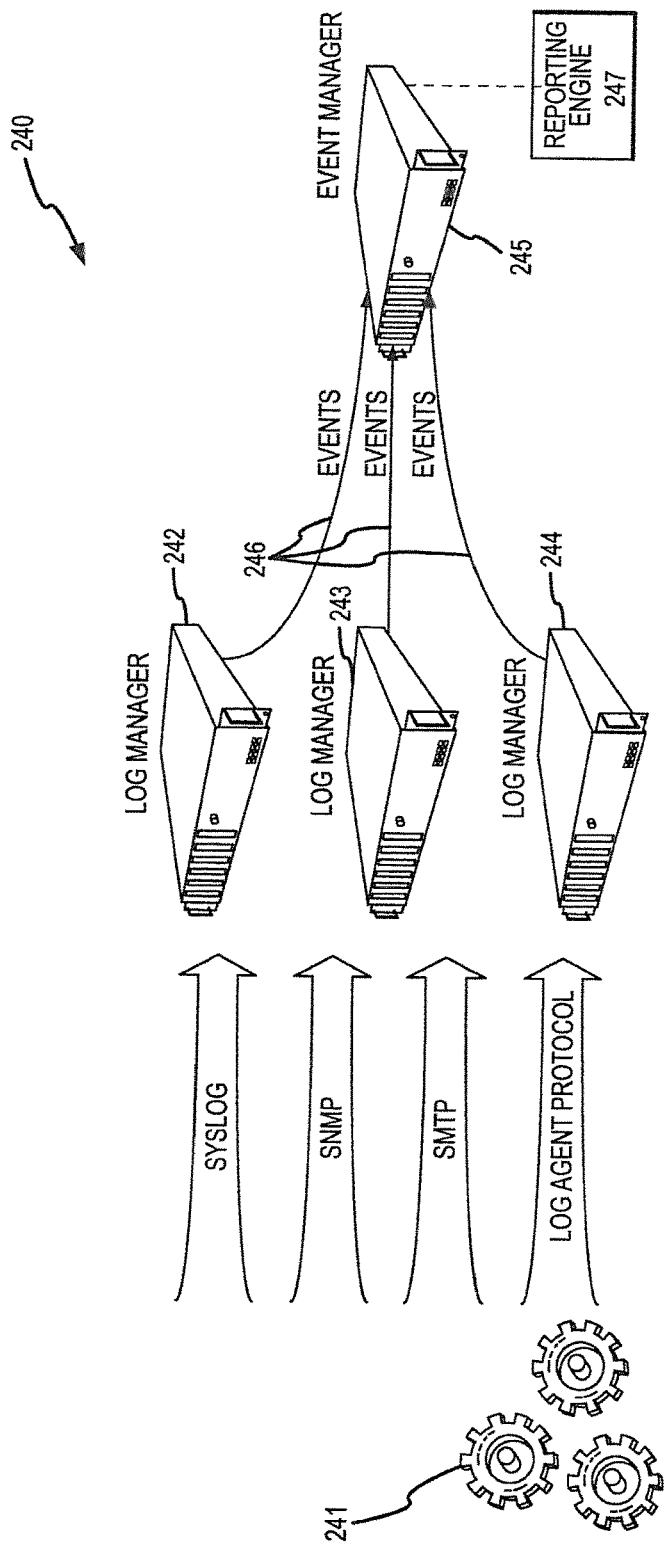
FIG. 15 is a block diagram of an event manager operable within a log management system.

Turning now to FIG. 15, the discussion of the log management system is directed to the event manager 245. In FIG. 15, a log management system 240 includes the log managers 242-244 configured for receiving log file data via various protocols (e.g., syslog, SNMP, SMTP, the log agent 241 protocols, TCP/IP, Netflow data, etc.). In this regard, log managers 242-244, and for that matter the log agent 241, may provide all or a portion of the log message collection and processing functionality as described herein above. Accordingly, the focus of the discussion is placed on the events 246 that are generated by the log managers subsequent to the processing of the collective log messages. For example, certain log messages processed and stored in a log manager may be identified as interesting or special by the log manager based on user configurable rules and policies. Any log entry corresponding to one of these rules may then be promoted to an event by the log manager. Generally an event consists of the original log entry plus a set of normalized data fields, such as IP addresses or a login name extracted from a log of interest. The most interesting events can be forwarded to the event manager for processing and potential alarm generation. Other less interesting events may remain at the log manager for forensic analysis & reporting purposes.

Figure 16:
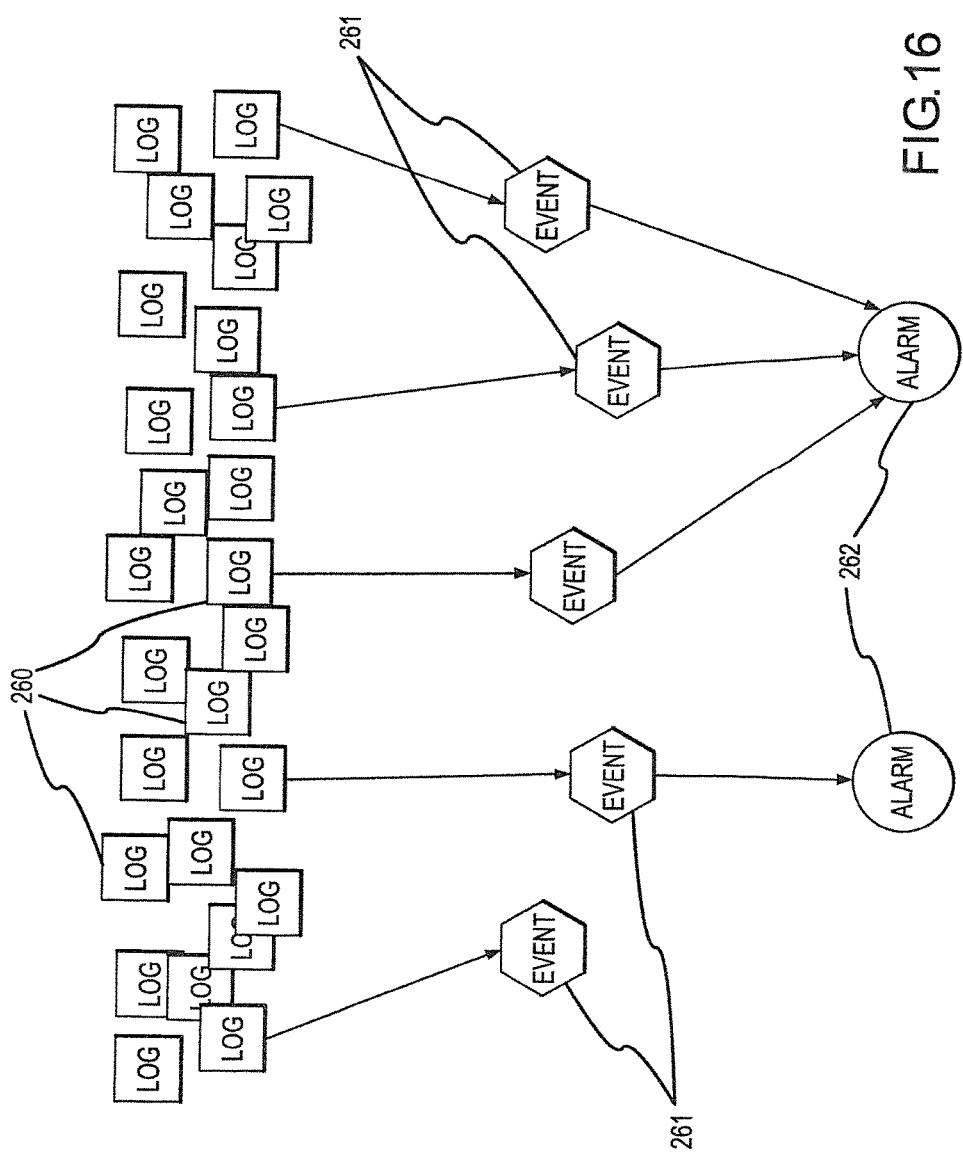
FIG. 16 illustrates a flow of data originating as log messages and culminating as alarms.

To illustrate, FIG. 16 shows a plurality of logs 260 being generated, for example, by a number of computer systems. The logs 260 are forwarded to the log managers 242-244 for processing. As the log managers 242-244 process the logs 260, certain events 261 may be extracted therefrom. Generally, each of the events 261 may be processed by the event manager 245 to determine whether alarms 262 should be generated. As illustrated, in FIG. 16, not all events are deemed alarm worthy. Rather, certain events may be processed by the event manager 245 to determine any potential informational value of the event. For example, the event manager 245 may cache a particular event to observe re-occurrence.

Other events may be simply made available/visible to a user in real time and removed immediately thereafter. For example and turning now to FIG. 17, the event manager may include a "dashboard" 270 that provides a view into events. Additionally, the dashboard 270 may be configured with analysis tools that provides various metrics (e.g., the frequency of a particular event—views 273, the number of events and their classifications—the view 271, the relative breakdown of events by type—the view 272, and the relative breakdown of events by direction—the view 271) such that an operator (e.g., IT personnel) of the event manager can make various decisions. For example, certain events or series of events may be promoted to alarm status based on user specified alarming rules and policies. Accordingly, an alarm may be generated based on these rules and policies to alert the operator to take action. In this regard, for any event to be considered for alarm generation, the event is generally forwarded to the event manager.

Figure 18:
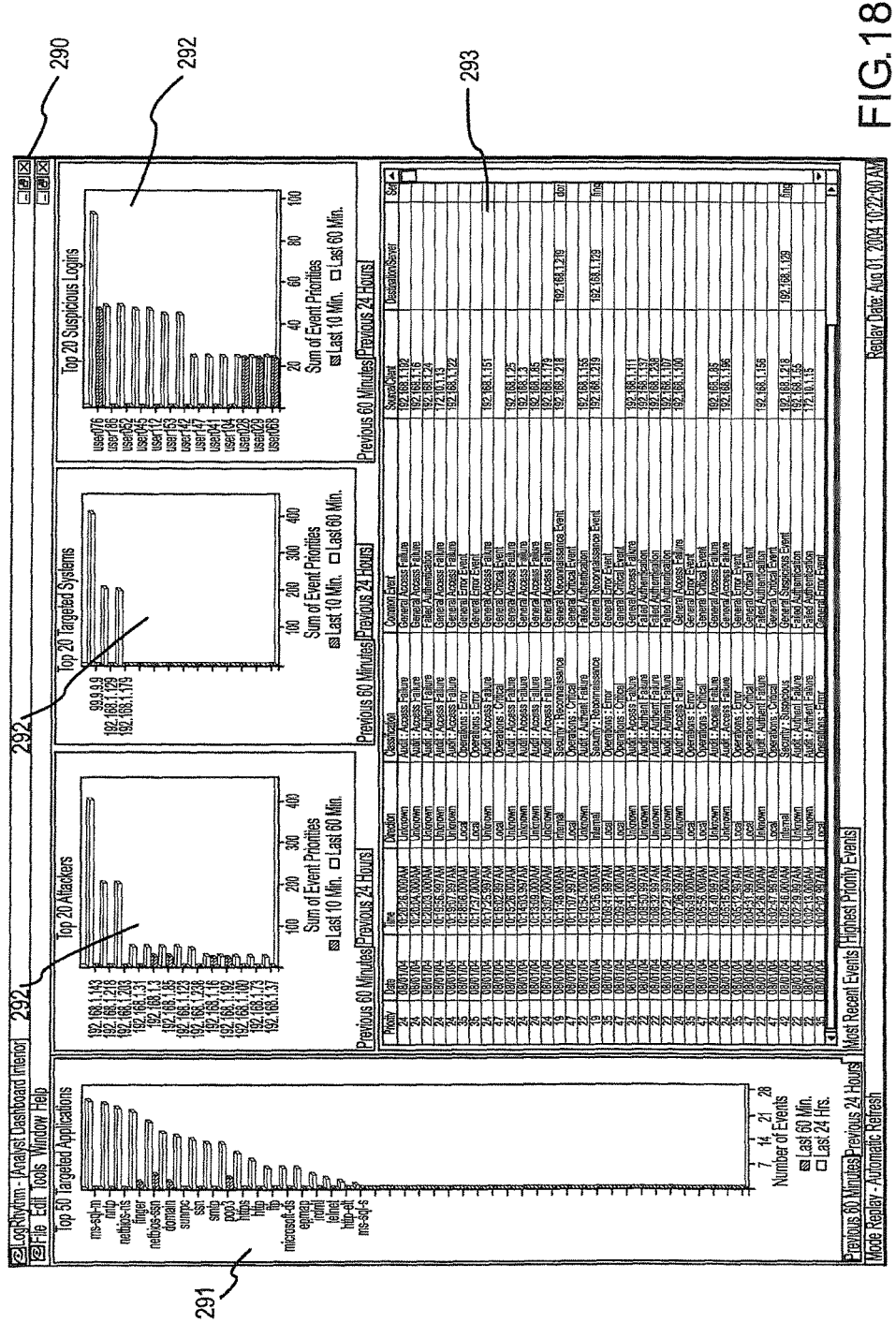
Figure 19:
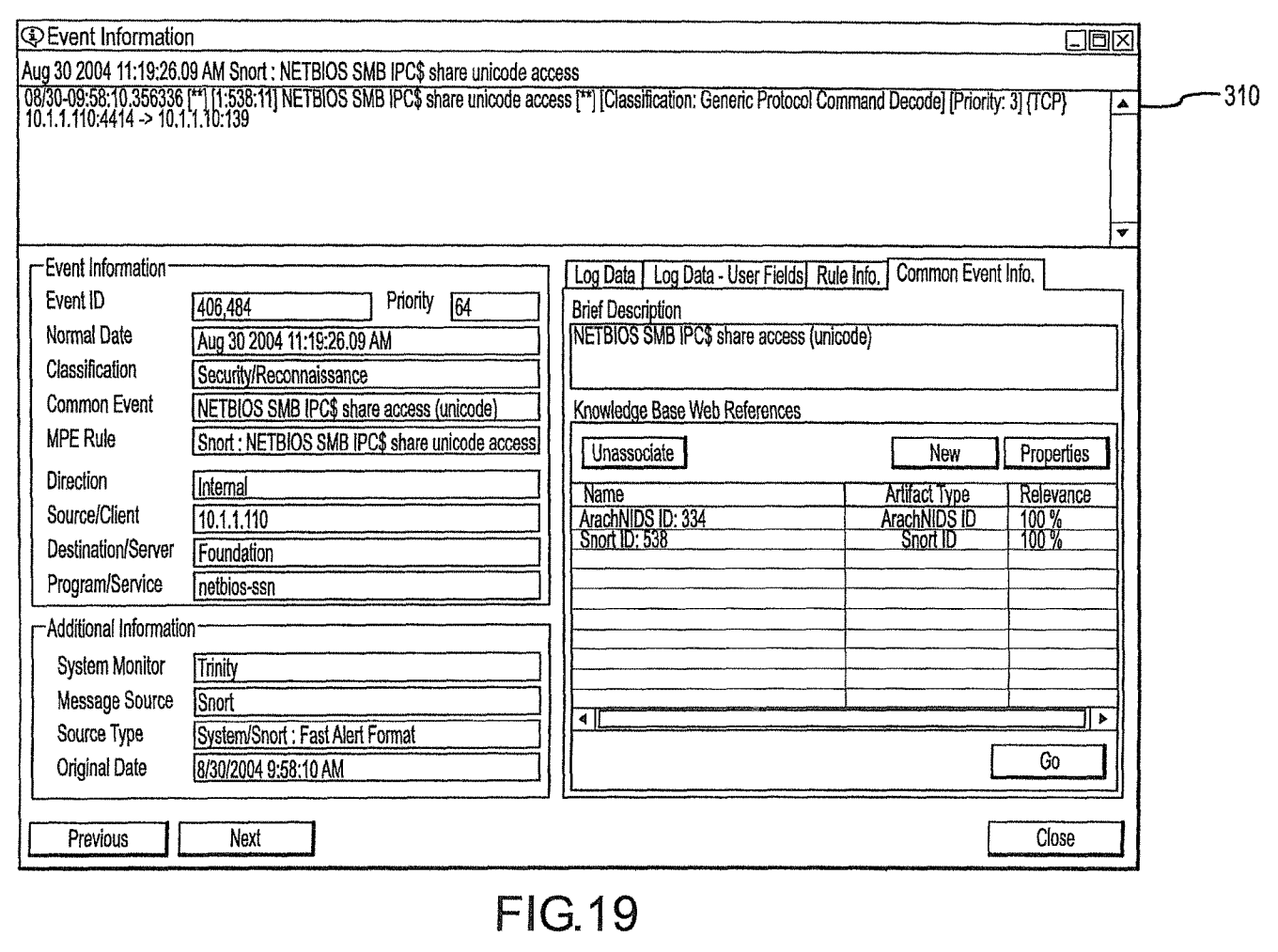
Figure 20:
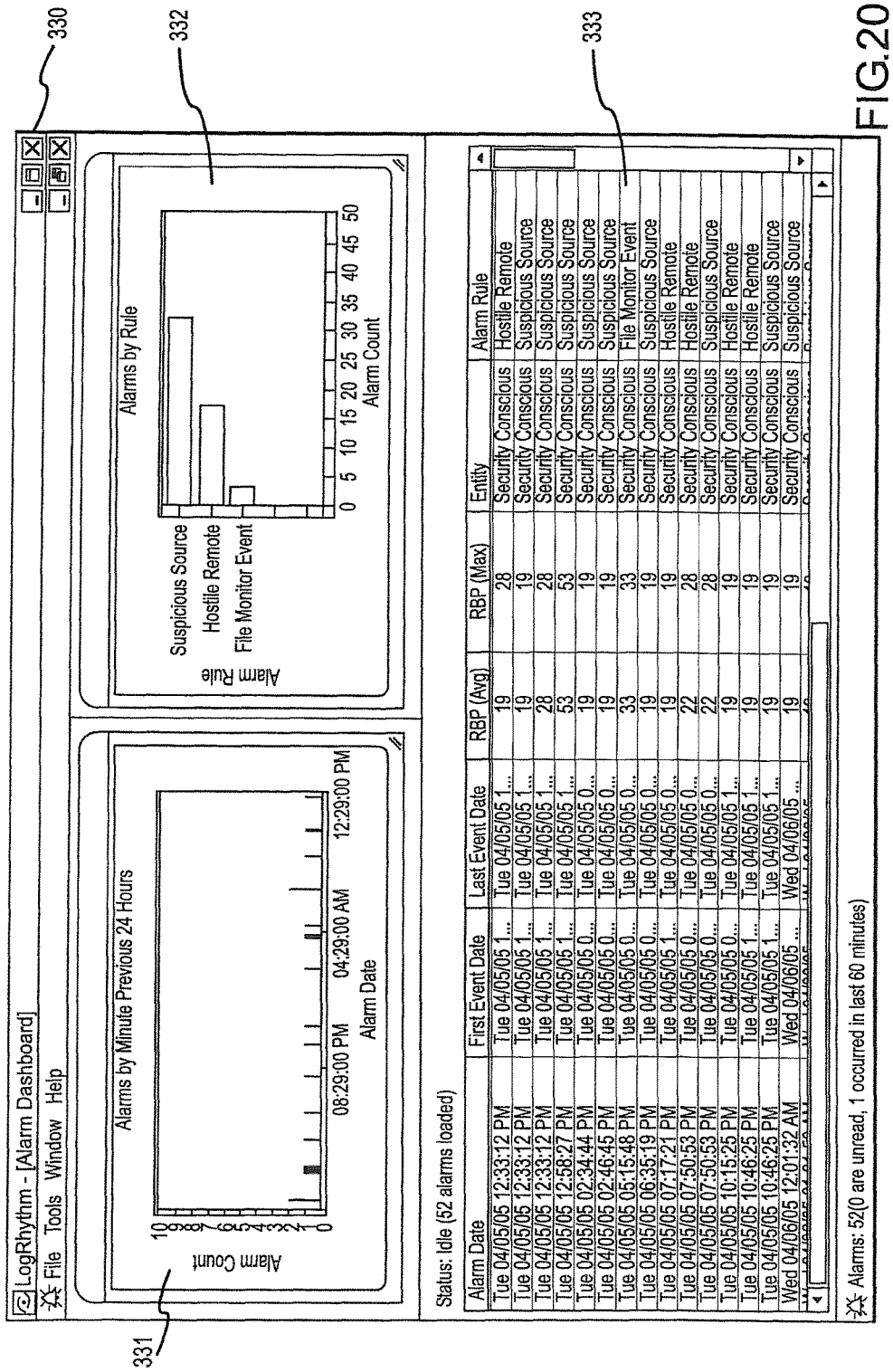
FIG. 20 illustrates a dashboard interface to alarms that are generated from certain events.

FIGS. 18 and 19 illustrate other interfaces that are accessible by the dashboard to provide additional information to the operator. For example, in FIG. 18 the dashboard interface 290 provides event information pertaining to targeted applications (e.g., events that may generate alarms indicating an attack on certain software and/or hardware applications, such as a hack on a web server) in view 291. In the views 292, information on activity originating inside a network is displayed to the operator (e.g., an internal network user accessing unauthorized information). In this embodiment, the views 292 provide a ranked compilation of log activity for the top 20 IP addresses suspected of attacking the network, a ranked compilation of log activity for the top 20 IP addresses suspected of being attacked, and a ranked compilation of log activity for suspicious logins (e.g., an unauthorized user attempted to gain access through another user's login). Additionally, the interface 290 may provide the view 293 to illustrate a summary of the most targeted applications and systems with sortable fields that include, among other things, a priority ranking of the events, the dates and times of the events, the direction of the log activity (e.g., attacks on the network or unauthorized access attempts to the network), the type of event that resulted from the log activity, the source of the log activity (e.g., the IP address of the system causing the event), and the intended destination of the log activity (e.g., the IP address of the targeted system).

More detailed information regarding the above-mentioned events may be obtained with the event information view 310 (seen in FIG. 19). This view may be accessed by selecting a particular event, for example, from the view 293 of the dashboard interface 290. For example, the interfaces described herein (e.g., dashboard interface 270, dashboard interface 290, etc.) may be graphical user interfaces operable within the context of a software application. In this regard, a user wishing to access more detailed information pertaining to a particular event they simply mouseclick on the event to bring up event information view 310. Examples of the more detailed information that the event information view 310 may provide include an event ID number, the identification of monitoring system (e.g., the log manager/log agent), and MPE rule used to flag log activity as an event.

Figure 17:
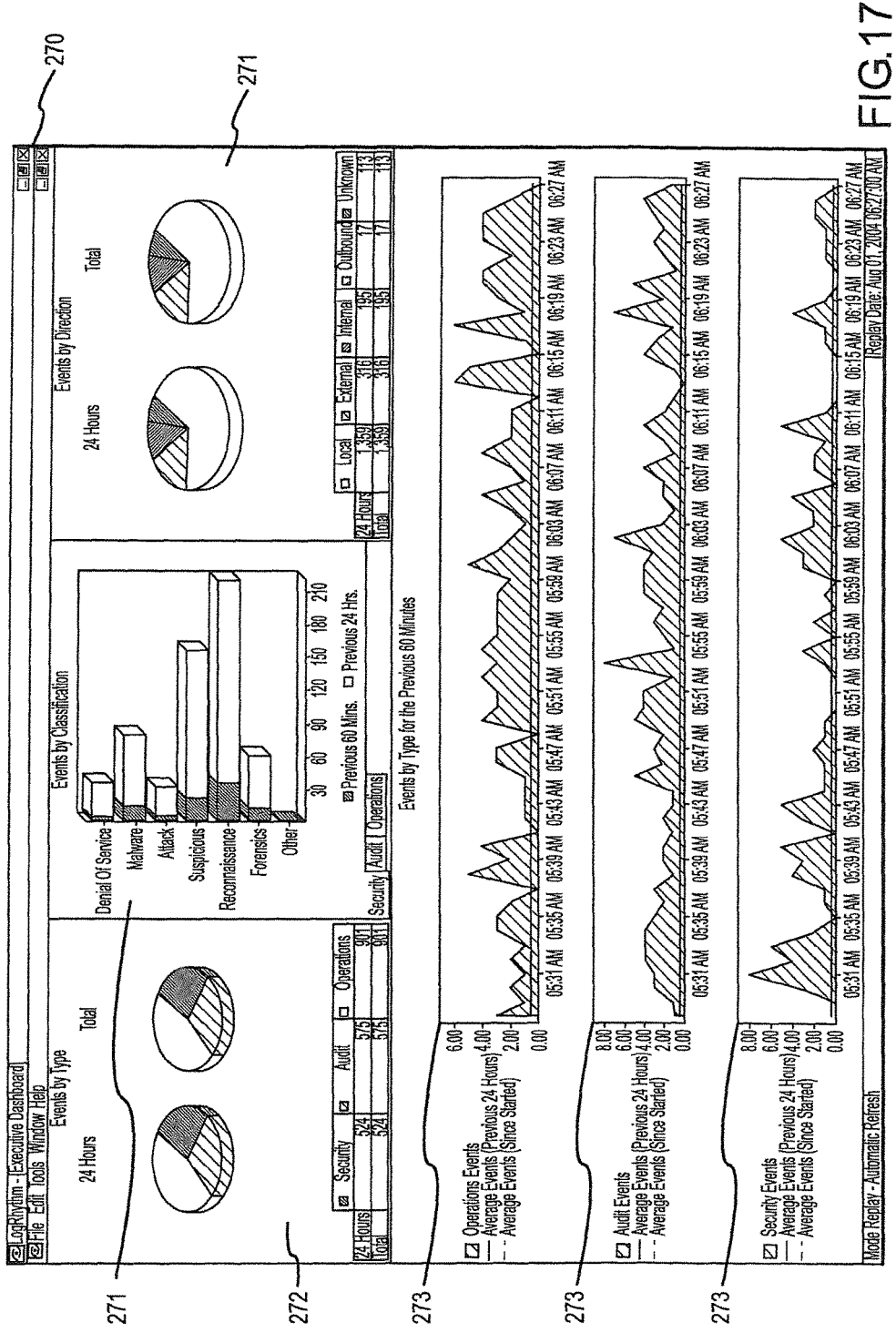
FIG. 17 illustrates a dashboard interface that provides a real-time view into event collection by an event manager.

Similar in design to the event dashboard 270 of FIG. 17, the alarm dashboard 330 provides a view into the alarms generated by various events. For example, rules may be configured with the event manager 245 to process events transferred from various log managers connected thereto (e.g., log managers 242-244). In this regard, the event manager 245 may determine that certain events require immediate attention and automatically generate an alarm message to notify relevant personnel. Alarm rules can be created based on essentially any combination of event data, such as an event type, a targeted host, and/or a particular application. For example, an alarm rule may be configured to generate an alarm whenever an event indicates that a terminated user account is being used.

The alarm dashboard 330 is illustrated, in this embodiment, with various views to provide alarm information to a user of the dashboard. For example, the view 331 provides a raw count of alarms generated within a selected time (e.g., 24 hours). The view 332, however, provides some general information pertaining to those alarms. For example, the view 332 may indicate that certain alarms are associated with suspicious sources activity, hostile remote activity (e.g., denial of service from external sites), and unauthorized accesses (e.g., file server monitoring) as designated by alarm rules. The view 333 provides even more information pertaining to alarms. For example, the view 333 may show the timestamp of a generated alarm, how the alarm relates to various events, and the associated activity as designated by the alarm rule.

Alarm rules described herein are generally of two types, default alarms and user configurable alarms. For example, certain alarms may be provided with the event manager to automatically alert a user of a certain event without user feedback. Such alarms would generally be those that a user would find exceptionally important, such as a denial of service attack, attempted unauthorized access to a file server, etc. Other rules, however, may be customized according to a user's desires. Additionally, alarm rules that are customized to flag certain events may also be managed in a customized fashion. For example, FIG. 21 illustrates a rule manager interface 340 that shows a user the present customized rules that are being implemented by the user. In this regard, the interface 340 may allow a user to edit a particular rule to generate alarms and other matters.

Although shown and described with respect to an alarm being displayed with the alarm dashboard 330, the invention is not intended to be limited to such alarm notification. Rather, event manager 245 may automatically communicate alarms to one or more responsible authorities (e.g., IT personnel, security officers, company officers etc.). In this regard, certain generated alarms may be associated with individuals or groups. For example, a denial of service alarm may be associated with IT personnel to alert them so that they may take appropriate action. In contrast, an attempted unauthorized access into a network account may alert a security officer of the attempt without the need for interaction by IT personnel. While the means for communication of the alarms may vary, one exemplary implementation of such communication may be e-mail. For example, many portable devices are capable of wirelessly receiving e-mail (e.g., cell phones, Blackberries by RIM, etc.). Accordingly, the event manager may automatically send e-mail addresses to such wireless accounts to rapidly alert appropriate personnel.

Generally, alarms provide real-time alerting functionality with less analysis capability. Such is the case because alarms in general are provided for immediate attention and/or rapid response. However, longer term trends are often desired. For example, a business may be required to report certain events occurring in their network (e.g., unauthorized access to banking networks). In this regard, the utility of the present invention also provides for certain analysis and reporting features that may be used to illustrate such trends.

In one embodiment, the event manager may be configured with a reporting engine that detects statistical features of events so as to generate alarms. For example, the event manager 245 of FIG. 15 may include a software component (e.g., reporting engine 247) that detects the events 246 transferred from log managers 242 through 244. Certain events may include unique information that the reporting engine 247 analyzes to determine if the information is reoccurring. In this regard, the reporting engine 247 may determine that certain events over a period of time are similar and indicative of a trend. The reporting engine 247 may generate an alarm that alerts a user to the trend or departure from a known trend so that appropriate measures may be taken. To further illustrate, an event may be transferred that includes information pertaining to a computer system user that is attempting access to a restricted file or computer. Each of the generated events may not be necessarily worthy of generating an alarm. However, over time, the events may accumulate to form a sort of pattern that may be worthy of an alarm (e.g., the same person attempting access to many different restricted files over a period of time or a group of people continually attempting access to a particular restricted file). Accordingly, the reporting engine 247 may generate alarm that represents such information so that the appropriate personnel to address the situation.

The reporting engine 247 may include an interface (e.g., a GUI) that enables a user to customize alarm generation. For example, various events statistics (e.g., frequency of events, duration of events, type of events, dates of events, etc.) may be selected and/or combined by a user through the interface. These alarm configurations may be stored as rules with the reporting engine. Accordingly, the reporting engine 247 may detect events over a period of time that correspond to the selected events statistics and generate alarms therefrom.

Figure 22:
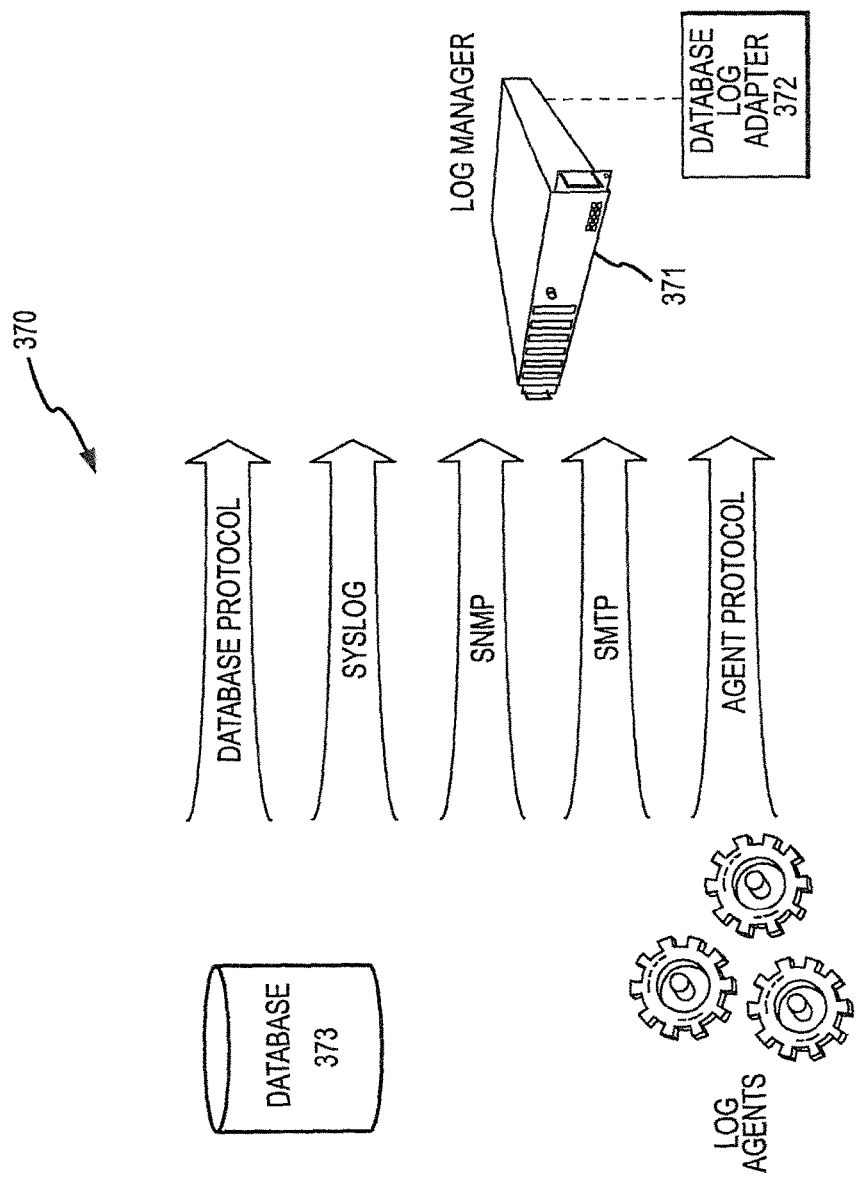
FIG. 22 illustrates a log manager configured with a database log adapter that communicates with a database.

In another embodiment and as seen in FIG. 22, a log management system 370 is configured with a log manager 371 that receives log messages from a database 373. In this regard, the log manager 371 may include a database log adapter 372 that processes log messages of the database 373 transferred through a database protocol. The database log adapter 372 may be configured to process various types of database protocols to provide a sort of generic capability such that the log manager 371 may communicate with a variety of different database types. For example, the database log adapter 372 may be configured to communicate using ODBC (Open Database Connectivity), JDBC (Java Database Connectivity), ADO (Active-X Data Objects) etc. The database log adapter 372 may, therefore, communicate with a variety of databases to retrieve and collect logs of those databases. Examples of such database logs include Oracle audit logs, DB2 system logs, SAP application logs, SAP general ledger logs. Generally, the user will specify how to connect to the database 373 to begin collection of logs contained therein. Examples of parameters that may be used to establish an authenticated/secure session with the database 373 include the database type (e.g., Oracle, SQL Server, DB2, MySQL, Other, etc.), database server ip address, database name, login, password, encryption key (e.g., the digital signature as described hereinabove). Additionally, the user may specify log collection parameters used to govern how and when logs are collected. Examples of such include the maximum number of logs to collect and transmit in a single batch, maximum logs to collect per minute, start and end log collection times (only collect between 5:00 PM EST and 6:00 AM EST), and whether logs should be deleted from the source database after collection.

The operation of the database log adapter 372 generally includes communicatively connecting to the database 373 and determining previously recorded or user specified state information to ascertain whether any first log message should be queried. Then, the database log adapter 372 may use a log entry query statement combined with previously acquired state information to collect a next batch of log messages that should be collected. If no state information exists, the database log adapter 372 may return the first available log message and convert the log message into its text log representation. The database log adapter 372 may then forward the text log along with other information to message processing engine of the log manager 371 (e.g., MPE 54 of FIG. 3). Additionally, the database log adapter 372 may update state information and check configuration parameters to determine whether the database log adapter should continue collecting log messages.

While the database log adapter 372 may be configured to communicate directly with the database 373, a log agent (e.g., log agent 50 of FIG. 3) may be configured with the database 373 or even a remote server that communicates with the database 373 to transfer log messages (i.e., via database protocols) to the log manager 371. As with other embodiments described hereinabove, the log messages transferred via the database protocol may be encrypted by the log agent.

The database log adapter 372 may allow a user to identify log messages that are to be collected. Additionally, the database log adapter 372 may allow the user to record the date/time in which the log messages are detected. In one embodiment, the date/time is implemented relative to other log entries. That is, each log message may have a date/time stamp with subsequent log messages having incremental date/time stamps. Additionally, the database log adapter 372 may be able to track previous log messages and determine which log message is next in series. Such may be useful in "persisting" state information regarding the collection of log messages.

Generally, any user can specify how each log message row is to be formatted. The formatting may determine how each field in a log message may be used to create a single text log entry. When formatting the log message, the user will generally specify which fields of the log message should be included when preparing the text log, the order in which each field should appear in the text log, and, for each used field, any text based characters that should precede or follow the field when preparing the text log.

Figure 23:
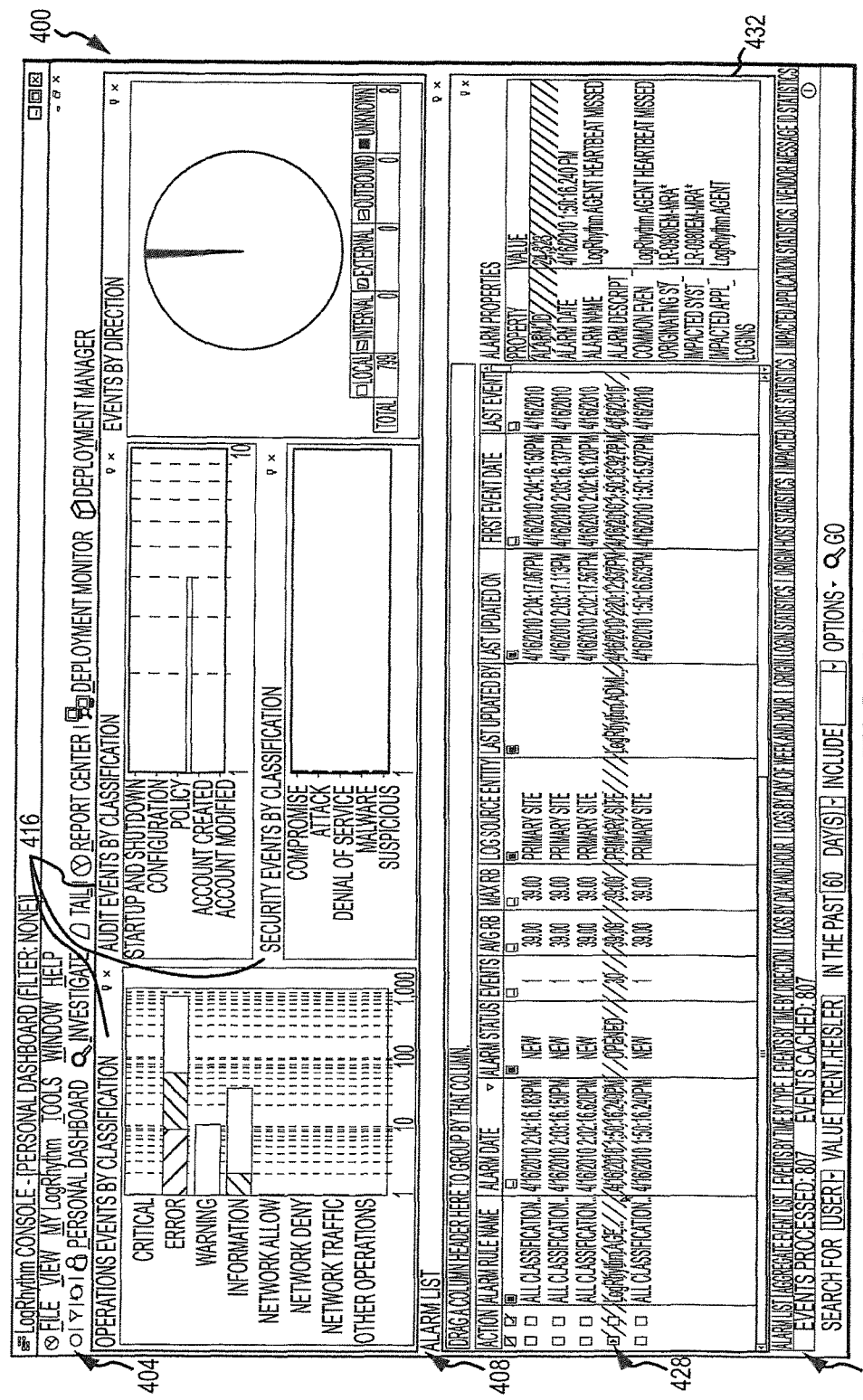
FIG. 23 illustrates a user interface that provides a view into logs received at one or more log managers and events generated therefrom that are subsequently processed by the event manager, and access to various analysis tools and other features that allow one to obtain useful information from processed logs and events.

FIG. 23 presents a user interface 400 that provides a view into logs received at one or more log managers, events generated therefrom that are subsequently processed by the event manager, etc., and provides access to various analysis tools and other features that allow one to obtain useful information from processed logs. The user interface 400

(and other user interfaces and dashboards disclosed herein) may be embodied as part of a console or software package that may be run or otherwise manipulated on any appropriate computing device or system It is envisioned that the user interface may be extended to web-based, mobile devices, and the like. Such a console or software package may be in appropriate communication with the various log managers, event managers, etc. disclosed herein to acquire information in relation to logs, events, alarms, and the like.

Moreover, the user interface 400 (and other dashboards and user interfaces disclosed herein) may be presented on a display associated with the computing system, where the computing system includes memory (e.g., RAM) that stores data and instructions (e.g., logic) and at least one processor (e.g., CPU) that executes instructions and processes data from the memory. For instance, logic may be implemented to process received logs against a rule base, parse the processed logs and associate metadata with the parsed portions, generate events, etc., all as discussed previously. In any event, the at least one processor may retrieve instructions and other data from one or more storage devices (e.g., hard drive, flash drive) before loading such instructions and other data into the computer memory. The processor, memory and storage device may be connected by a bus in a conventional manner. While the present disclosure is discussed as being implemented in the context of one or more computing systems or devices including interconnected memory modules, processors, and the like, it is envisioned that the various utilities disclosed herein may also be implemented or otherwise carried out by any future computing technologies and/or processes.

The user interface 400 may broadly include a control panel 404 including any appropriate number of user manipulable iconic features (e.g., buttons, tabs, drop down menus) for choosing among various types of tools, a presentation area 408 for presenting a graphical display (e.g., line and bar graphs, itemized lists, pop-up windows) of logs, events, alarms, users, analyses, etc. according to the type of tool selected in the control panel 404, and a navigation area 412 for adjusting the graphical display within the type of tool selected and for searching for logs/events according to user selected criteria. As will be appreciated below, much of the information in the presentation area 408 may be appropriately manipulated (e.g., via double-clicking with a mouse on the icons, tables, graphs) to "drill-down" into the information to obtain more detailed information.

With continued reference to FIG. 23, a "personal dashboard" button has been selected in the control panel 404 which broadly provides summary type information in relation to logs, events and alarms. For instance, the personal dashboard may provide users with a real-time visibility into compliance/audit, security and operations related events any alerts as well as access to raw log data from millions of logs to a single screen. From the dashboard, users can perform the numerous activities such as but not limited to, launching investigations, customizing alerts and drilling down into normalized and raw log data, all while maintaining user added tracking for compliance and reporting purposes. Additionally, the personal dashboard allows users of differing functional roles to receive actionable alerts and real-time events that are meaningful and applicable to their specific job function or responsibility. Alerts can be delivered via, for instance, the dashboard or via numerous other mechanisms including SMTP and/or SNMP.

For instance, events (i.e., logs that have matched one or more rules or processing criteria and have thus been forwarded from a log manager to the event manager) may be classified according to any appropriate classification scheme or structure. More specifically, as part of the processing of incoming log messages by the log managers (e.g., processing the logs against a rule base), log managers may tag logs using a granular three-tier classification model that may enable users to perform intelligent searches on the processed logs and events. In this regard, the impact of events may be assessed in multiple dimensions to allow the extraction of meaning from the events for what may otherwise appear to be simply isolated blocks.

As seen, the presentation area 408 may include a number of views 416, each view 416 providing a numerical breakdown (e.g., via a bar graph or the like) of events according to operations events (e.g., critical event, system error, warning), audit events (e.g., administrative account creation, failed authentication), or security events (e.g., compromise, attack, denial of service). Within each of the views 416, the particular classification may be further broken down into sub-classifications, sub-sub-classifications, etc. If a user desires to obtain more detailed information about the events making up a particular sub-classification, the sub-classification may be appropriately manipulated (e.g., double clicked on).

Figure 24:
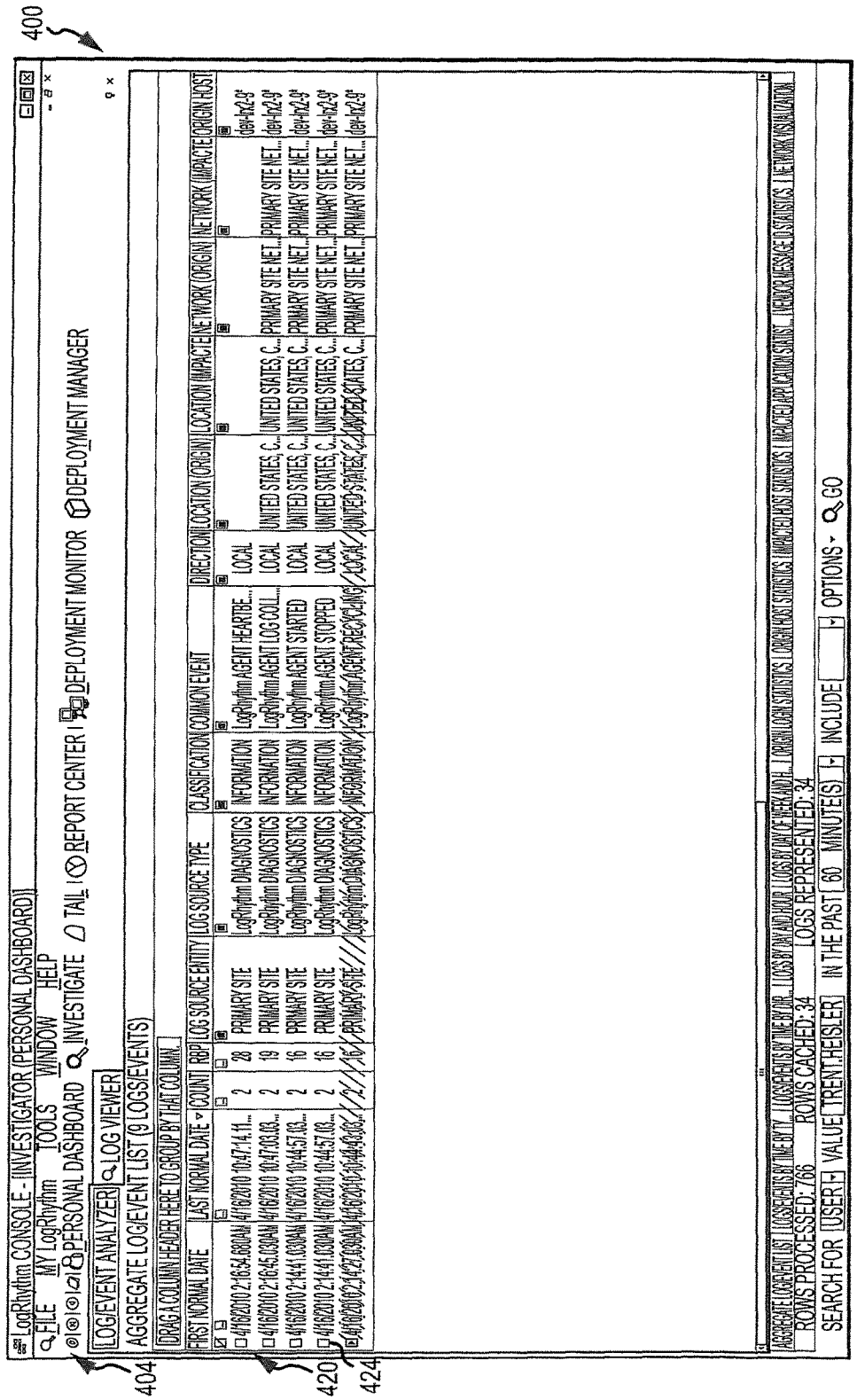
FIG. 24 illustrates an itemized list of events as a result of "drilling down" into the "Operations/Information" classification in a view from FIG. 23.

Turning to FIG. 24, the "information" sub-classification in the operations events view 416 has been manipulated to provide a view 420 including an itemized list of the operations/information events. Each line may represent a single log/event or an aggregated log/event that counts a number of occurrences of what is essentially the same or similar log/event. More specifically, each of the occurrences of the log/event may have identical or similar properties. As shown, first and last (e.g., normal) date may be presented as well as total count. It should be appreciated that the logs shown in the various screenshots presented herein may be generated by components and/or processes of internal systems (e.g., systems associated with a particular log manager or the like), external/outside systems (e.g., systems that are separate from a particular log manager or the like), and the like.

As another example, a risk based priority ("RBP") for the events/logs in line 424 is 16. For instance, logic associated with the log manager, event manager, or other module in the system may automatically prioritize each event based its impact to business or other organizations operations. In one arrangement, the RBP may be based out of a maximum of 100 possible points and may be based on criteria such as the type of event, the likelihood that the event is a false alarm, the threat rating of the host causing the event (e.g., remote attacker), and the risk rating of the server on which the event occurred. As one example, a router link failure might not be immediately critical for an Internet service provider with redundant routers. However, business may be impacted indefinitely for a branch office with only a single router. As another example, a server reboot may be uninteresting if seen on a user workstation. However, a server reboot may be extremely interesting when seen from a server that has 99.999% uptime requirements.

Turning back to FIG. 23, another view 428 in the presentation area 408 may provide a real-time itemized list of alarms in chronological order that have been generated by the event manager. Similar to the view 420 in FIG. 24, each of the lines in the view 428 represents an alarm including the date and time the alarm was generated, events that makes up the particular alarm, the first event that makes up the particular alarm, etc. By appropriately manipulating any of the lines in the view 428 (e.g., single clicking), summary properties of the selected alarm may be displayed in another view 432. As seen in FIG. 23, the view 432 may provide information regarding the alarm such as any appropriate alarm ID, the alarm date, the name of the alarm, etc.

Additionally, any of the alarms in the view 428 may be appropriately manipulated (e.g., double-clicking) to "drill down" into the particular alarm to view logs and events that make up that particular alarm. For instance, FIG. 25 includes a view 436 with an itemized list of logs processed as common events (e.g., each of the logs matched the same log processing rule). Thus, the alarm generated and shown in the view 428 in FIG. 23 was generated and/or otherwise designated from one or more of the events represented in the view 436 of FIG. 25. For instance, the alarm rule may require that the particular alarm be generated when the common event shown in view 436 in FIG. 25 has occurred a particular number of times (e.g., 5 times). Once the particular threshold has been reached, the event manager may generate the alarm which may then be displayed in the view 428 in the presentation area 408 of the personal dashboard (and stored in any appropriate database). Note that additional common events or other events making up the particular alarm may be added to the "events" column of the particular alarm in the view 428 in FIG. 23. In this regard, a running total of events making up the particular alarm may be stored and displayed for use by personnel.

Figure 25:
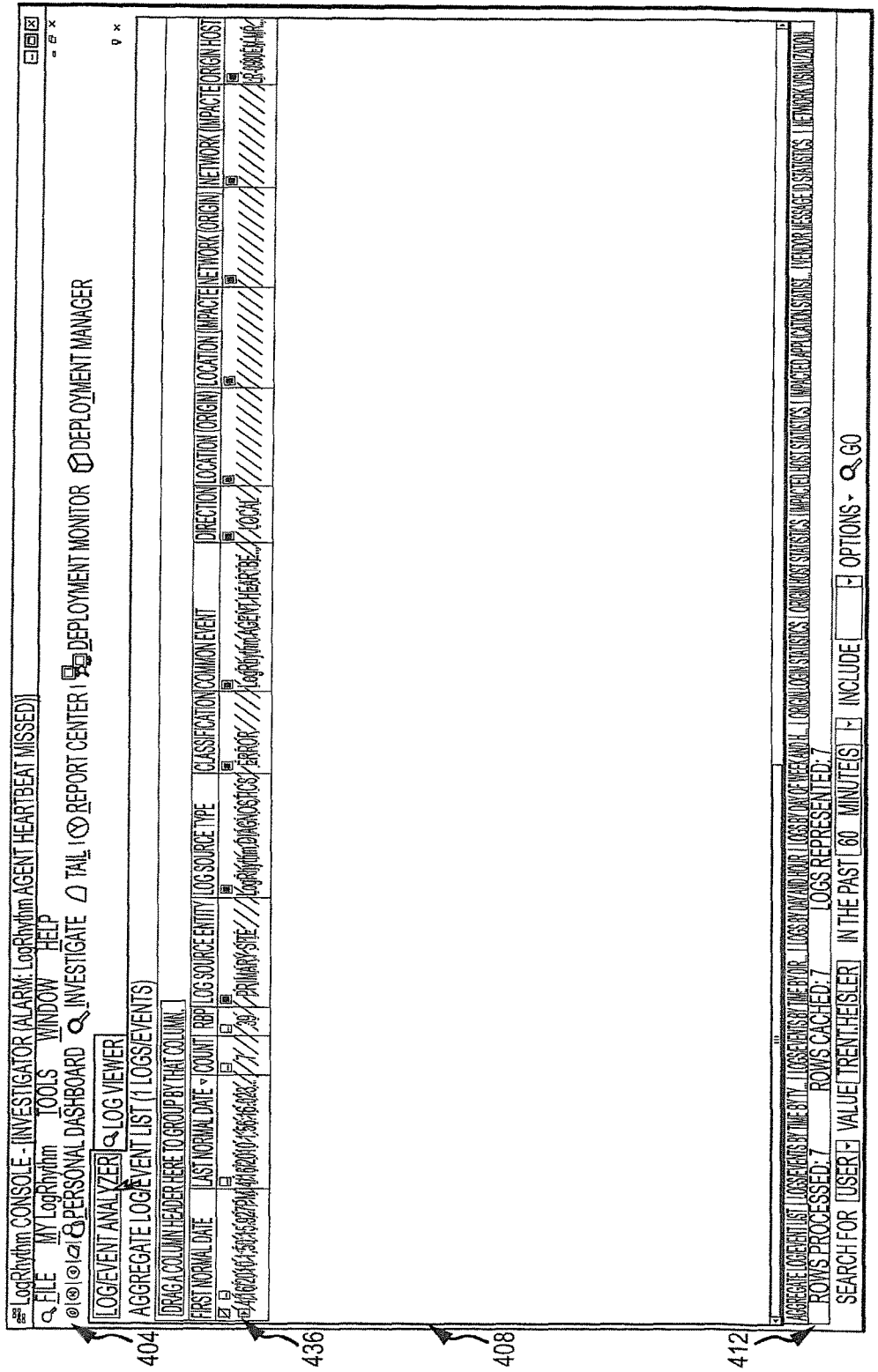
FIG. 25 illustrates an itemized list of events as a result of "drilling down" into an alarm list in a view from FIG. 23.
Figure 26:
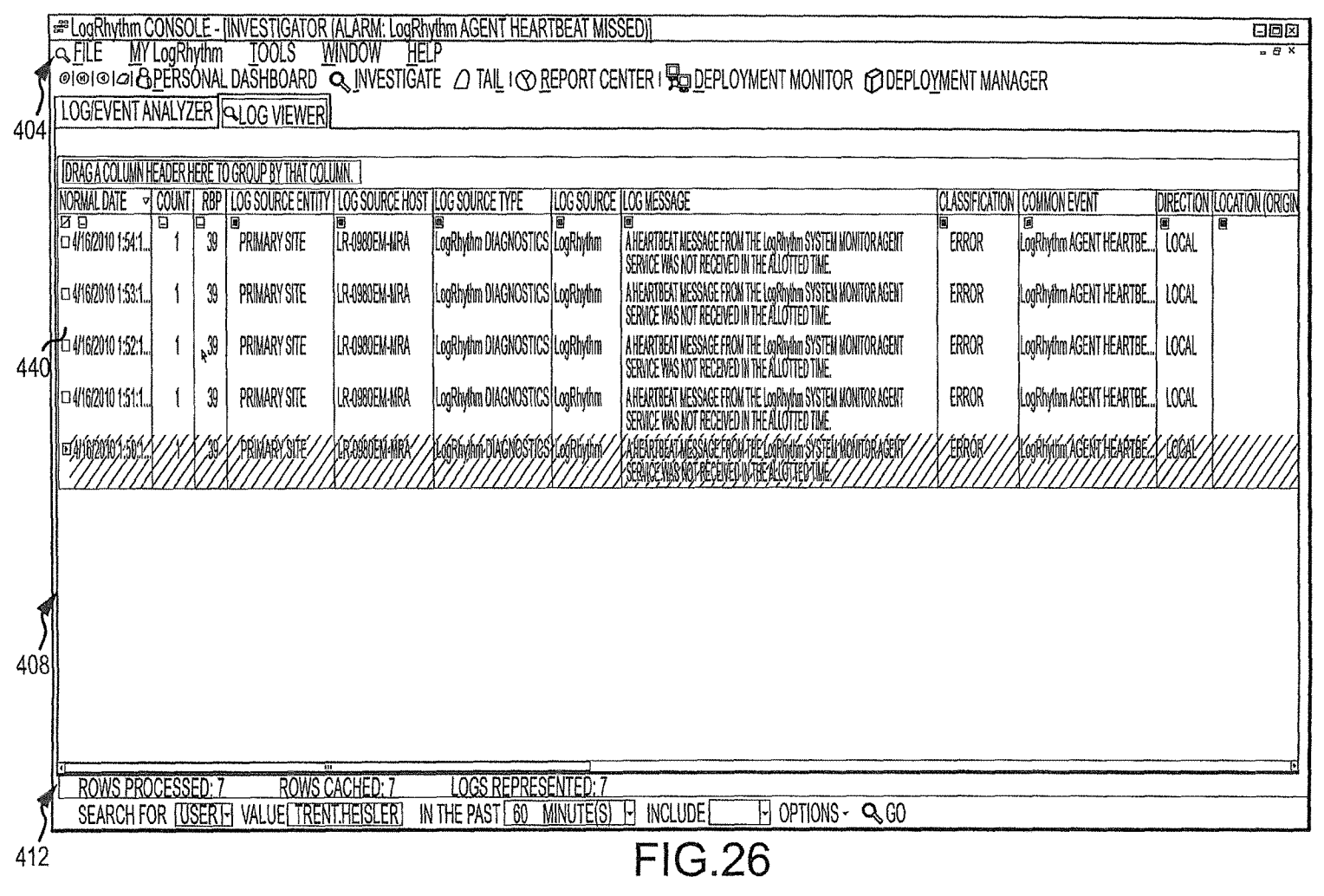
Figure 27:
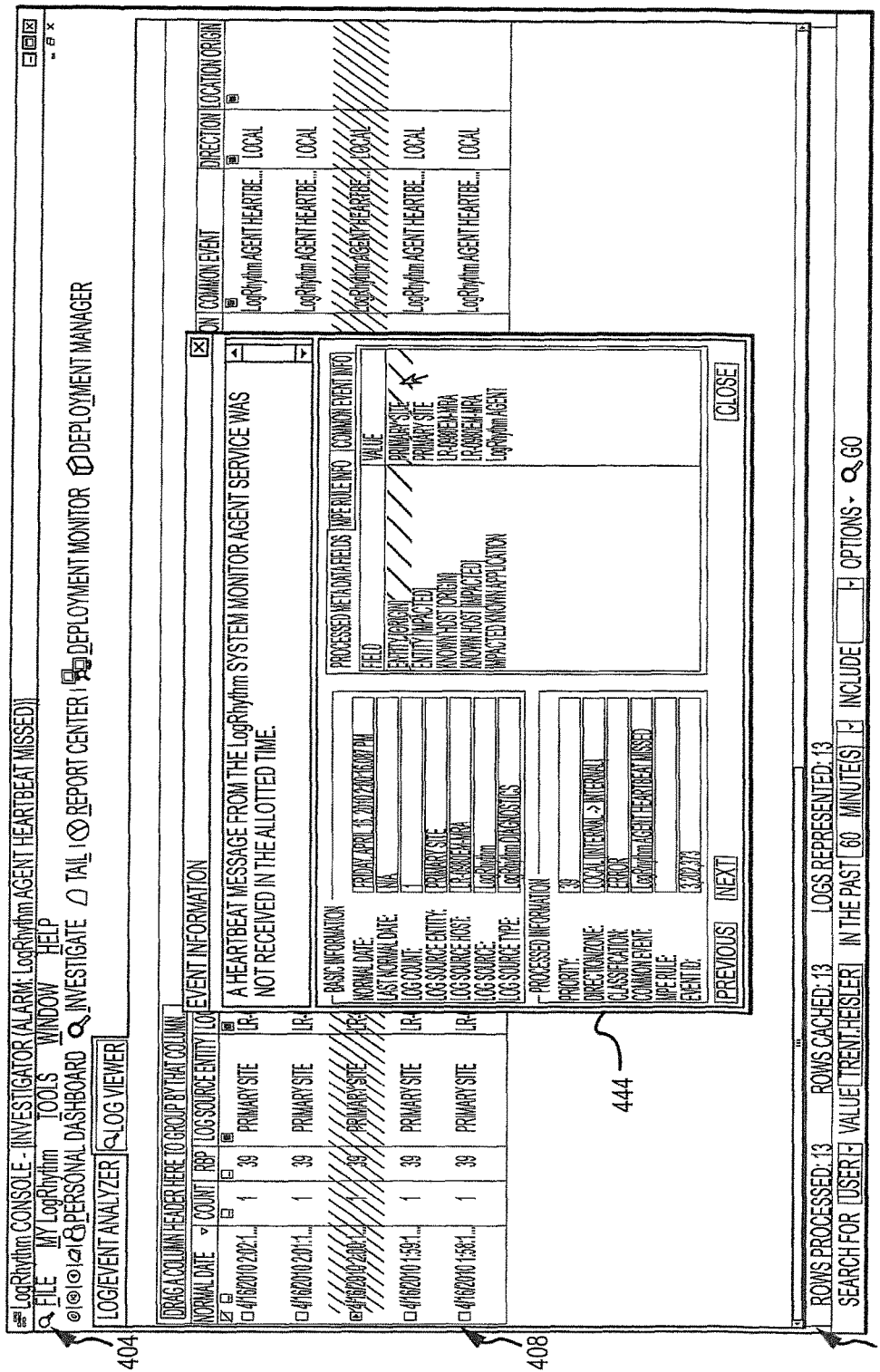
FIG. 27 illustrates a pop-up window including specific details of a particular event.

With continued reference to FIG. 25, it can be seen that the view 436 results from manipulating a "log/event analyzer" tab in the top of the presentation area 408. Manipulating a "log viewer" tab in the top of the presentation area 408 may provide detailed information in relation to each of the logs having a common event shown in the view 436 in FIG. 25. Turning to FIG. 26, all of the logs processed as the same common event may be illustrated in a view 440. To obtain more detailed information regarding any of the logs processed as the same common event in the view 440, a user may simply manipulate a desired log (e.g., double-clicking) to drill down into that log. As seen in FIG. 27, a pop-up window 444 has been displayed in response to manipulating any of the lines in the view 440 of FIG. 26. The pop-up window 444 includes event information for the selected processed log. More specifically, in response to the log message matching a particular log processing rule and thereby rising to the level of an event, the original log message may be displayed (e.g., near a top portion of pop-up window 444) in addition to metadata fields of the log message that are automatically parsed in response to the log message matching a particular log processing rule (e.g., see the portion of pop-up window 444 below the raw log message). For instance, information such as a normal date that the log message was generated, the log source host, the log source, a direction (e.g., local, external), etc. may all be displayed. Additionally, the MPE rule utilized to generate the events may be observed in addition to other information.

As discussed previously, default and user configurable alarms may be created and used by the event manager (see FIG. 15) to process events received from one or more log managers 242 through 244 (also see FIG. 15) to determine whether one or more alarms should be generated. To facilitate alarm rule creation, almost any log or event illustrated in the presentation area 408 may be appropriately manipulated to utilize one or more properties of the log or event as part of the alarm rule creation. That is, one or more logs or events that have been previously processed by one or more log processing rules may be identified or selected and then manipulated.

Figure 28:
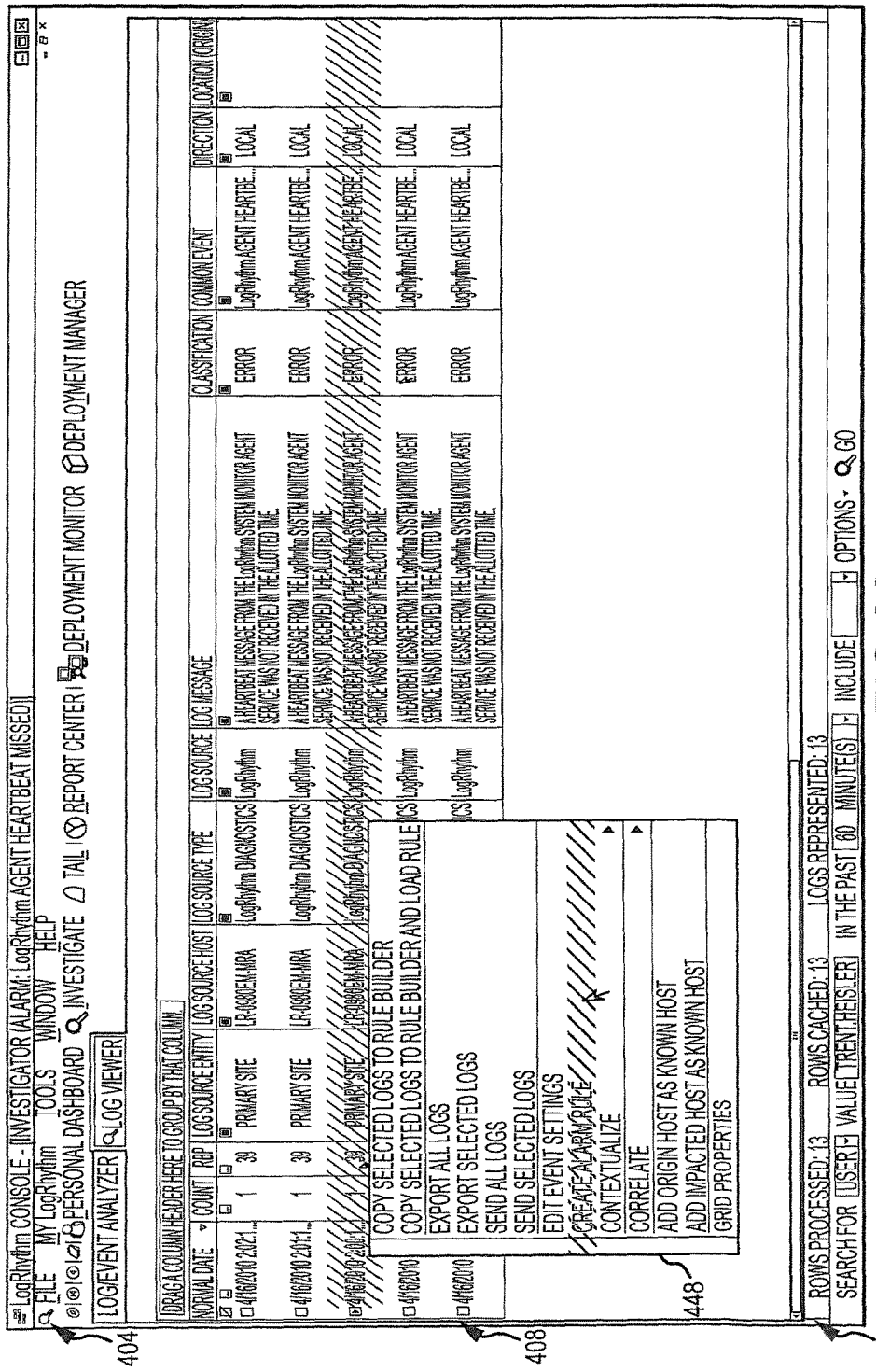
FIG. 28 illustrates a drop-down menu resulting from the manipulation of a log in an itemized list of logs, the drop-down menu presenting a number of actions that can be taken.
Figure 29:
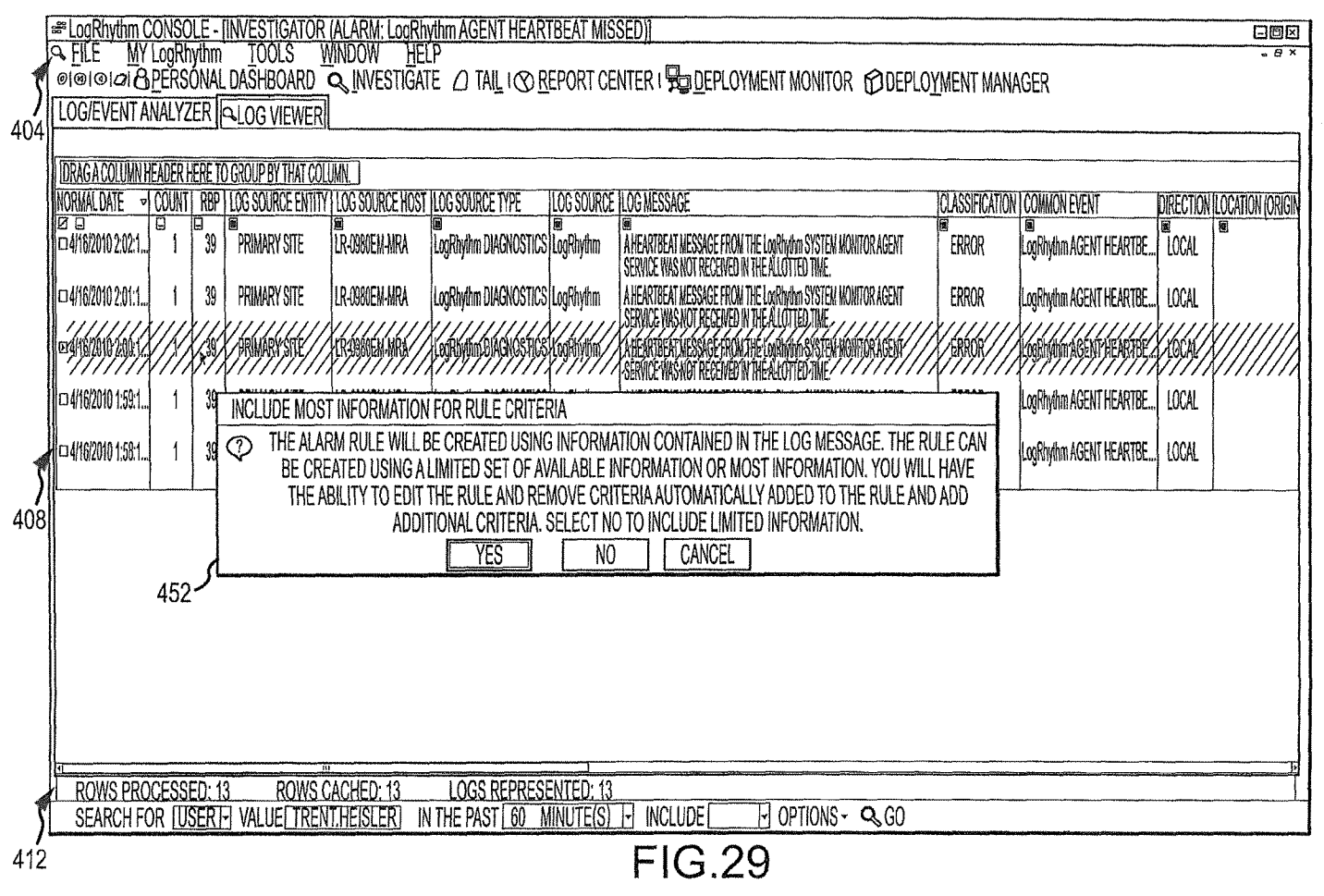
Figure 30:
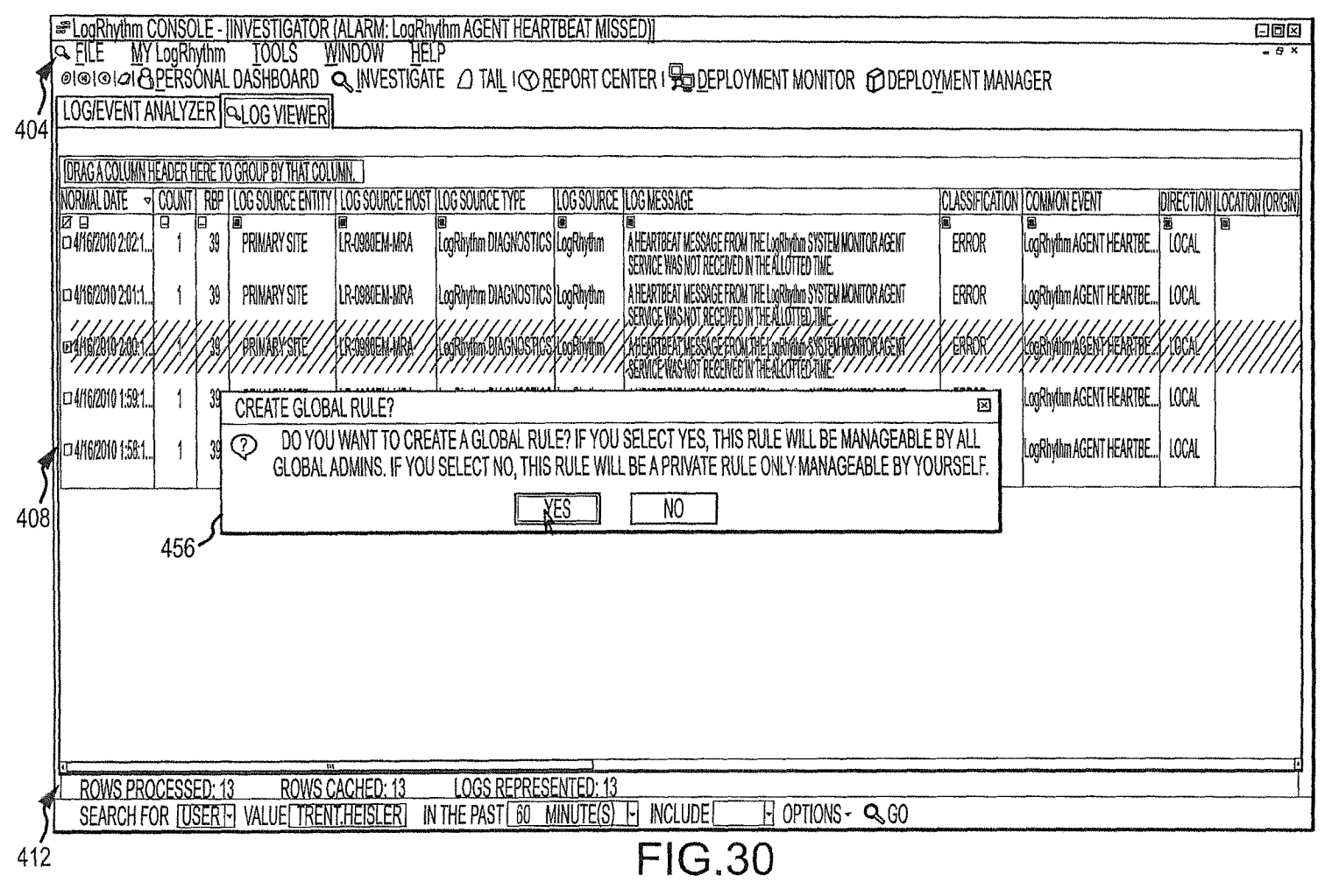

For instance, and with reference now to FIG. 28, a log (or the line in the presentation area 408 representing the log) has been right-clicked on to bring up drop-down menu 448 whereby a "Create Alarm Rule" user manipulable feature may be selected. Upon selecting the Create Alarm Rule user manipulable feature, a pop-up window 452 (see FIG. 29) may be displayed informing the user that the rule can be created with most or all of the parsed metadata from the log message or with only a limited set of information from parsed metadata of the log message. In either case, the alarm rule can be edited according to the user's preferences. Upon selecting yes or no in the pop-up window 452, another pop-up window 456 may be displayed to the user in FIG. 30 querying the user as to whether a global rule (e.g., a global alarm rule) is to be created. As used in this sense, designation of a global alarm rule means that all global administrators may have access to the global rule so as to edit or delete the global rule. Otherwise, this newly created alarm rule may only be manageable by the user creating the alarm rule.

Figure 31:
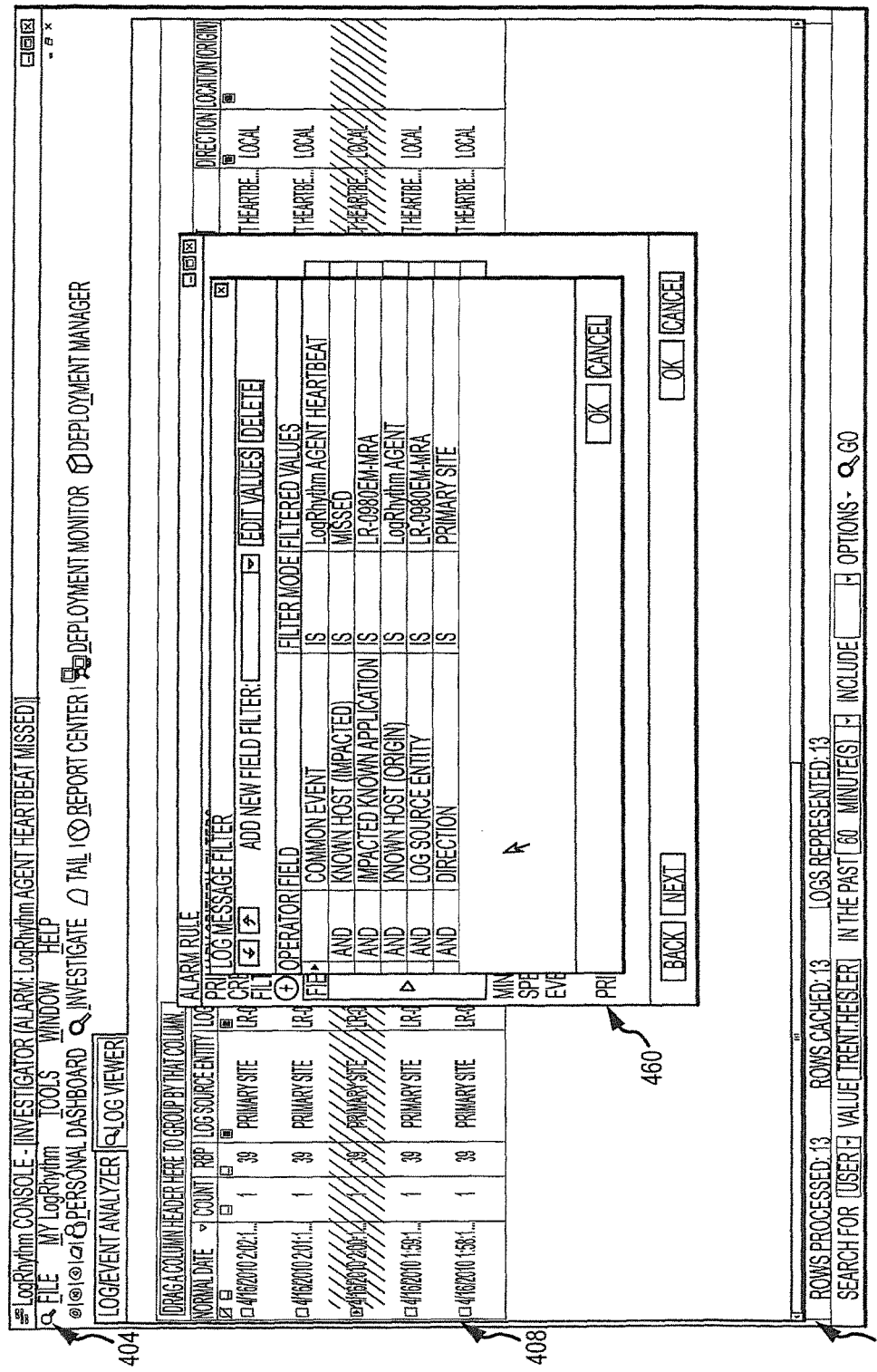
FIG. 31 illustrates additional pop-up windows in the creation of the alarm rule from FIGS. 28-30, where the pop-up windows include metadata from the manipulated log that may be used to create the alarm rule.

With reference to FIG. 31, one or more pop-up windows 460 may be provided in the presentation area 408 that allow a user to create an alarm rule based on one or more properties of the previously selected event or log. Stated otherwise, a user may begin the creation of alarm rule by using the properties (e.g., metadata fields) of the selected log event as a skeleton or framework that may be further edited or customized to create the desired alarm rule. As seen, the pop-up window 460 may include Boolean operators (e.g., and, not, or), fields (i.e., filters, e.g., common event, known host, direction), a filter mode, and a filtered value (i.e., the parsed metadata fields from the selected log or event to create this new alarm rule from). As also seen in the pop-up window 460, any of these values may be added or deleted, and/or additional fields may be added. While not shown, this newly created alarm rule may be named and/or associated with any appropriate policy. Thereafter, the user may choose to assign or associate the policy with an event manager or otherwise "activate" the alarm rule at which time events received at the event manager may be processed by this newly created alarm rule.

As another example, a user may use the properties of one or more logs or events as skeleton or framework with which to begin the creation of a log processing rule that may be used by one or more of the log managers to identify events from newly received logs. After such creation of a new "event rule," newly received logs at the one or more log managers may be processed using this newly created event rule. It is also conceivable that rules could be created from alarm rules.

Figure 32:
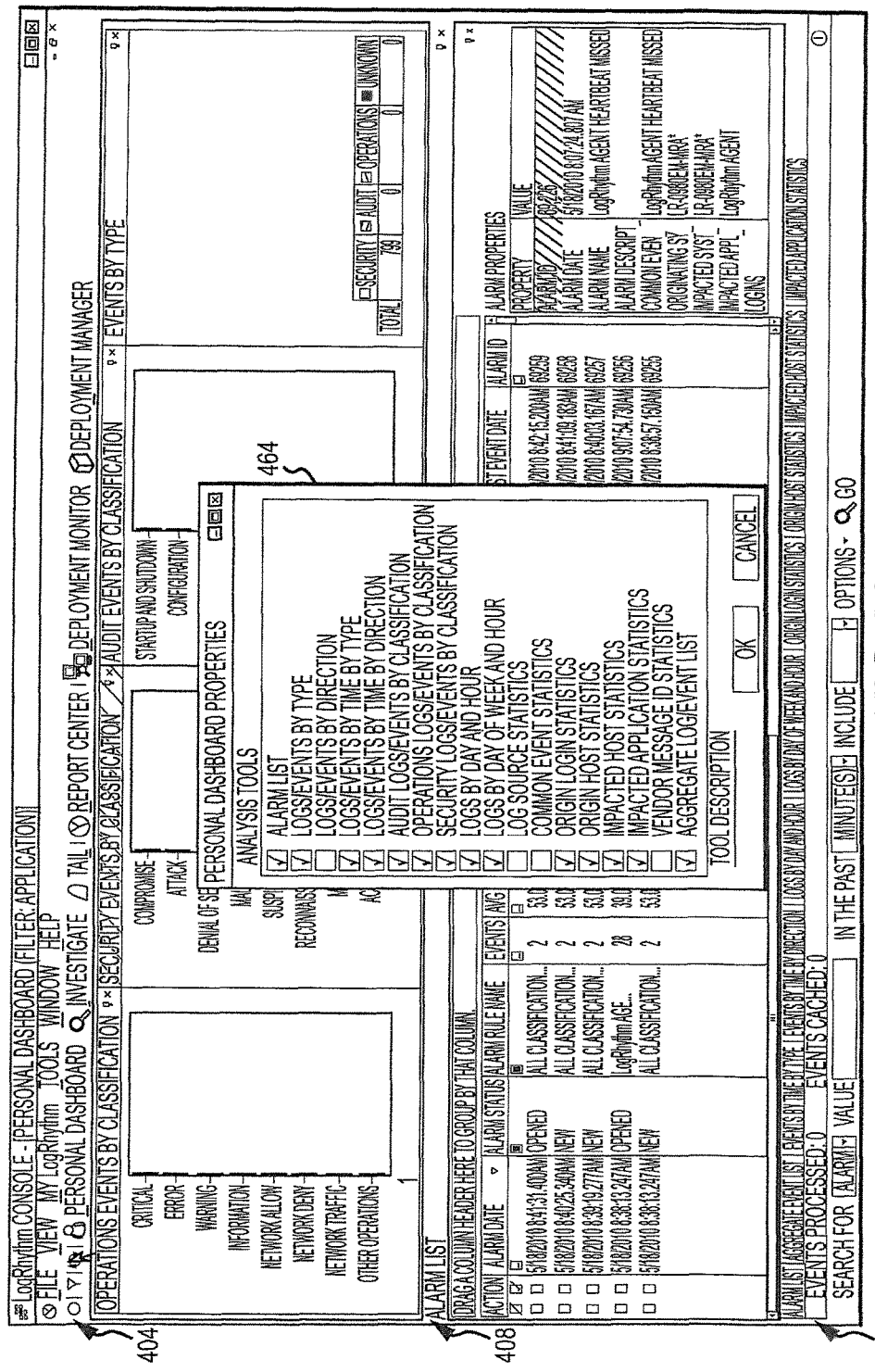
FIG. 32 illustrates a pop-up window that may be used to customize a personal dashboard of the user interface of FIG. 23.

With reference now to FIG. 32, the user interface 400 illustrated in FIG. 23 is shown, but with a pop-up window 464 displayed that allows for customization of the personal dashboard. As previously discussed and as can be seen, events designated by classification (e.g., operations, security, audit) have been selected (e.g., clicking a checkbox) as has been the alarm list along with other tools and views (e.g., events by time by type, events by time by direction, logs by day and hour). These tools and views can be displayed in the presentation area 408 and toggled between via manipulation of tabs or buttons in the navigation area 412. For instance, the "Events by Time by Type" tab in the navigation area 412 may display or show a colored three-dimensional chart with different columns representing total number of lines or events received according to time and date of the week. Other types of metrics are also envisioned.

Figure 33:
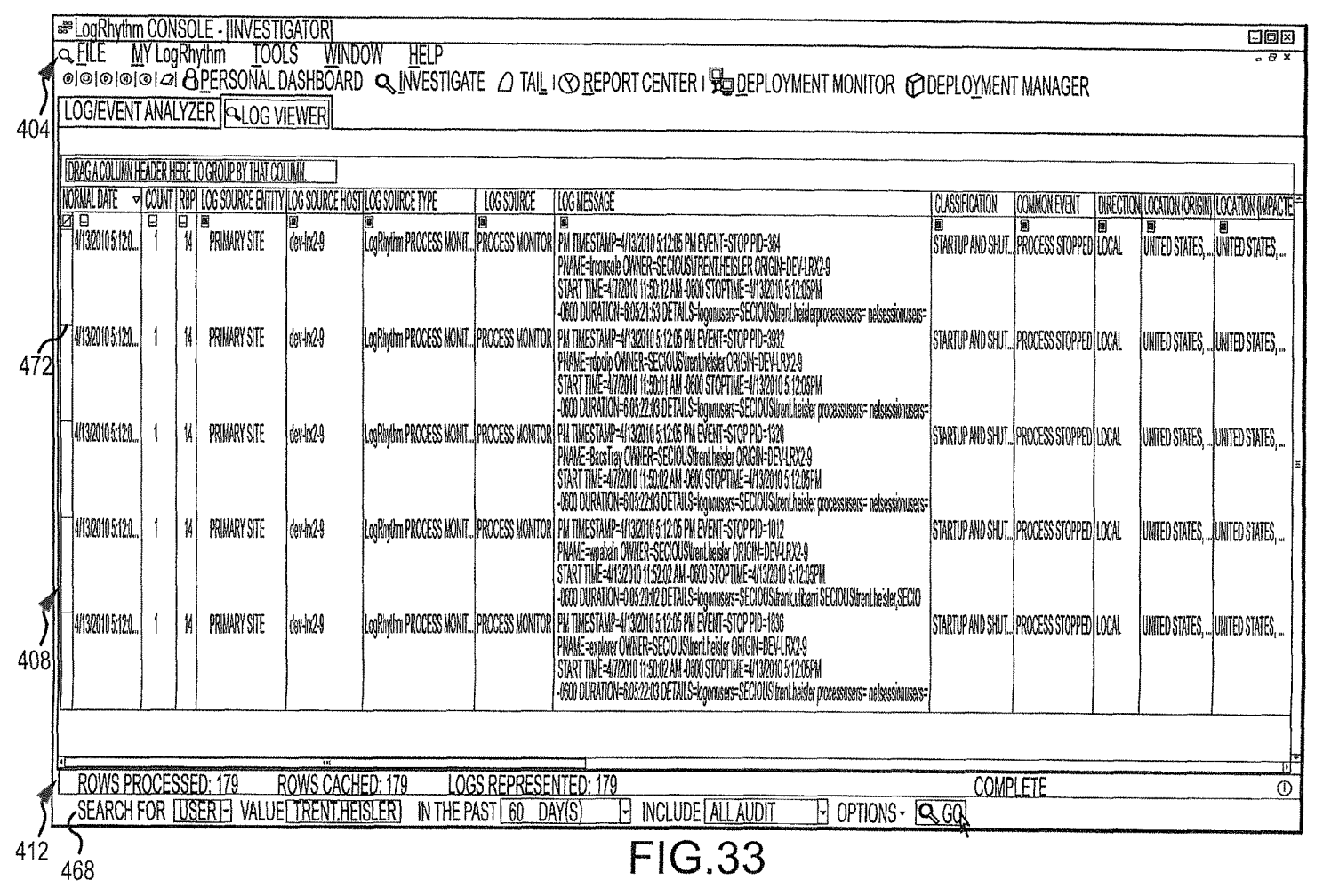

With reference now to FIG. 33, a navigation area 412 may include a quick search toolbar 468 that enables users to quickly launch searches from any screen in the user interface

400. The search may be based on a variety of attributes such as e-mail address, port, user, host, event type, timeframe, etc. As seen, a search has been performed for all related activity (e.g., in the form of audit type events) that a terminated administrator (Trent Heisler) performed during the previous 60 days. In response to running this search (e.g., by manipulating or clicking a "go" button or icon), a view 472 in the presentation area 408 is displayed. As can be seen, an itemized list of all audit type events in which the term "Trent Heisler" was contained in parsed metadata of logs in the last 60 days is shown. Numerous other types of searches using the quick search toolbar 468 are also contemplated.

Figure 34:
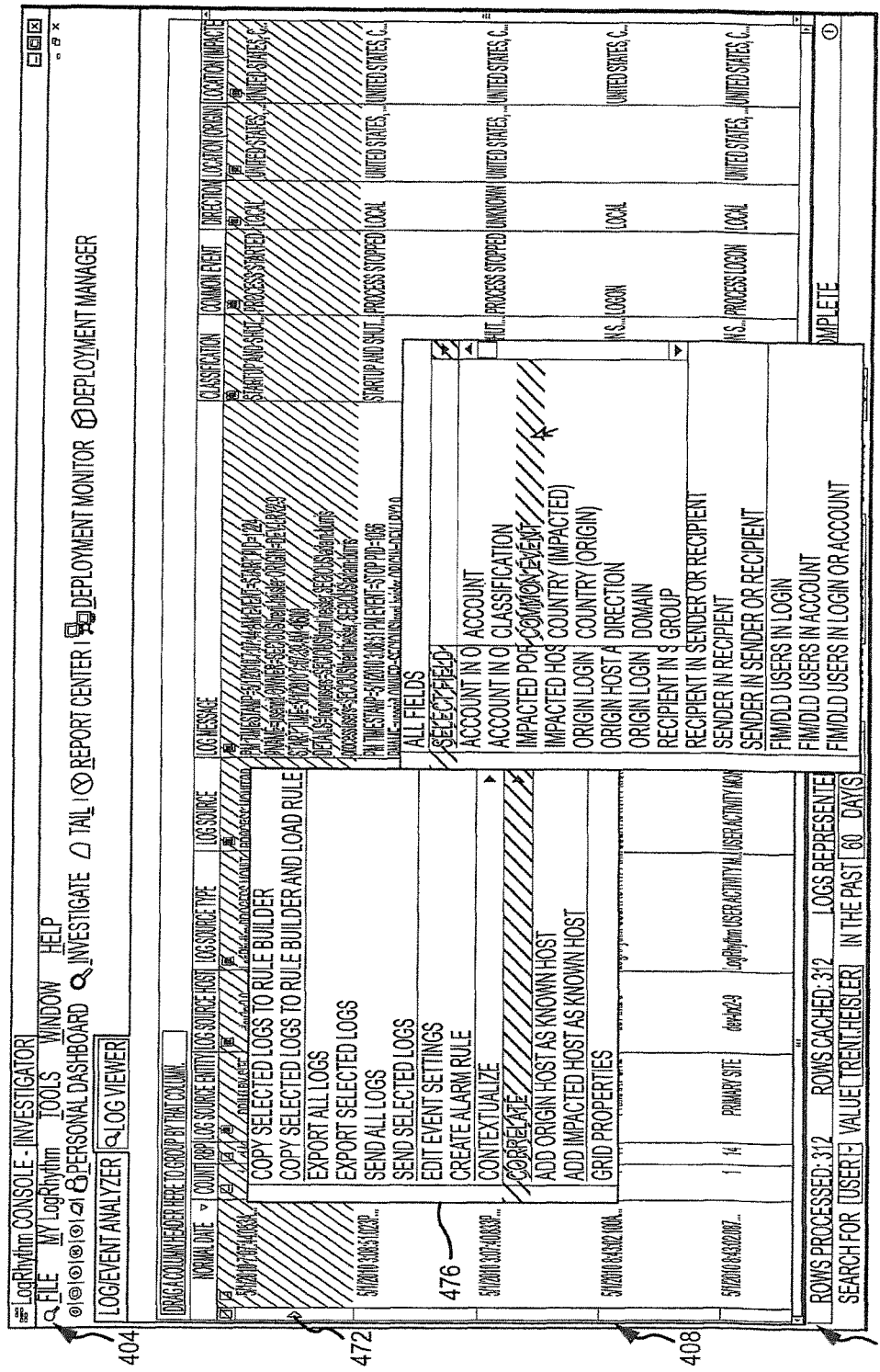
FIG. 34 illustrates a drop-down menu resulting from the manipulation of a log in the itemized list of logs of FIG. 33, the drop-down menu presenting a number of actions that can be taken, where a "correlate" option has been selected.

The user interface 400 may also allow a user to "correlate" previously searched events and/or logs according to one or more of the metadata fields of logs and/or events. That is, the previously searched and returned logs/events may be arranged and/or filtered according to one or more of the metadata fields. For instance, and turning now to FIG. 34, each of the logs displayed in the view 472 from FIG. 33 may be manipulated (e.g., right-clicked on) to bring up a drop down menu 476. From the drop-down menu 476, a user may select a "correlate" feature, and then select any appropriate metadata field by which to further correlate and or filter the logs and/or line items. As seen, the "common event" metadata field has been chosen as the field by which to filter or otherwise rearrange the logs (although the logs may be filtered or rearranged according to one or more other metadata fields as well).

Figure 35:
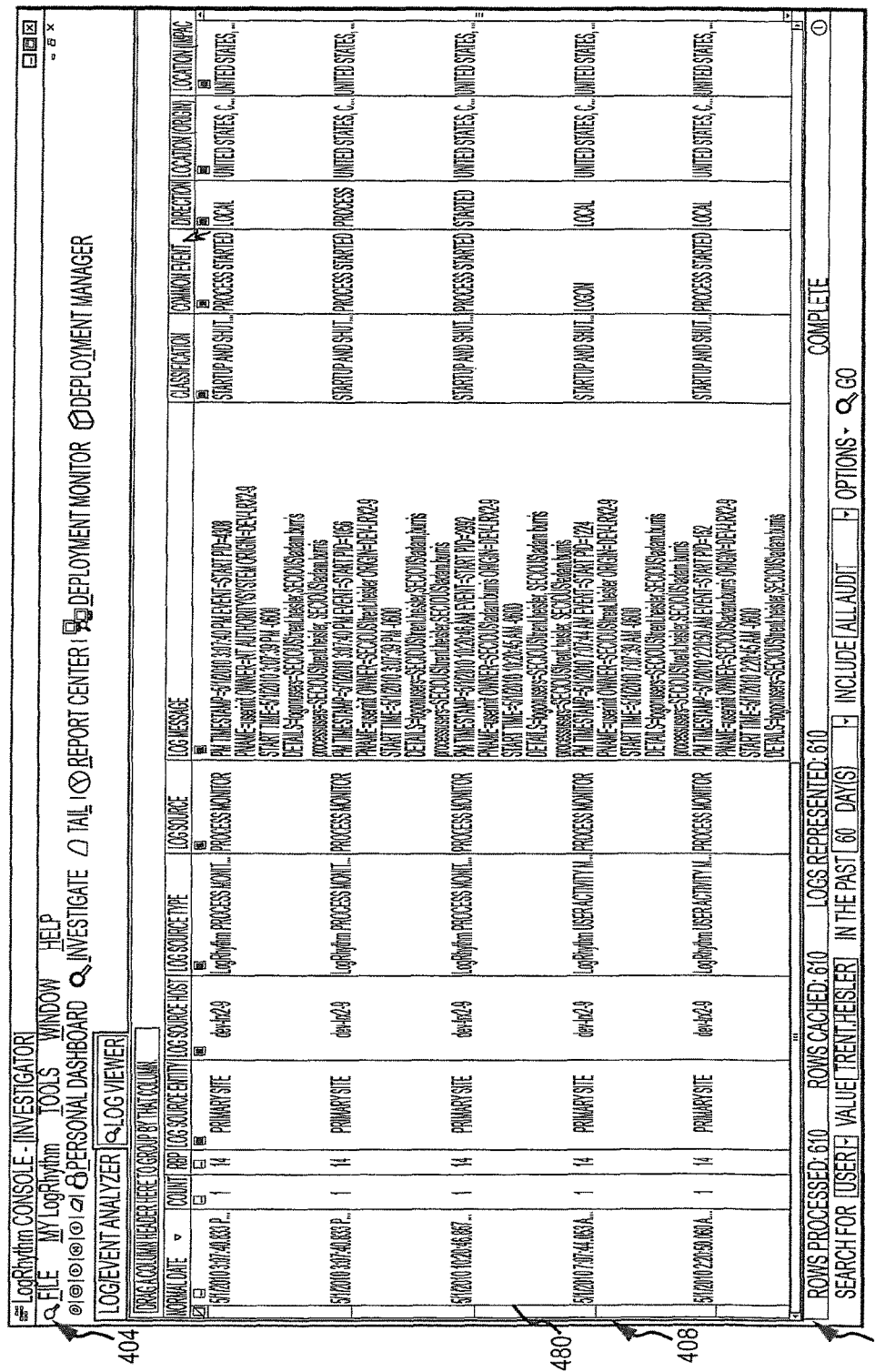
FIG. 35 illustrates the itemized list of logs of FIG. 34 after the logs have been correlated by "common event."
Figure 36:
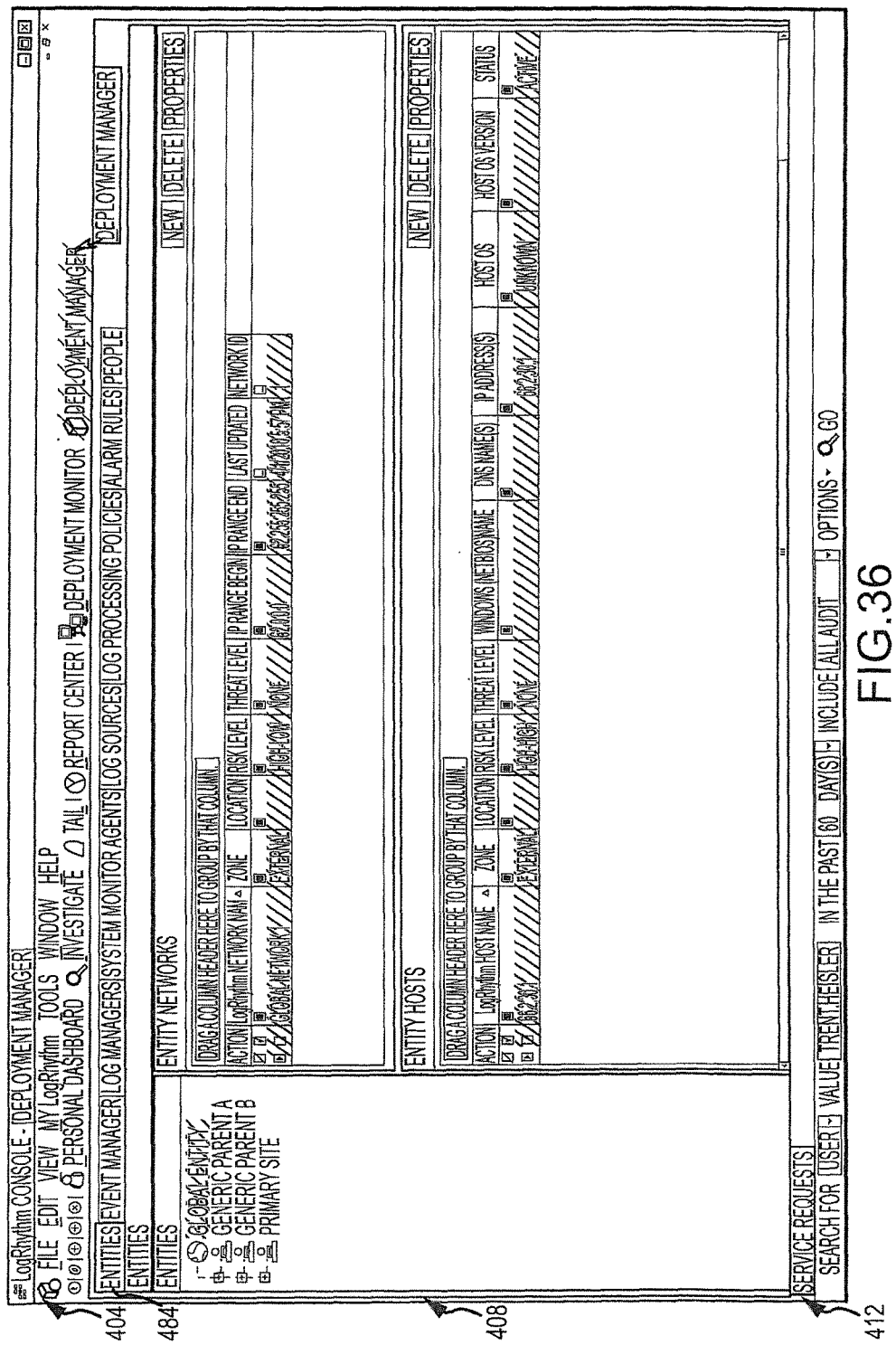
FIG. 36 illustrates the user interface of FIG. 23 after a "deployment manager" button in a control panel of the user interface has been manipulated.

Turning to the view 480 in the presentation area 408 of FIG. 35, it can be seen now that the log/event line items are rearranged according to common event. More specifically, all logs having the same event (e.g., "process started") may be bunched together in the view 480. This feature allows a user to easily and quickly launch new searches based on one or more metadata fields in a log message or event. In addition to correlating logs generated by the same device, host, application, process, etc., this feature also allows for the correlation of logs generated by a plurality of different devices, hosts, applications and/or processes (i.e., it allows for "cross-device" correlation). For instance, all logs generated by a number of disparate devices or processes may be correlated based on one or more common metadata fields or other attributes (e.g., finding all logs from any device type where Login=chris.petersen). It should be noted that this correlation feature is not limited to use with the quick search toolbar. Rather, this feature may be utilized with almost any returned list of logs and/or events (e.g., after an initial search). While the features provided by manipulation of the personal dashboard button in the control panel 404 of the user interface 400 have been described, other buttons/tabs in the control panel 404 also provide tools and access to useful information associated with logs. For instance, and turning to FIG. 36, a "deployment manager" button in the control panel 404 may be manipulated which may provide users (e.g., those with administrative type credentials) the ability to configure and manage various system components and functionalities such as alarming, reporting, etc. Manipulation of the deployment manager button may cause the display of a number of tabs 484 that allow access to other features of the console (e.g. event manager, log managers, alarm rules). Additionally, manipulation of the deployment manager button may also change and/or add other features to the control panel 404.

One of the tools available within the deployment manager (or other portion of the user interface 400) may be a "data loss defender" feature that broadly allows an administrator or other user to monitor the movement of data to and/or from a host such as server, computer, storage device (e.g., USB), and the like. Stated otherwise, this feature allows an administrator to monitor for data transfers to a particular host and/or from a particular host. The administrator may configure this feature so that upon observing an attempt at such a data transfer, log messages or alerts may be automatically generated and forward to appropriate personnel (e.g., such as the administrator), the data transfer may be automatically inhibited/limited, and/or one or more other actions may occur. As will be described in more detail below, the administrator or other user may set or configure one or more policies using a data loss defender policy manager, and then assign the one or more policies to one or more system Monitor agents (e.g., a Windows System Monitor agent) that are responsible for collecting logs from one or more log sources and providing endpoint/host monitoring capabilities.

For instance, an administrator may determine that one or more circumstances on a particular data system or network may warrant the taking of a particular action with respect to a storage or endpoint device on a data system or network. One set of circumstances may simply be any movement of data to and/or from a particular host or storage device. Another set of circumstances may be that a particular user or former user of the network is attempting to transfer or copy data from the network onto any endpoint or storage device. For instance, it may be desirable to limit or inhibit terminated or disgruntled workers or employees from being able to steal and/or copy any type of data from the company's network that such user may use for illegitimate purposes. Another set of circumstances may be an attempted transfer of a particular type of data on the network to and/or from a host. For instance, with or without regard to the type of employee or worker attempting to access the particular type of data, an administrator may desire to limit the transfer of trade secret information, recorded conversations of company officers, etc.

In any event, the administrator may use the data loss defender manager to take a number of actions with respect to one or more storage devices on the data system in response to determining that one of the above (or other) these circumstances exist. One action may be to simply log or alert on any movement of data within the data system in relation to the particular circumstances (e.g., to and/or from one or more particular hosts such as servers, routers, workstations, laptops, storage devices; to and/or from any host when in relation to a former employee, etc.). For instance, this may entail classifying as events any logs that are indicative of a data transfer and then presenting the events for viewing on the user interface 400. Administrators can use any of the user interfaces or dashboards disclosed herein to monitor these events. As will be appreciated, alarm rules can also be created to, for instance, alert an administrator when a certain threshold number of events has occurred.

Another action may be to prevent or at least limit the transfer of data to and/or from a host (e.g., an end point or storage device such as a USB drive). Again, logs generated by system components (e.g., servers, routers) indicating the occurrence of one of the above discussed circumstances (e.g., an attempted data transfer to/from a host) may be flagged as events, and doing so may cause the log manager or other processing platform to send a request to the host to prevent or limit the data from being written to and/or from the host. In one variation, the request to limit data from being written to the storage device may include a request to eject the storage device on the data system. It should be appreciated that when an administrator desires to limit or prevent data from being transferred or written to the storage device, the request sent from the log manager and/or processing platform would be sent before data transfer has occurred or has at least completed.

Figure 37:
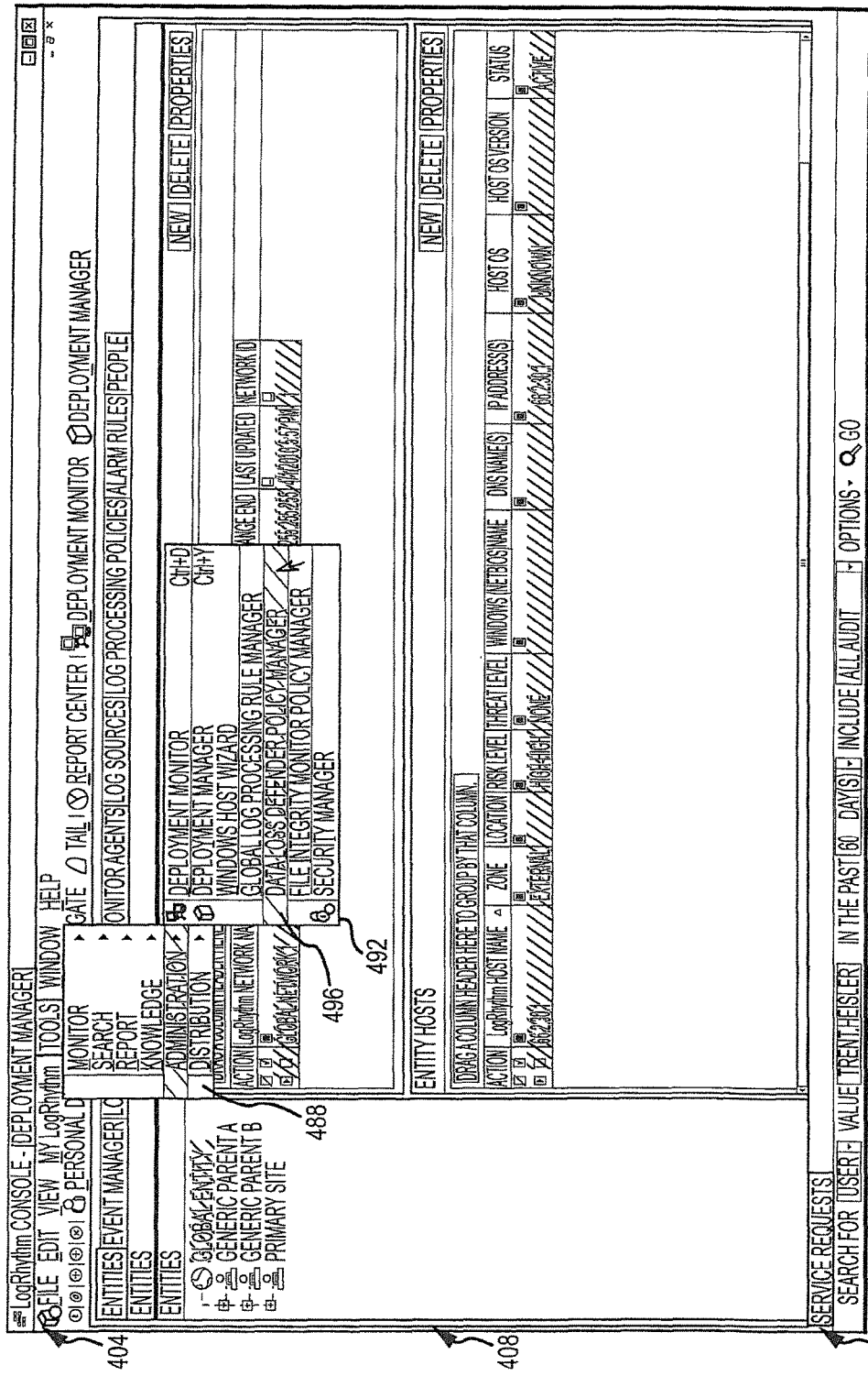
FIG. 37 illustrates various drop-down menus available after manipulation of the deployment manager button of FIG. 36.
Figure 38:
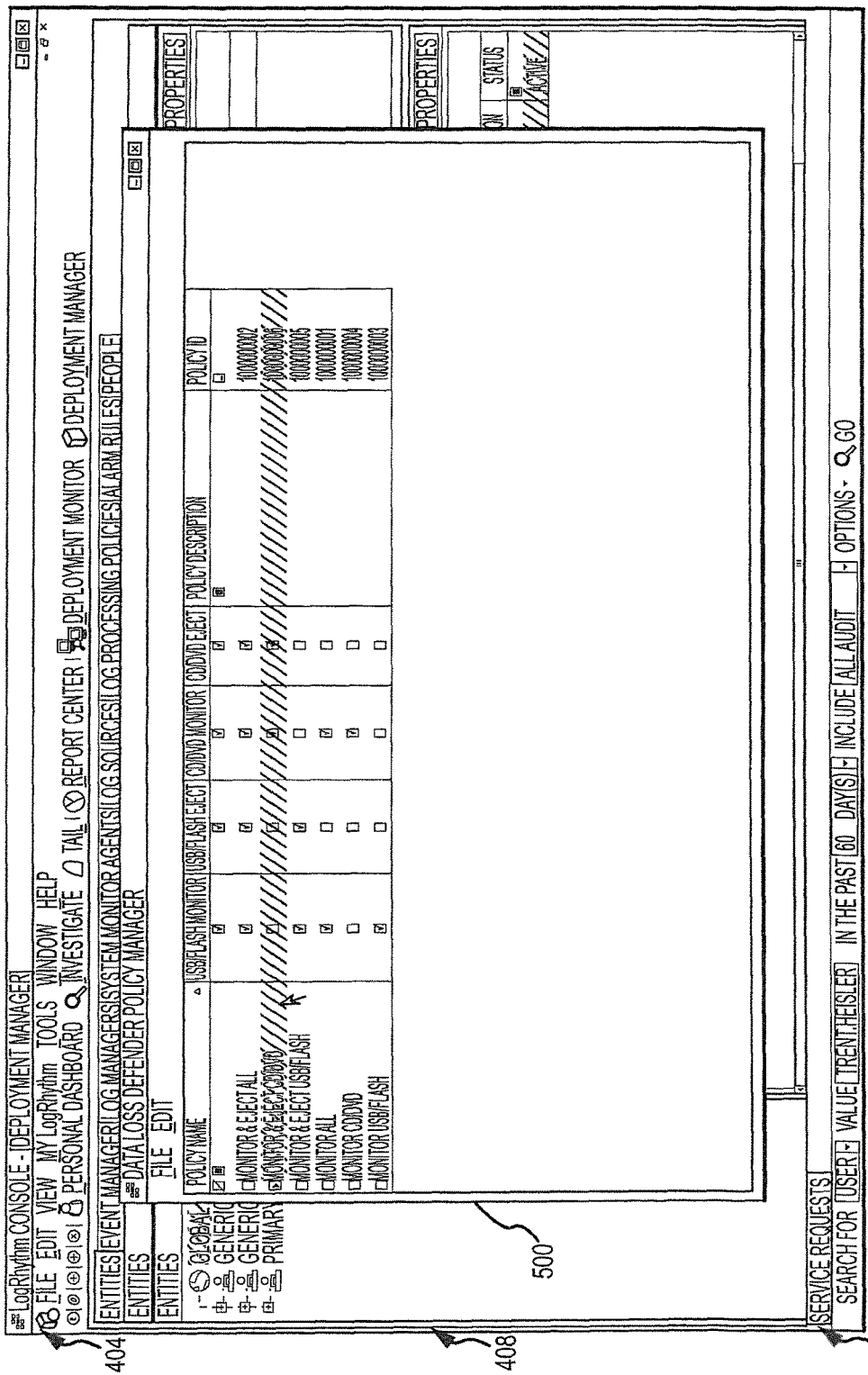
FIG. 38 illustrates a pop-up window resulting from the manipulation of a "data loss defender policy manager" button from FIG. 37, where the pop-up window includes a number of data loss policies with actions that can be taken in relation to an attempted transfer of data from a device (e.g., server) of the data system to a storage device.

Turning to FIG. 37, a user may, in one arrangement, first set one or more data loss policies by way of accessing a data loss defender policy manager button 496 in the control panel 404 which may be accessed by, for instance, manipulating a "tools" drop-down menu 488 and then an "administration" drop-down menu 492 in the control panel 404 (see FIG. 37). As seen in FIG. 38, a pop-up window 500 may be presented in the presentation area 408 in which one or more data loss policies may be set, configured, and/or edited. For instance, a "monitor and eject all" policy may specify that all storage devices (e.g., CD/DVD, USB/flash) that send log messages to a particular agent may be both monitored and ejected as discussed above in response to one of the above-discussed circumstances occurring (e.g., a data transfer to/from one of such storage devices). Other self-explanatory policies can be seen in a pop-up window 500 and other data loss policies are also envisioned (e.g., disabling the storage device). Each of the data loss policies may be associated with a particular policy ID to distinguish each of the data loss policies from other policies in the console.

Figure 39:
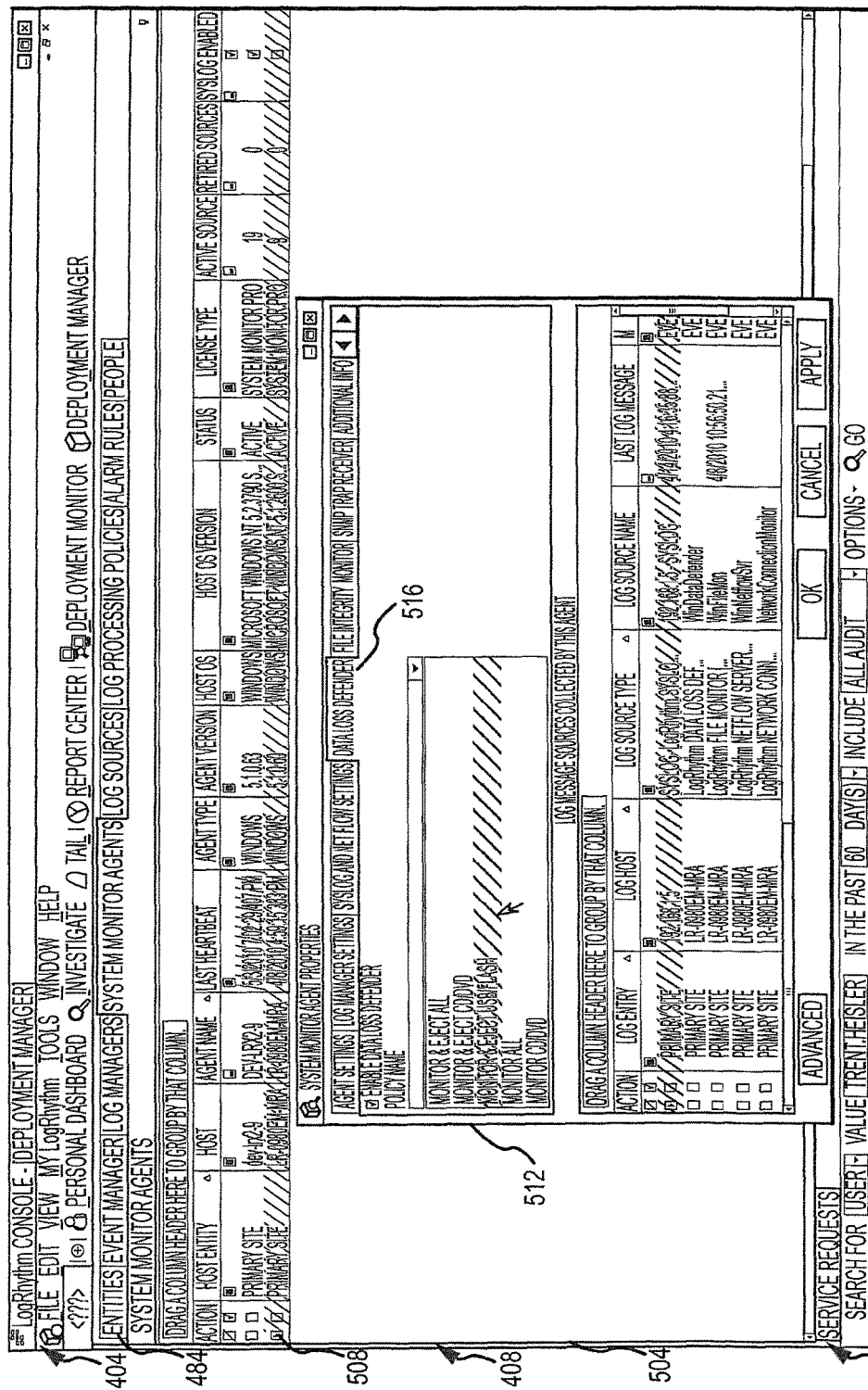
FIG. 39 illustrates a pop-up window that allows a user to assign one of the data loss policies of FIG. 38 to one or more system monitor agents.

Once one or more data loss policies have been created and/or edited, one or more of these data loss policies may be assigned to at least one system monitor agent associated with one or more log sources or hosts. Turning to FIG. 39, a "System Monitor Agents" tab 484 may be manipulated to cause the display of a view 504 of all of the available system monitor agents responsible for collecting and receiving logs from log sources in the data system. For instance, a data line 508 in the view 504 may include information such as the agent's name, the last heartbeat (i.e., the last or most recent signal or transmission received from the particular agent at the log manager or other processing platform), etc. By manipulating (e.g., double-clicking) the data line 508, a properties pop-up window 512 for the agent in data line 508 may be displayed in the presentation area 408 to allow one or more properties of the agent to be set and that displays the various log message sources or hosts from which this agent collects log messages. Among other properties that can be set, a data loss defender tab 516 may be manipulated to assign one or more of the previously discussed data loss policies to this particular agent. As can be seen, the data loss defender may be enabled (e.g., by checking a box), and then a particular data loss defender policy can be selected that applies to this particular agent.

It should be appreciated that data loss defender policies may be implemented on system monitor agents by way of writing or establishing any appropriate log processing rules and/or data management settings operable to: a) identify and/or isolate log messages collected from log sources at the agents indicating the existence of any of the above discussed circumstances (e.g., data transfer to/from a particular host or hosts, download of data to a removable storage device by particular users, transfer of sensitive data), and b) cause the log manager, system monitor agent, or other appropriate processing platform to take any of the above actions (e.g., generate logs/events, disable storage devices, etc.) in response to any of such log processing rules matching log messages collected at the system monitor agent.

Another of the tools available within the deployment manager may be a "user activity monitor" feature that broadly allows a user or other administrator to search, report, and/or alarm on user activity in a number of different manners. Such user activity may be in relation to a single individual/user, user type or directory service (e.g., active directory) group (e.g., administrator, engineering, manager, quality assurance). In one arrangement, information (e.g., user and/or group information) from one or more directory services (e.g., such as but not limited to active directory) may be integrated and/or synchronized with a log manager, event manager and/or other processing platform disclosed herein according to any appropriate schedule and in any appropriate manner. The synchronized information may be stored in any appropriate database (e.g., EMDB) or table sortable by field (e.g., userID/login, full name) and may be used by administrators and the log manager, event manager and/or processing platform for use in searching, reporting, alarming and the like. Representative information may include network logins, logons, logon session duration, total number of logins, initial password creation date, most recent password changes, most recent incorrect password entry date, and the like. Among other advantages, this feature may provide an independent audit trail of, for instance, user logons and logoffs, that supplements local auditing systems in the event that such local auditing systems are not configured or are otherwise compromised. Another advantage is that a consistent logon/logoff record across multiple different operating systems may be achieved.

Figure 40:
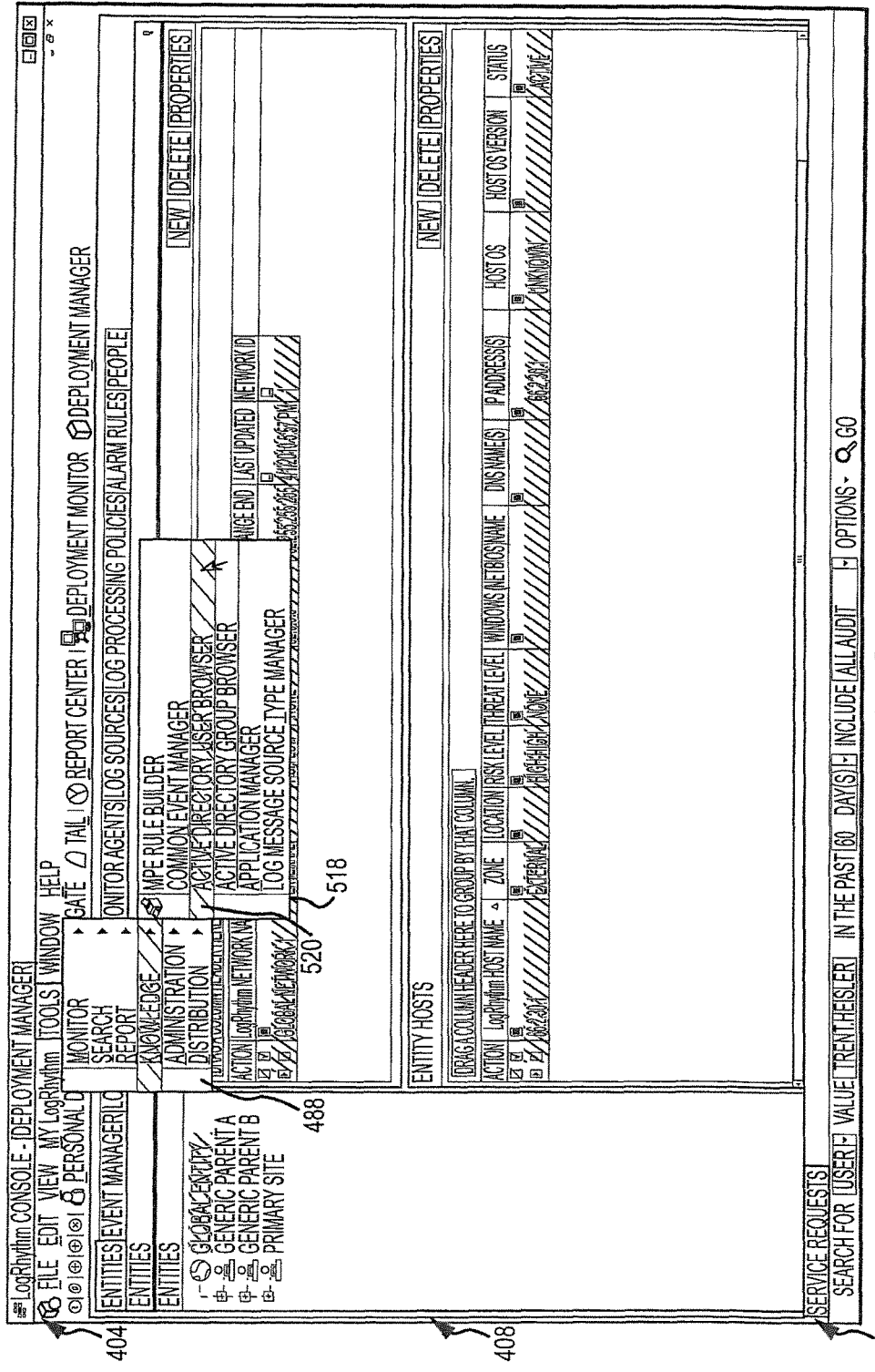
FIG. 40 illustrates various drop-down menus available after manipulation of the deployment manager button of FIG. 36.

In use, a user may manipulate an "active directory user browser" button 520 which may be accessed by, for instance, manipulating the "tools" drop-down menu 488 in the control panel 404 (see FIG. 40), and then a "knowledge" drop-down menu 518 (the use of the term "active directory" user browser does not necessarily connote that user information is retrieved from an active directory; rather, the user information can be pulled from any appropriate directory service (s)). In response, a view 524 may be displayed in the presentation area 408 in the form of a table or grid of users (who may be identified by "Login," "Full Name," etc.) of the data system along with various types of information (e.g., activities) associated with such users. Another view 528 may also be displayed in the presentation area 408 in the form of a grid representing user groups that a user selected in the view 524 (e.g., see line item 532) is a member of Among other information contained in the view 524, a user or other administrator may observe the domain (e.g., "schq.secious-.com") that each user is associated with in addition to activities such as the total login count (e.g., into a particular domain or network) associated with a user since the date of original password creation, the date of the last password change, etc. The various types of information in the views 524, 528 may represent the synched information from the one or more directory services) as discussed previously.

Figure 42:
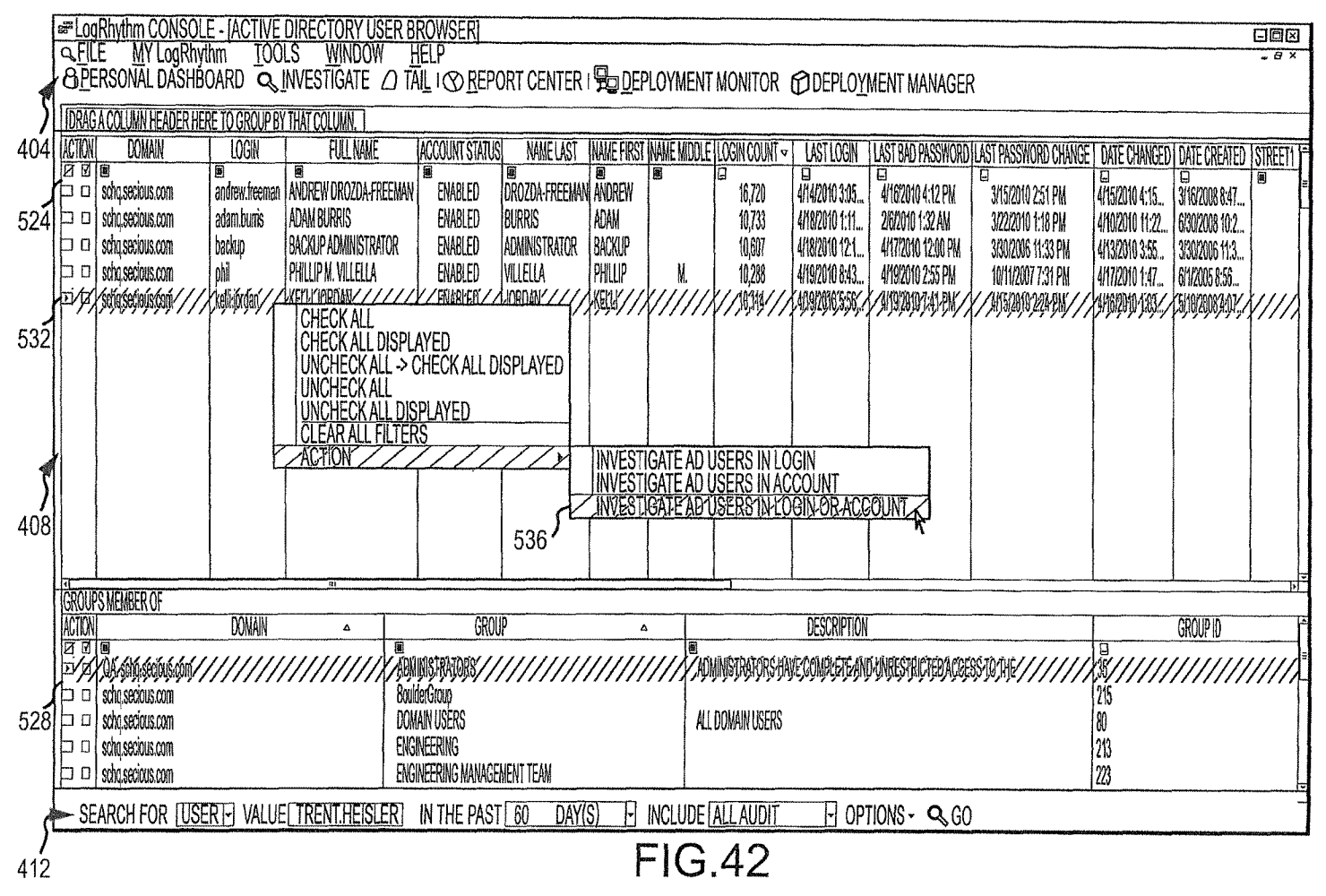

To further investigate the activity of users in the view 524, the users may be selected (e.g., checked), any portion of the view 524 may be appropriately manipulated (e.g., right-clicked on), and then one or more "investigate AD users" buttons may be selected. See FIG. 42. As just one example for purposes of context, users who are members of some groups (e.g., administrators, quality assurance) may be expected to amass a particularly large number of logins over a certain period of time while other users who are members of other groups may not. In this regard, observing that one user who is a member of a group that is not expected to have many logins into the domain has actually amassed an exceedingly large number of logins may be reason for the administrator or other user to further investigate this particular user on the domain or network.

In any event, and upon selecting an "Investigate AD Users in Login or Account" button 536, a view 540 may be displayed in the presentation area 408 that provides access to various metrics representative of activity of the selected users. More specifically, a user may be able to perform (i.e., via a processing platform) "cross-device" correlation based on one or more particular users. Stated otherwise, a user may be able to investigate or otherwise search for all logs generated by a number of disparate devices or processes based on a common user or login. In this regard, the information received from the directory service (e.g., user names, group names) can be used by administrators as parameters by which to filter log messages across numerous and what may be disparate devices, processes, and the like.

Figure 43:
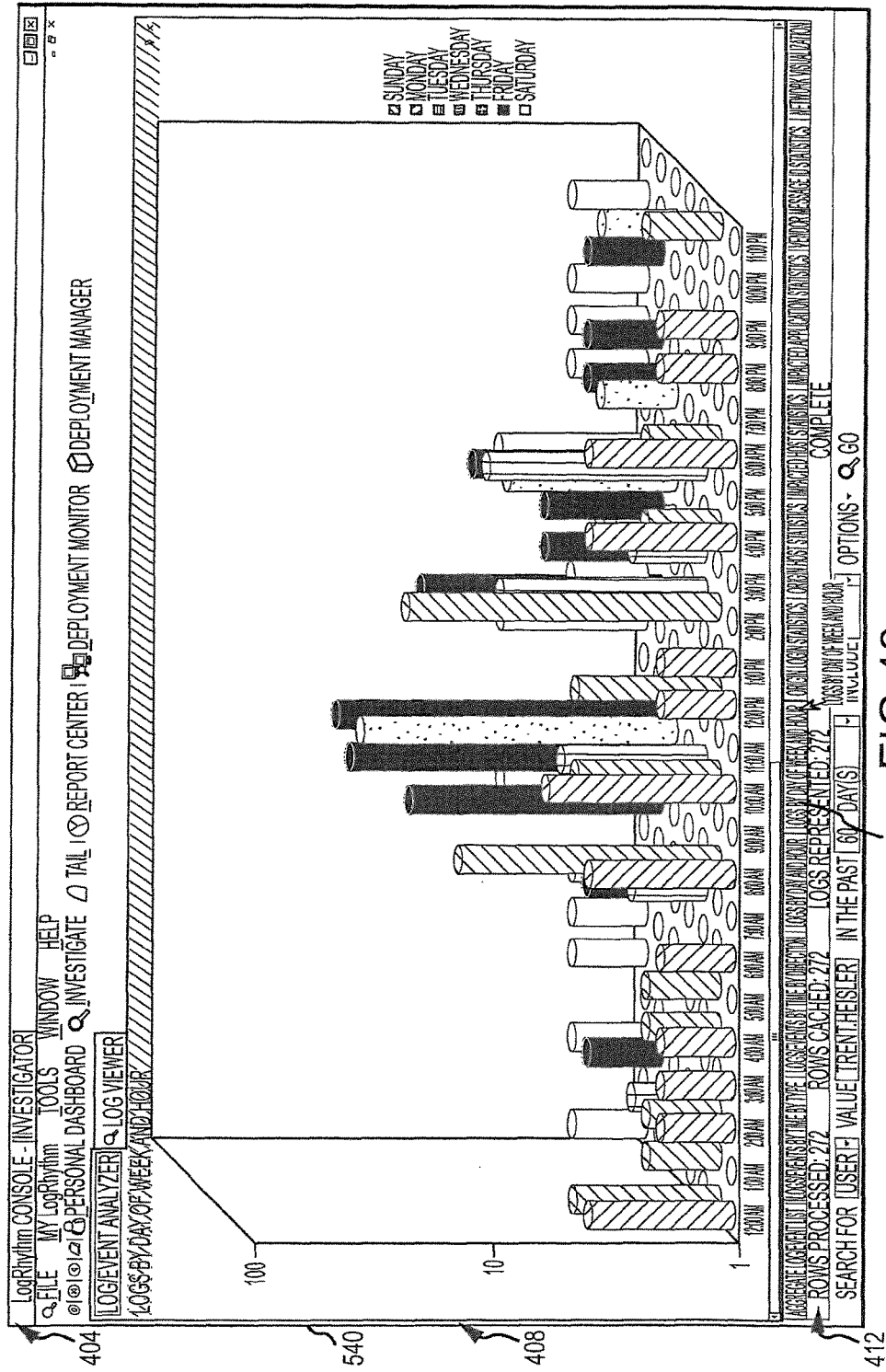
FIG. 43 illustrates a graphical representation of logs generated by day of week and hour after an "investigate active directory users in login or account" button has been manipulated in FIG. 42.
Figure 44:
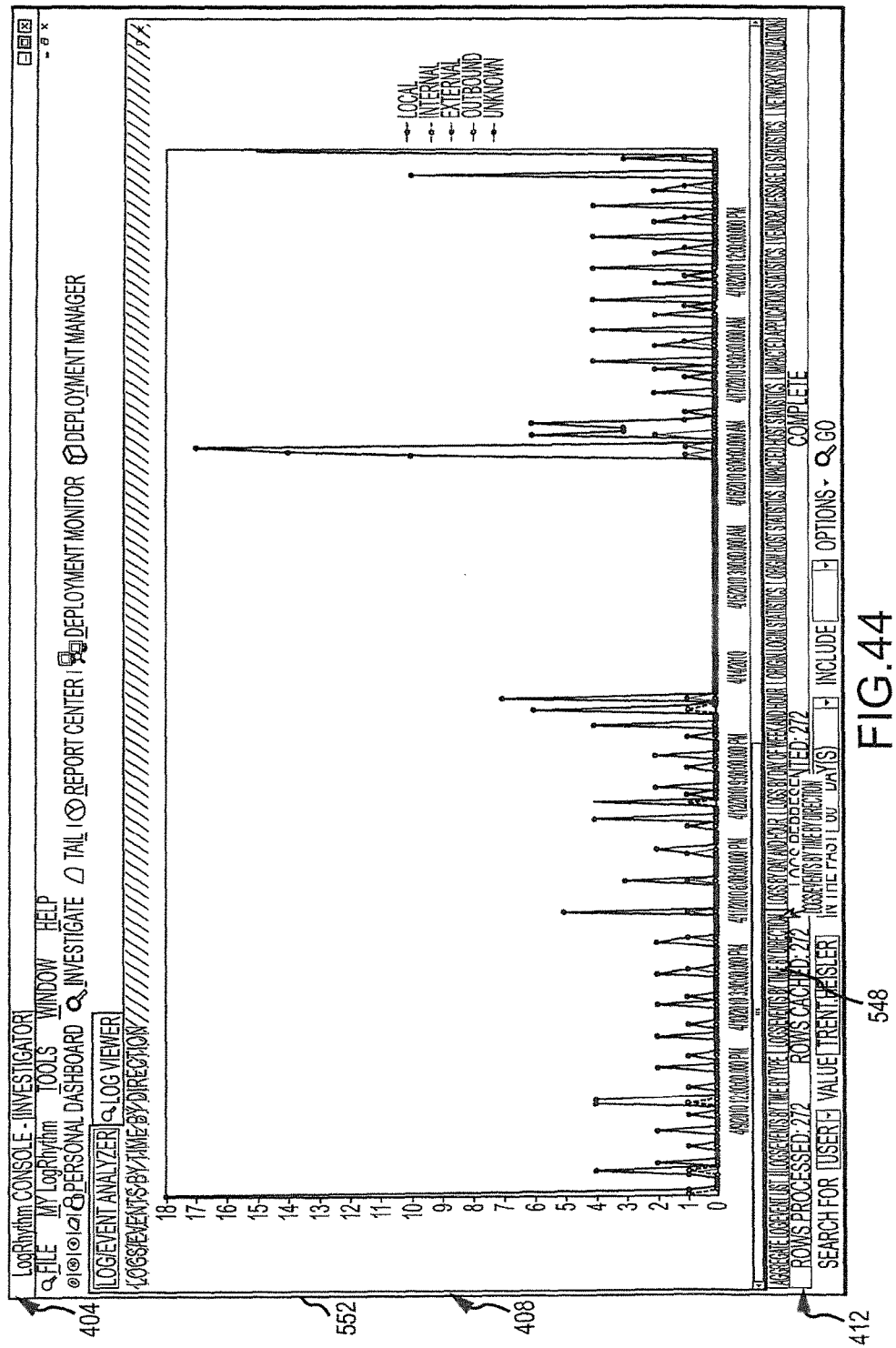
FIG. 44 illustrates a graphical reputation of logs and events generated by time by direction.

In one arrangement, a "Logs by Day of Week and Hour" tab 544 may be selected (see bottom of view 540) to cause the display of a color-coded three-dimensional graph indicative of a quantity of logs received at the one or more log managers and processed as events relevant to logins or account access by the particular user(s) by day of the week and by hour. As can be seen in FIG. 43, a large portion of this particular user's login/account activity occurred on Fridays between 9 am and 12 pm. This information may be useful in allowing an administrator or other user to investigate other events or data associated with this user during this particular time period and day. As another example, a "Logs/Events by Time by Direction" tab 548 may be selected (see FIG. 44) to cause the display of a view 552 in the presentation area 408 which shows a quantity of login/account type logs according to date, time and direction (e.g., local, internal, external, outbound, unknown). Other types of metrics are also envisioned (e.g., see tabs at the bottom of presentation area 408).

Figure 45:
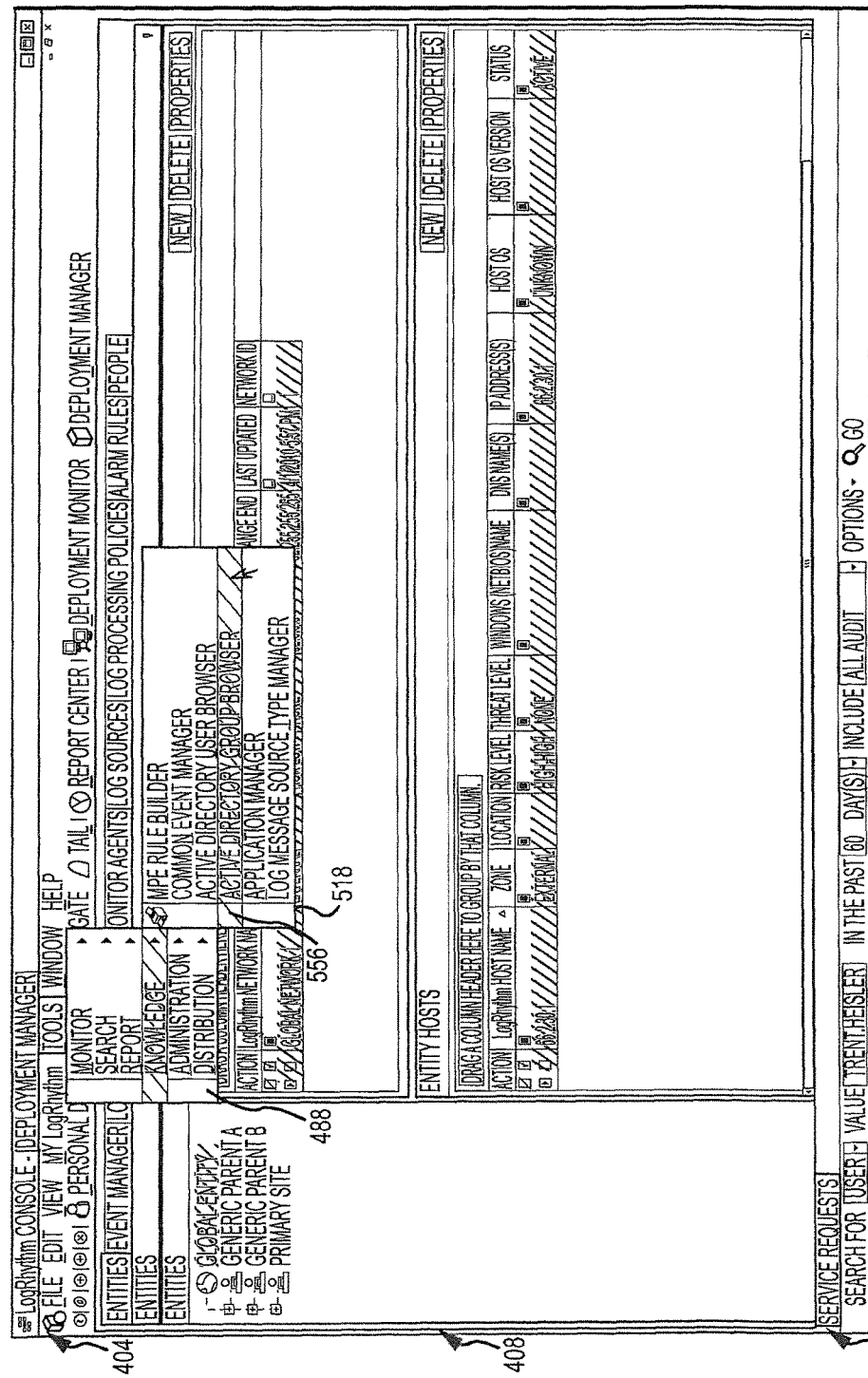
FIG. 45 is similar to FIG. 40, but showing manipulation of an "active directory group browser" button.
Figure 46:
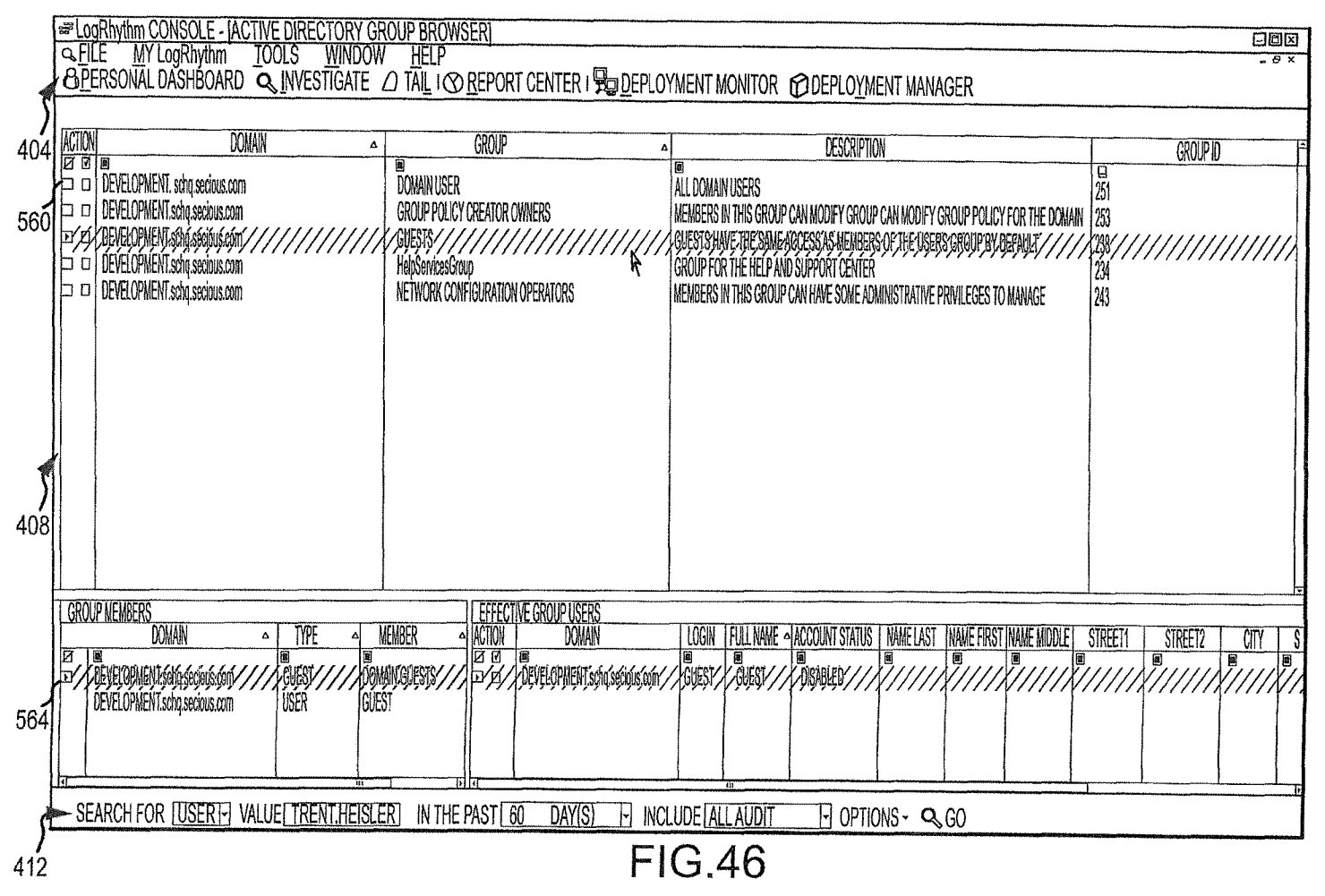

Turning to FIGS. 45 and 46, an "active directory group browser" button 556 (see FIG. 45) may be selected which may cause the display of a view 560 (see FIG. 46) in the form of a grid of user groups, group descriptions, group IDs, etc (again, the term "active directory" group browser does not necessarily connote that the group information is pulled from an active directory per se). Selection of any of the line items in view 560 may cause the display of the group members and effective group users associated with the selected group in view 564. Similar to the active directory user browser discussed previously, the active directory groups may be further investigated in relation to logins and other metrics and thus will not be further described. More specifically, searches on groups will resolve down to the specific users within each group and then activity on these group users will be queried and/or displayed. In some embodiments, groups can be referenced within filters that are used by various processing objects (e.g., reports, searches, alarm rules, global log processing rules, etc.). Similarly, when these processing objects are used, the groups may be resolved to the group users and the resulting user list is the filter applied against log messages that are processed. In other embodiments, information on specific user accounts within a log message can be pulled and displayed from the directory service information that was synchronized.

Figure 47:
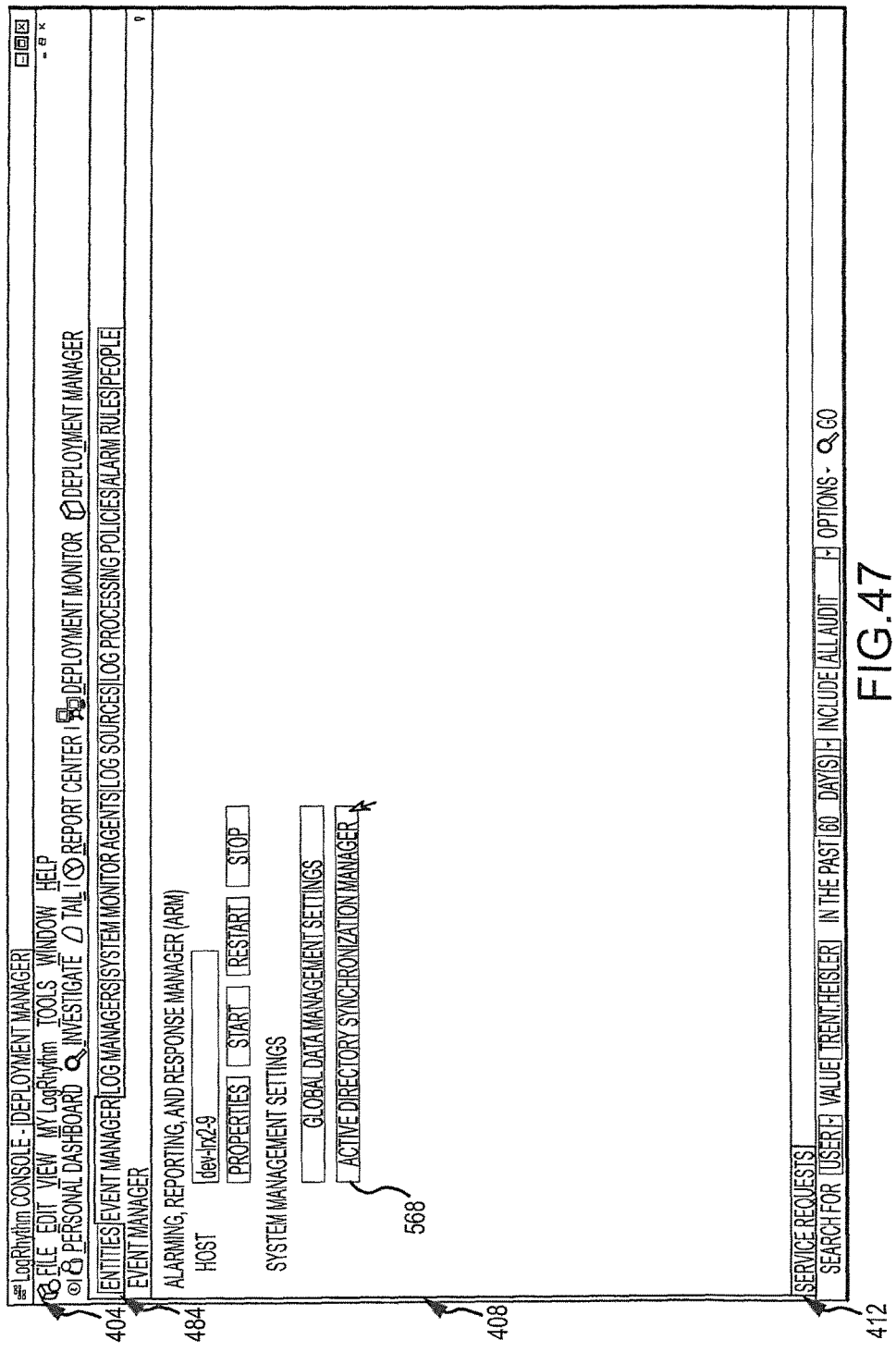
FIG. 47 illustrates a view of the user interface of FIG. 36, but after an "event manager" tab has been manipulated in the control panel of the user interface.

As mentioned previously, the user information (e.g., user and/or group membership information) viewable in the active directory user and group browsers may be retrieved from the one or more directory services and stored in any appropriate database. To acquire such data from the directory service(s), a synchronization process may be automatically or manually configured to run according to any appropriate schedule. For instance, and with respect now to FIG. 47, an "active directory synchronization manager" button 568 may be manipulated (e.g., clicked) to set up and perform one or more synchronizations between the directory service(s) and the one or more databases storing the user and/or group membership information. As can be seen, an "event manager" tab of the number of tabs 484 may be manipulated under the deployment manager button in the control panel 404 to allow access to the active directory synchronization manager button 568. However, it should be appreciated that this button or feature may be accessed from other views or screens within the console.

Figure 48:
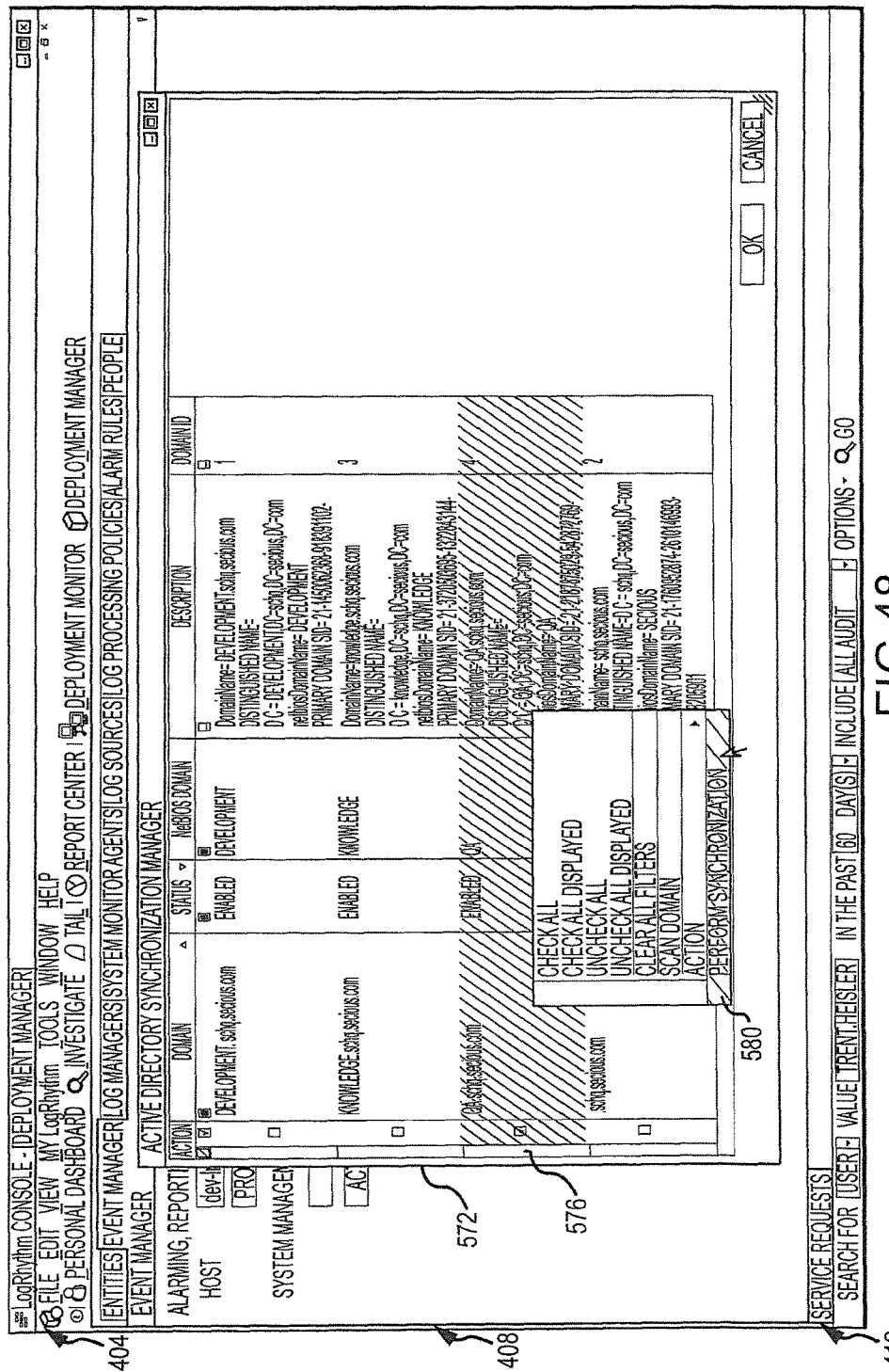
FIG. 48 illustrates a pop-up window having a grid of various domains of a data system, where one of the domains has been selected and appropriately manipulated to cause the display of a drop-down menu and a "perform synchronization" button has been selected.

Turning now to FIG. 48 and upon manipulation of the active directory synchronization manager button 568, an active directory synchronization manager pop-up window 572 is displayed in the presentation area 408 and includes a list of domains 576 that are configured on the data system. Each of the users and groups displayed in the previously discussed active directory user and group browsers may be members of at least one of the domains listed in the pop-up window 572. Of course, additional domains may be created or administered on the data system and may be displayed in the pop-up window 572. Also, fewer domains than shown in the pop-up window 572 may be present. In any event, one or more of the domains 576 may be properly selected (e.g., by clicking a checkbox) and a "perform a synchronization" button or tab 580 may be manipulated (e.g., which may be displayed by right clicking or otherwise manipulating a portion of the pop-up window 572) to synchronize data (e.g., user activity data) between the selected domain(s) of the active directory and the database(s) from which the active directory user and group browsers display user activity information. Although not shown, one or more synchronization processes can be manually performed as needed or can be set to automatically run according to any desired schedule.

Another of the tools available within the deployment manager may be a "log distribution services" engine or feature that broadly allows log data to be shared with one or more receiving entities (e.g., internal users, third-party applications, servers, service providers, etc.) based on contextual metadata contained within or otherwise associated with the logs (e.g., where the metadata is generated as part of processing of the logs). Advantageously, administrators and other users can make such distribution decisions at a more fine-grained level (e.g., based on the content of one or more specific metadata fields). As will be discussed below, logs, events, and/or alarms can be distributed based on one or more policies to one or more receivers or receiving entities. All logs may be properly collected and transferred to one or more log managers, and the log managers can thereafter "relay" information related to such logs (e.g., original text of such logs, one or more events designated from such logs, alarms related to such logs) to other "listeners" for central log management. For instance, collected application logs can be directed to a syslog server (e.g., external syslog receiver) or file server for use by operations and application teams in debugging and troubleshooting. As another example, those logs that have risen to the level of an "event" can be sent to managed security service providers or existing event management solutions. Another arrangement may entail writing distributed logs to one or more flat files, distributing via standard or proprietary network protocols, and/or writing directly to databases.

Figure 49:
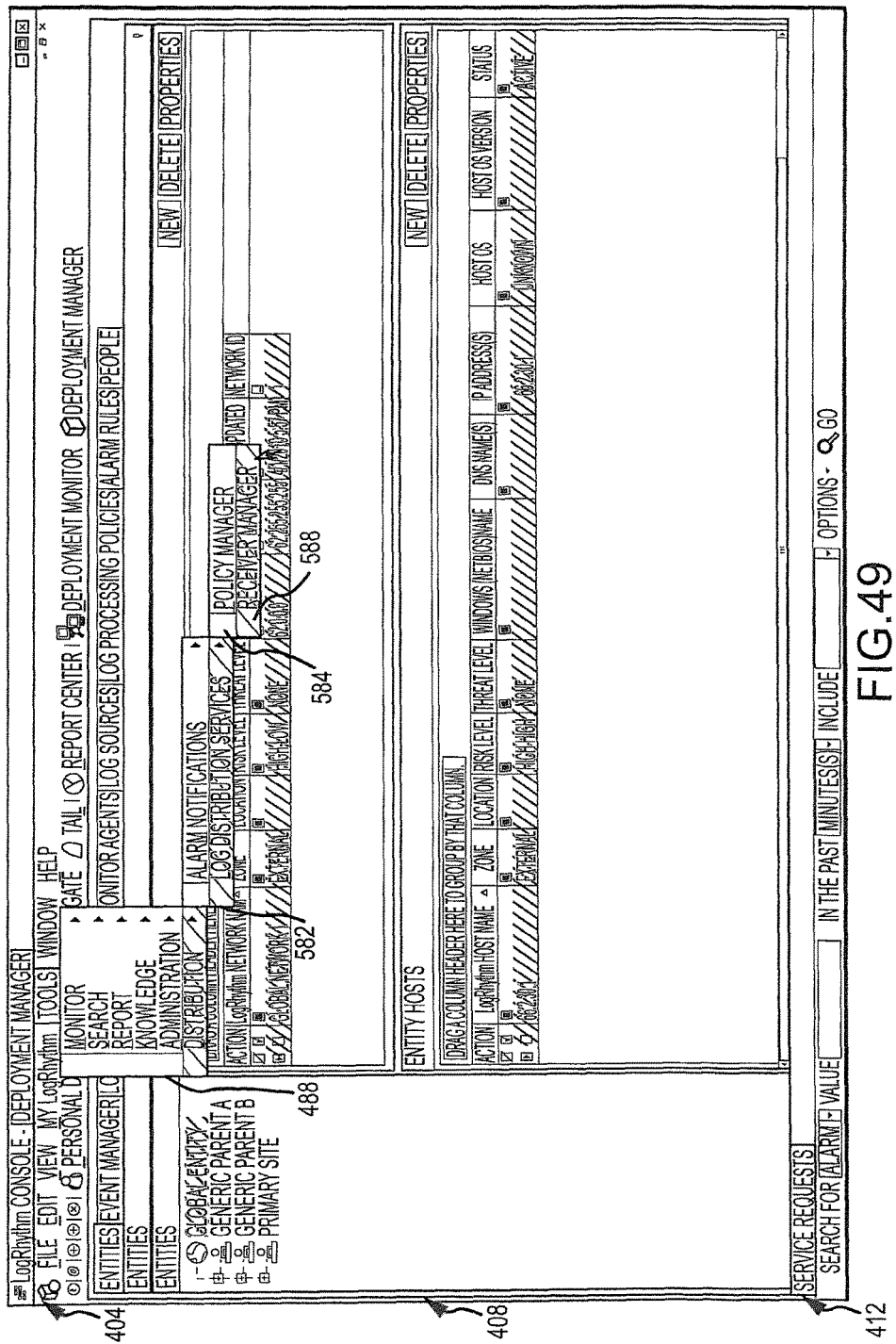
FIG. 49 illustrates various drop-down menus available after manipulation of the deployment manager button of FIG. 36.

In use, and turning now to FIG. 49, a user may first set one or more receivers by way of accessing a receiver manager button 588 in the control panel 404. The receiver manager button 588 may be accessed by way of accessing, for instance, the "tools" drop-down menu 488, a "distribution" drop-down menu 582, and then a "log distribution services"

drop-down menu 584. The below disclosure will begin with a discussion of a "receiver manager," followed by a discussion of a "policy manager."

Figure 50:
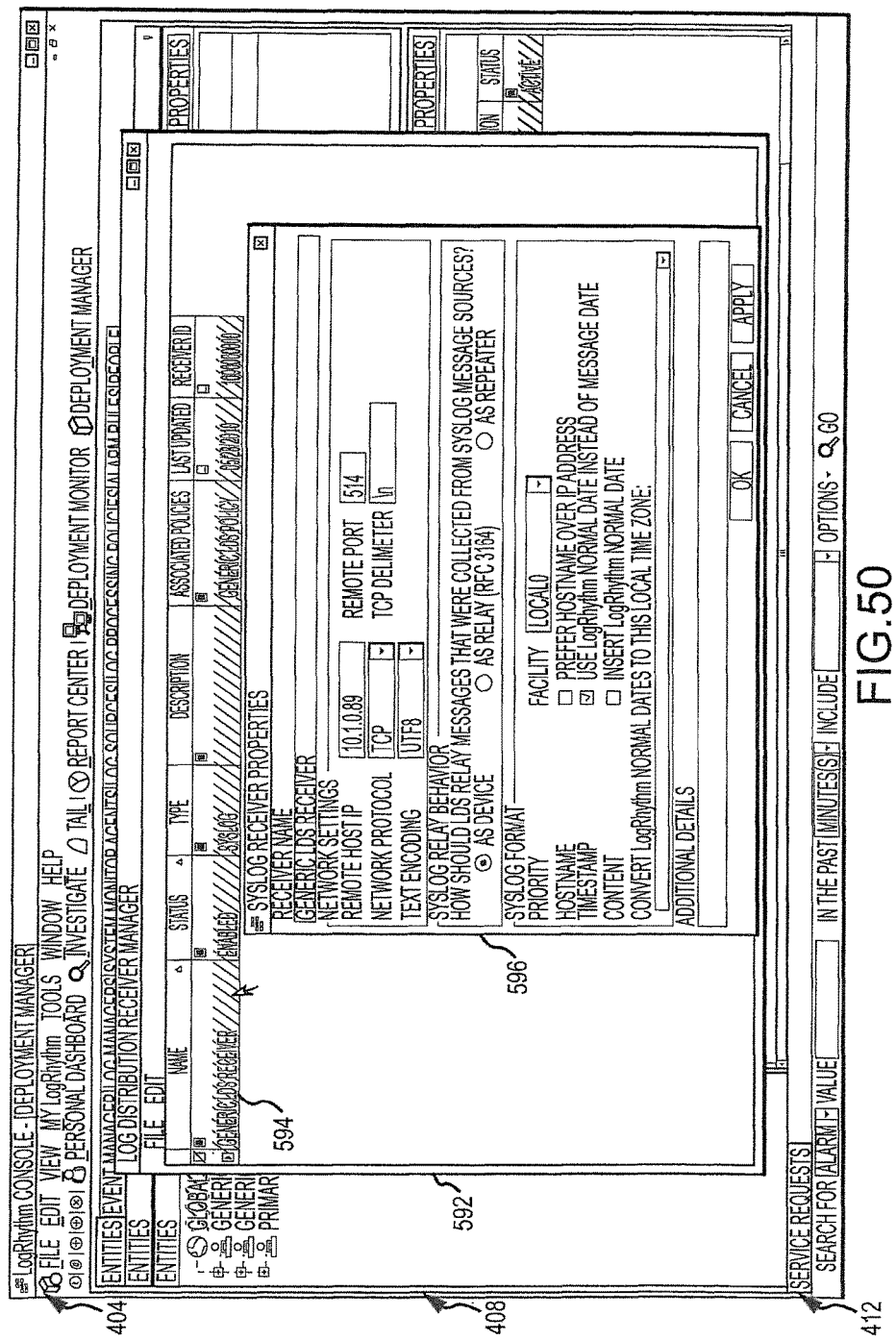
FIG. 50 illustrates a "log distribution receiver properties" pop-up window resulting from the manipulation of a "receiver manager" button from FIG. 49.

Upon manipulation of the receiver manager button 588 shown in FIG. 49, a receiver manager pop-up window 592 may be displayed in the presentation area 408 as shown in FIG. 50. The receiver manager pop-up window 592 may provide an itemized list 594 of all receivers to which one or more distribution policies may be assigned, and each line in the itemized list 594 may include corresponding information for the respective receiver. For instance and as shown, the status of a generic receiver is "enabled," the type of the generic receiver is a "syslog" server, and the generic receiver has been assigned a generic policy (note that the policies will be described below). While only a single receiver has been shown, it should be appreciated that additional receivers or receiving entities can also be established (e.g., by clicking on a file button in the top of the pop-up window 592 and choosing to create a new receiver).

In any event, a "receiver properties" pop-up window 596 may be displayed in the presentation area 408 by appropriately manipulating one of the receivers in the itemized list 594 (e.g., double-clicking on a desired receiver in the itemized list 594, right clicking on the receiver in the itemized list 594). As can be seen, additional information in relation to the receiver such as the IP address of the receiver, the network protocol to be used, etc. can be established or otherwise set up via the receiver properties pop-up window 596. In one arrangement, an operator can choose, for instance, to utilize normalized dates instead of the message date (i.e., the time stamp generated by the log source), or can even choose to convert the normalized dates to the local time zone of the receiving entity. In any case, an "okay" or "apply" button (not labeled) can be manipulated to set or confirm such settings for this receiving entity.

Figure 51:
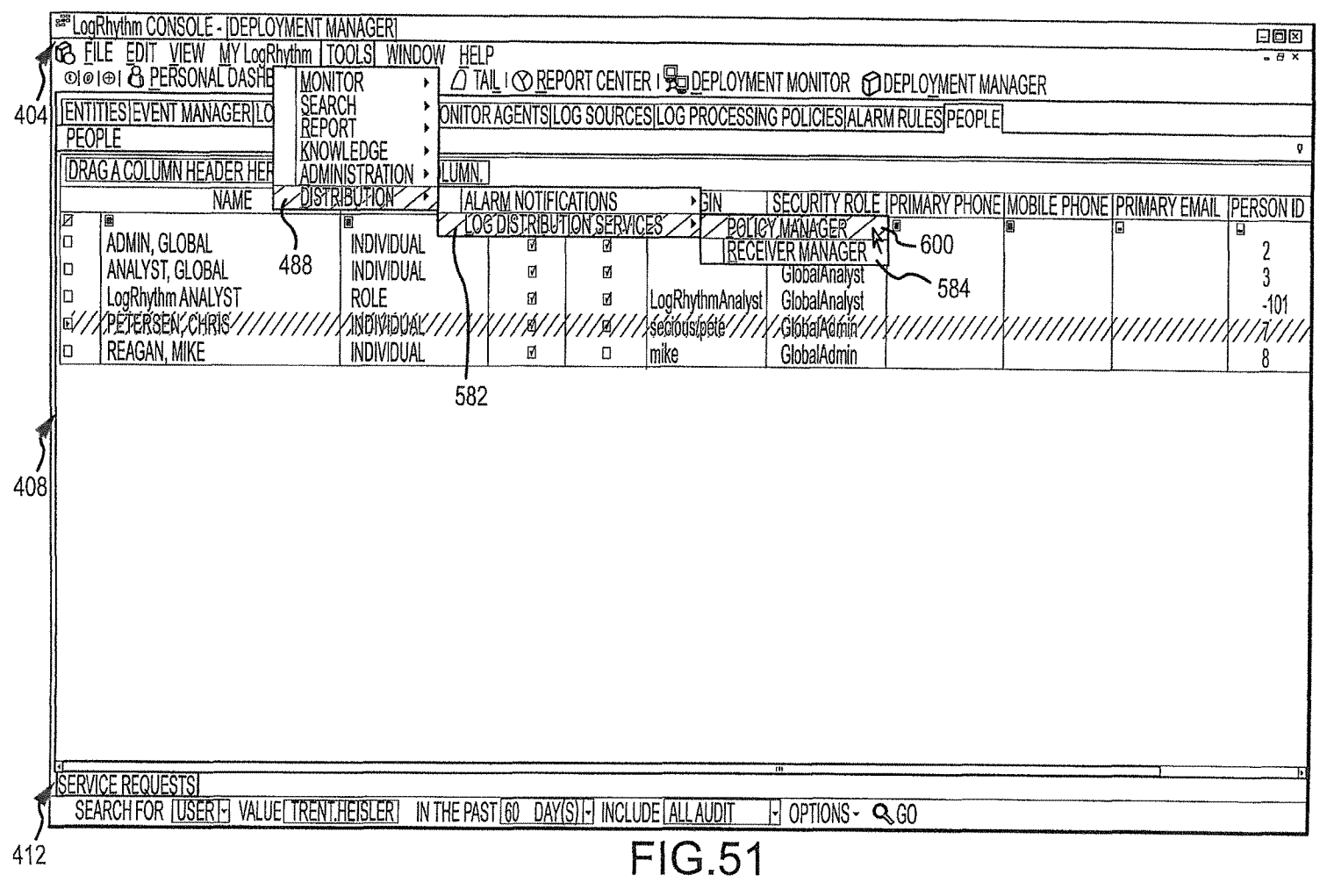
Figure 52:
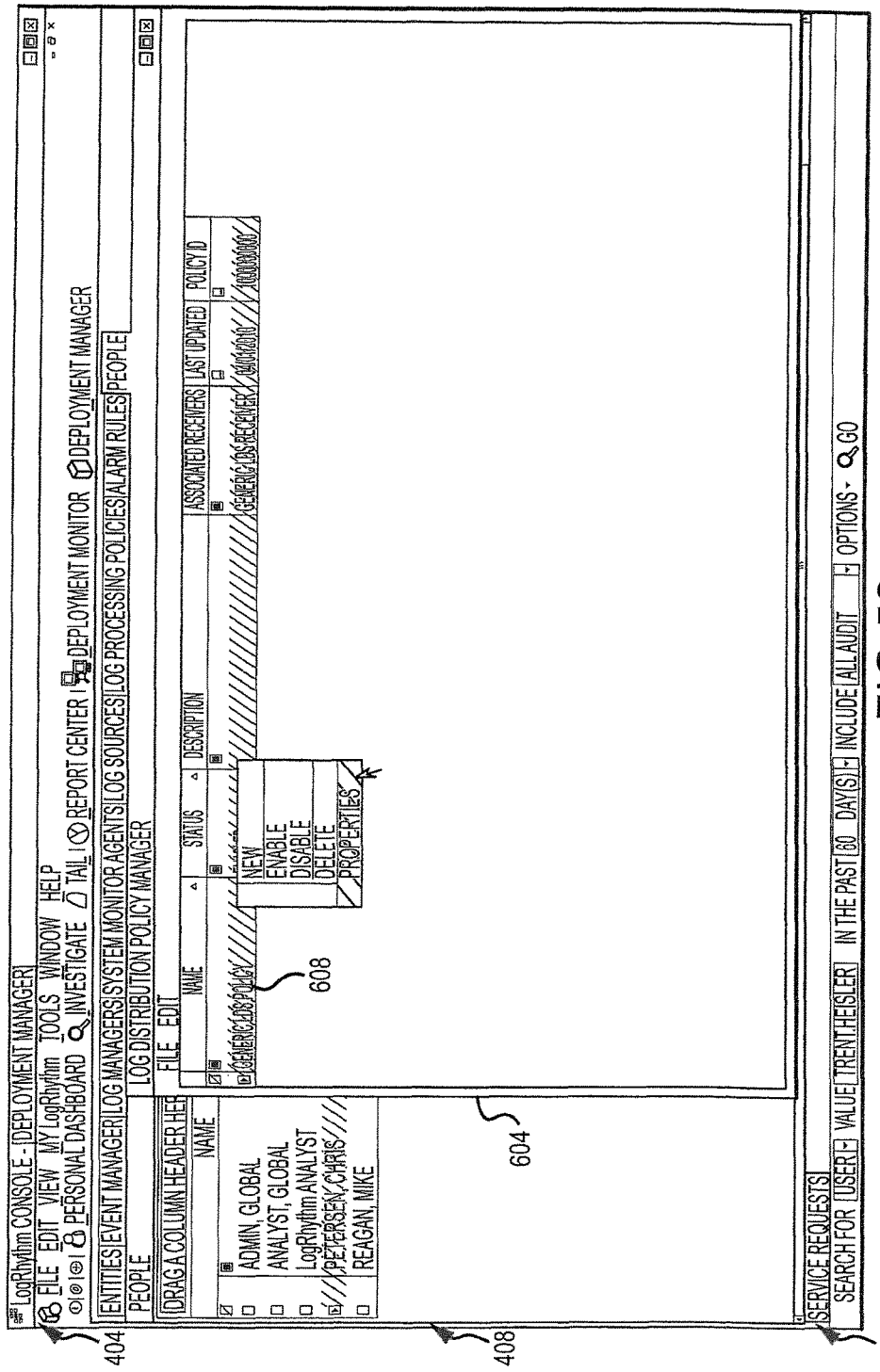
FIG. 52 illustrates a pop-up window resulting from the manipulation of the policy manager button of FIG. 51, where the pop-up window includes an itemized list of distribution policies which can be assigned to the distribution receiver of FIG. 50.
Figure 53:
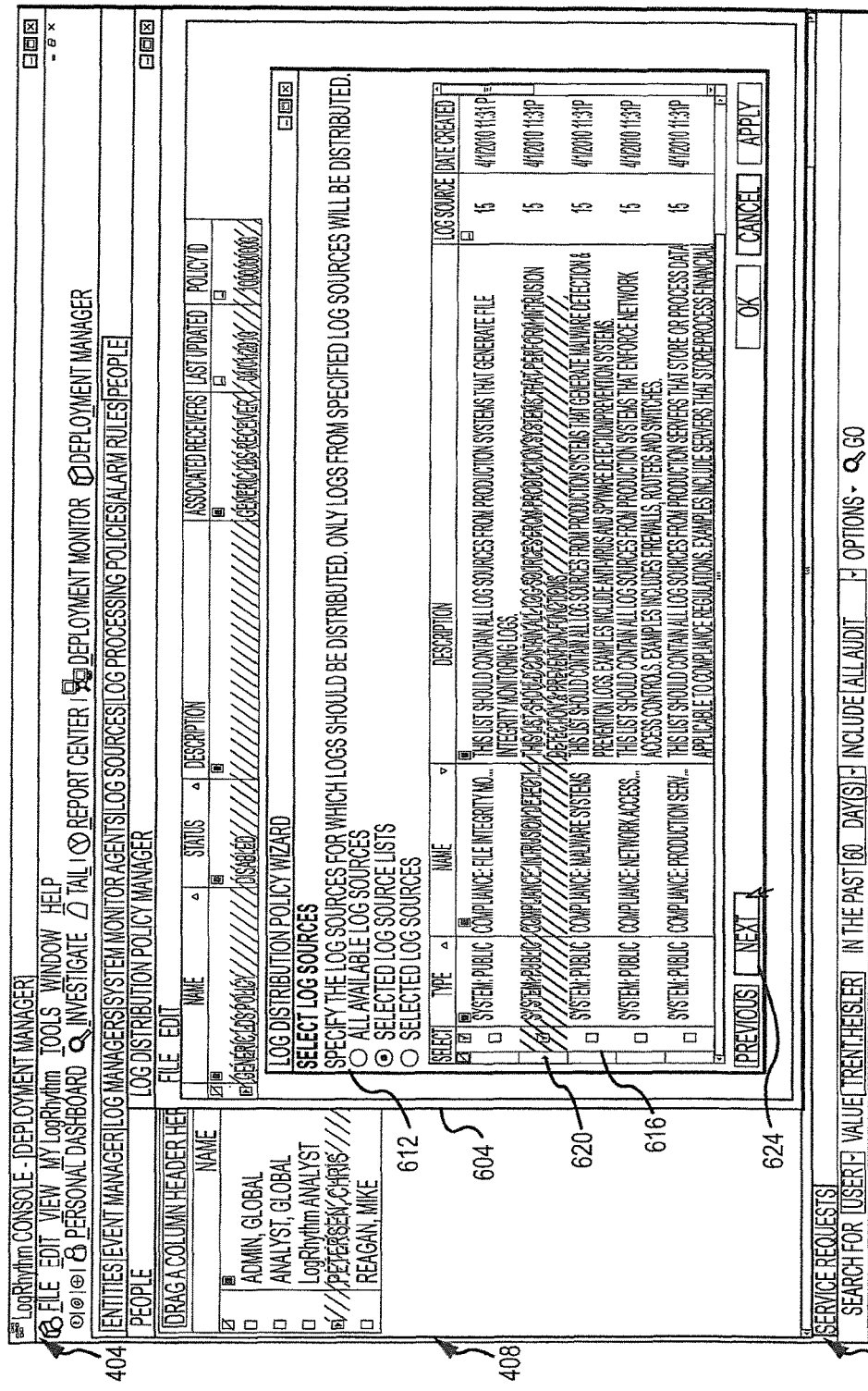
FIG. 53 illustrates a pop-up window associated with the editing or creation of a log distribution policy, where the pop-up window allows a user to associate one or more log sources with a particular policy which can be distributed to one or more log distribution receivers.

Once the one or more receiving entities have been established, one or more distribution policies can be established which can then be applied or associated with the previously established receiving entities. With reference to FIG. 51, a user may access a policy manager button 600 in the control panel 404 by way of accessing, for instance, the "tools" drop-down menu 488, the "distribution" drop-down menu 582, and then the "log distribution services" drop-down menu 584. Manipulation of the policy manager button 600 may cause the display of a policy manager pop-up window 604 as shown in FIG. 52. Similar to the receiver manager pop-up window 592 (shown in FIG. 50), the policy manager pop-up window 604 may include an itemized list 608 of all the various policies which may be applied to receiving entities. Again, while only a single generic policy has been shown in the itemized list 608, additional policies can be created and/or added. Also, various information may be shown that is associated with each policy such as a status of the (e.g., enabled, disabled), a description of the policy, associated receivers, etc. In any case, to establish and/or edit one or more properties of a particular policy, the line in the itemized list 608 corresponding to the particular policy may be appropriately manipulated (e.g. double clicked on, right-clicked on) to cause the display of a "policy wizard" pop-up window 612 in the presentation area 408 as shown in FIG. 53.

Initially, the log sources from which to gather logs and/or events may be selected for this particular policy. The pop-up window 612 may include an itemized list 616 of various classifications of log sources (e.g., "log source lists") in addition to a number of log sources within each classification. As just one example, item 620 includes "Compliance: Intrusion Detection"-type log sources that contains log sources from production systems that perform intrusion detection and prevention functions. As shown, all available log sources may be selected, one or more log source lists may be selected, and/or one or more log sources may be selected. Once the desired log source lists or log sources have been selected, a "next" button 624 may be manipulated to bring the user to the next step of the policy wizard.

Figure 54:
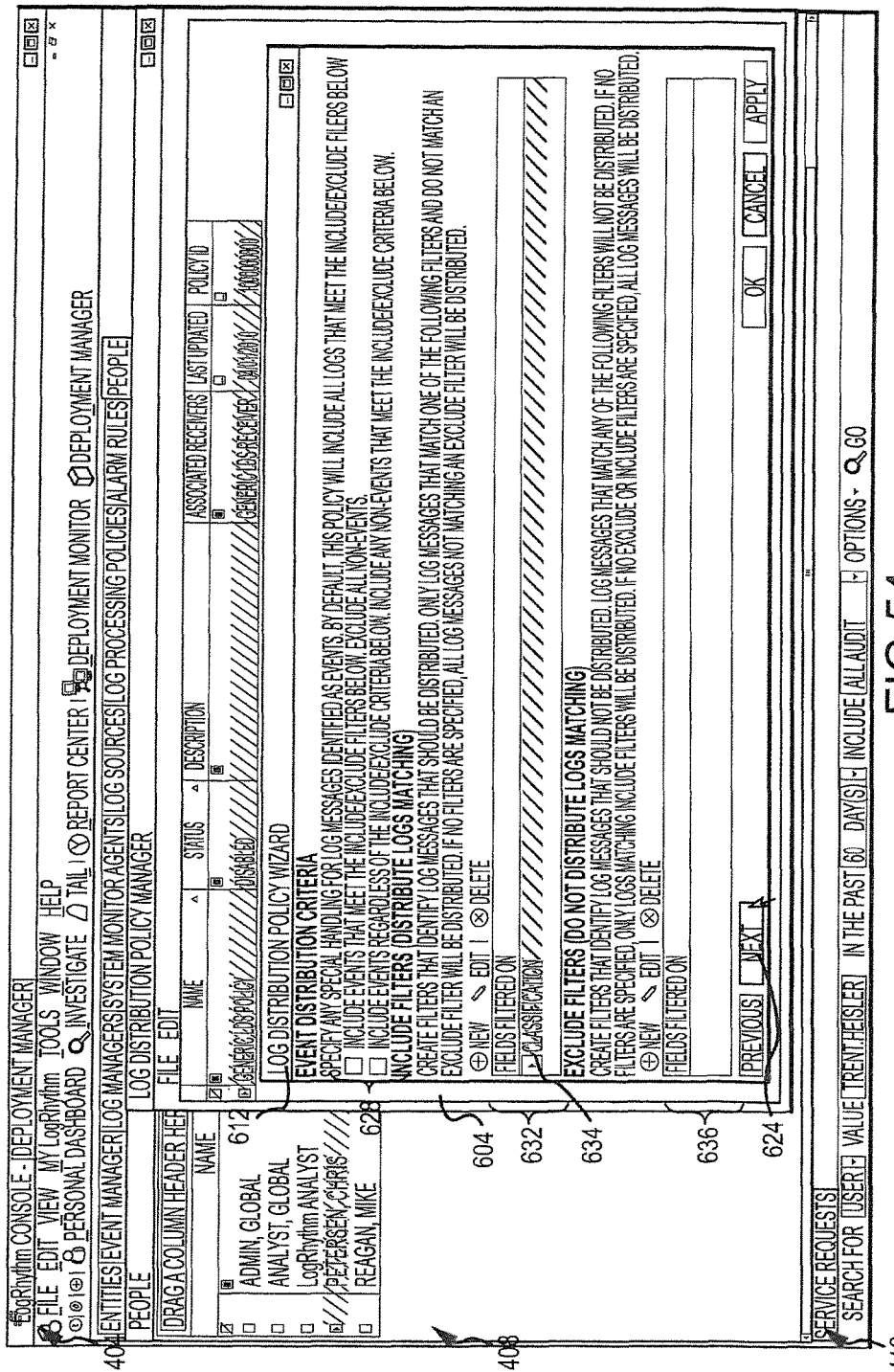
FIG. 54 illustrates the pop-up window of FIG. 53, where the pop-up window allows a user to specify include and exclude filters in relation to logs that will be distributed to the receiving entity as part of this particular distribution policy.

Turning to FIG. 54, special handling may be specified for any log messages from the log sources that have been classified by the one or more log managers as "events" (i.e., the logs have matched one or more log processing rules to rise to the level of an event). For instance, one section 628 of the pop-up window 612 may allow a user to include events that meet "include" or "exclude" filters (discussed below) and exclude logs from such sources that have not risen to the level of events. Alternatively, a user may choose to include all events regardless of any include/exclude filters in addition to non-events that have met such include/exclude filters.

As seen in section 632, one or more "include" filters may be specified. Logs that match at least one of the include filters and do not match any of the exclude filters may be distributed to the selected receiving entities. For instance, logs may be included based on a classification of the logs. A "classification" button 634 in the include filter section 632 may bring up another pop-up window (not shown) in which the user may choose one or more specific classifications (e.g., those discussed in the views 416 shown in FIG. 23) by which to filter incoming logs for distribution to one or more specified receiving entities. Other types of include filters may also be included such as direction (e.g. internal, external), number of bytes, etc.

Additionally, one or more "exclude" filters may be specified in section 636 such as classification, direction, number of bytes, etc. It should be appreciated that the selection of one or more log sources along with any include/exclude filters to distribute to one or more receiving entities may be embodied in the form one or more log processing rules against which received logs may be processed by the one or more log managers. That is, the one or more log managers or processing platforms may process received logs using one or more log processing rules that, for instance, distinguish between first types of logs (e.g., those that match a particular log source or sources) and second types of logs (e.g., those that do not match a particular log source resources). Each distribution policy may include additional rules as well (e.g., a second log processing rule distinguishing between the second types of logs and third types of logs).

Figure 55:
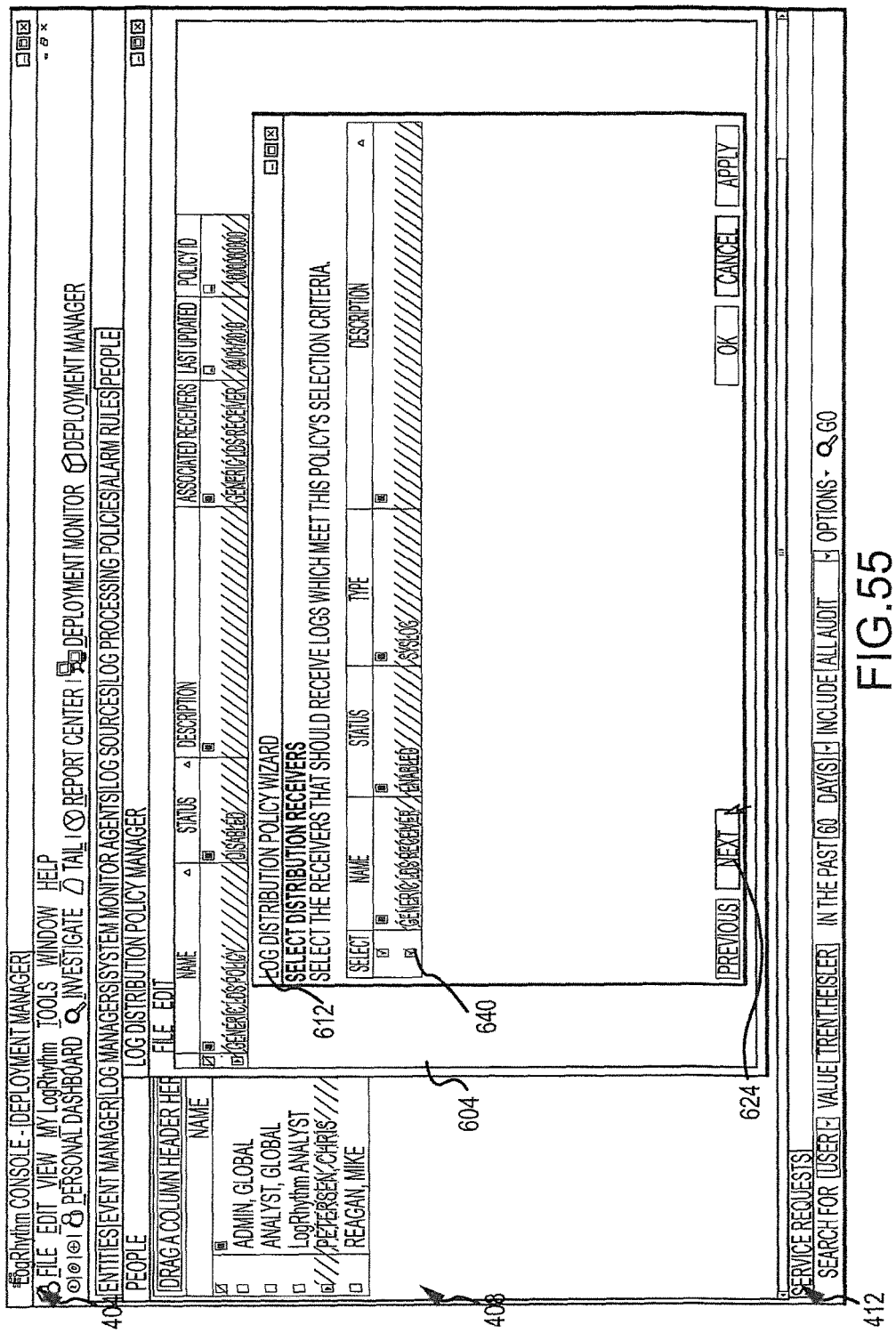
Figure 56:
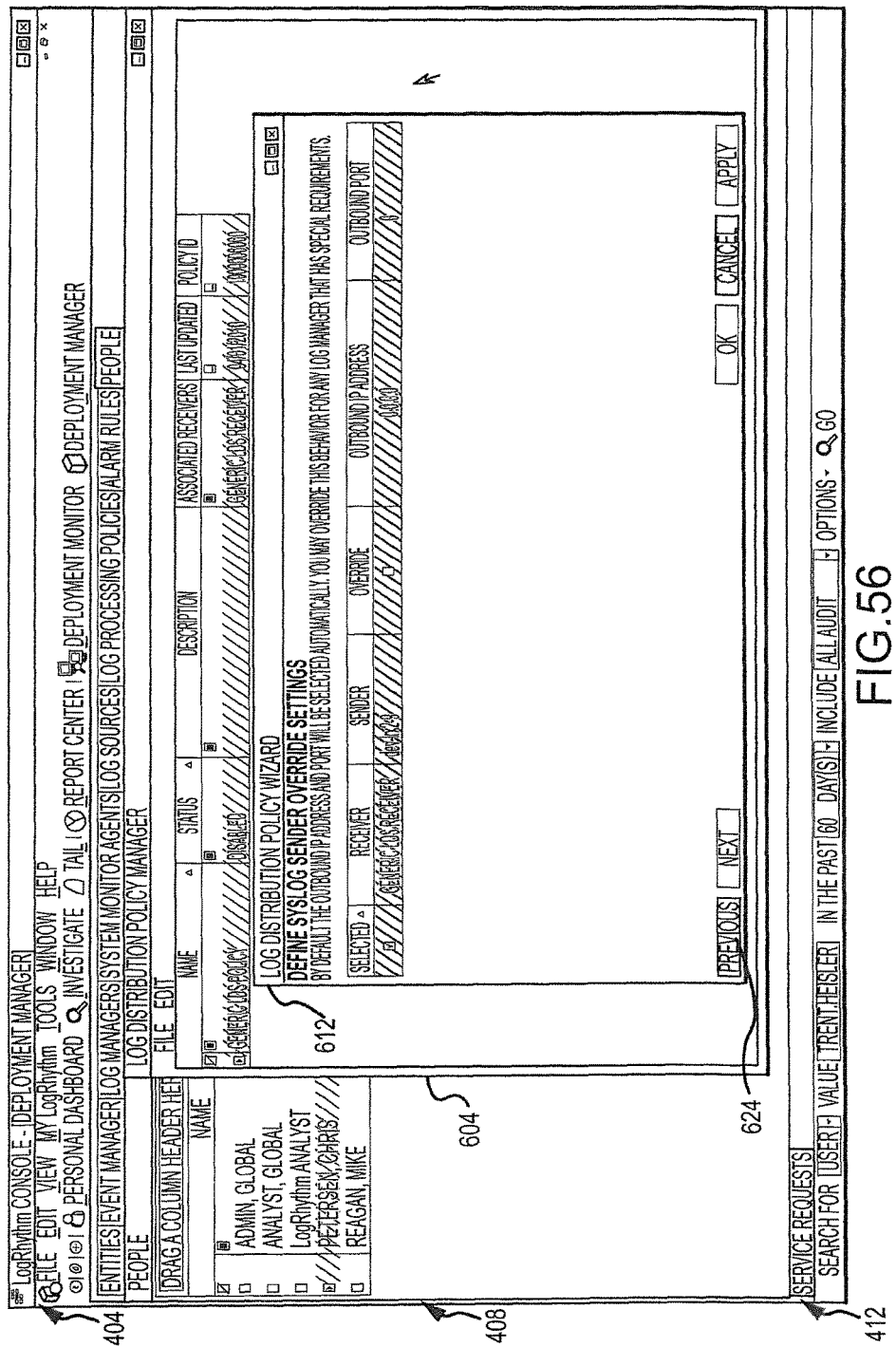
FIG. 56 illustrates the pop-up window FIG. 53, where the pop-up window allows a user to specify the outbound IP address and port associated with the receiver.
Figure 57:
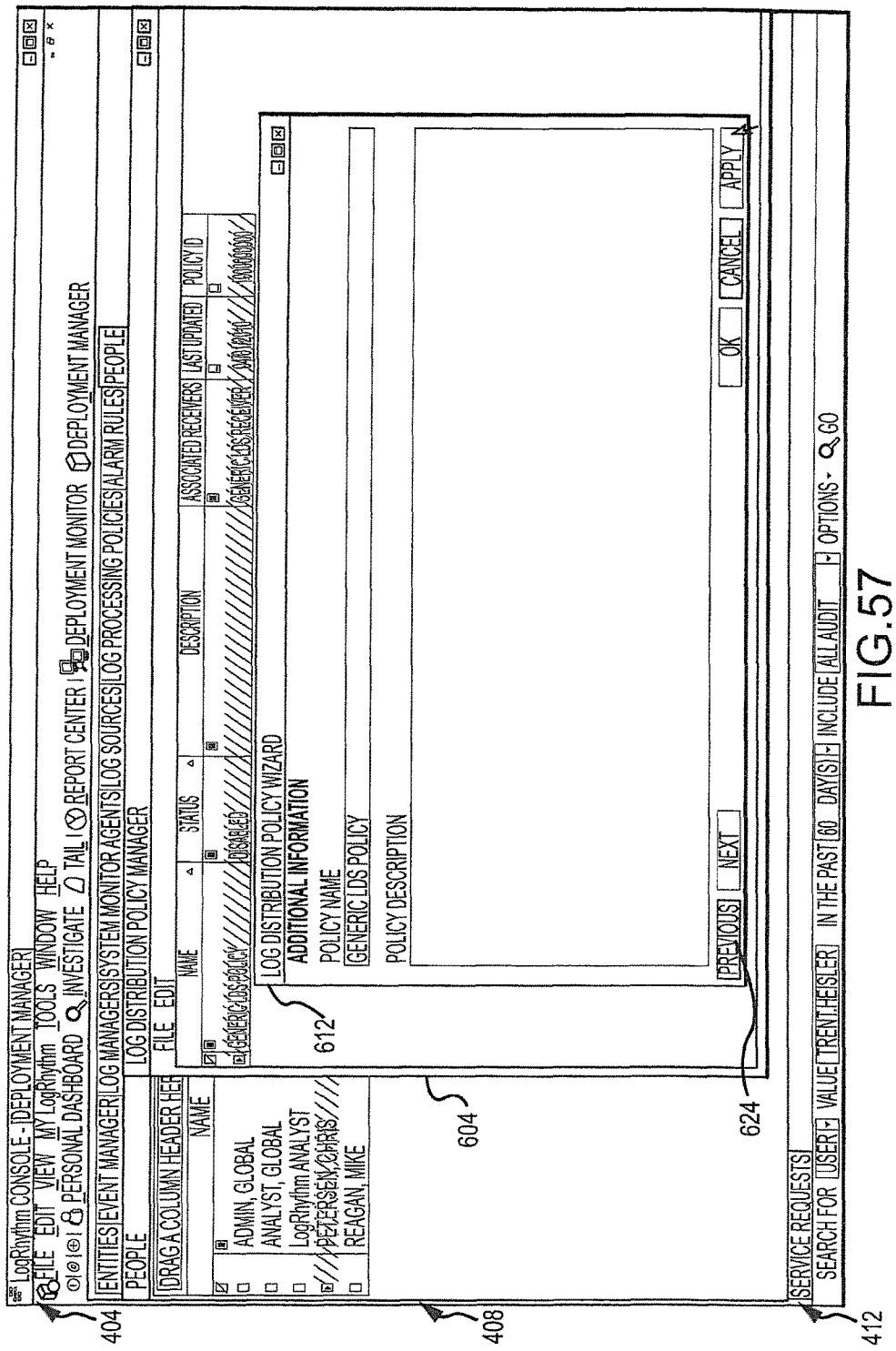
FIG. 57 illustrates the pop-up window of FIG. 53, where the pop-up window allows a user to specify additional information associated with this particular log distribution policy.

Once any include or exclude filters have been set, the next button 624 may be manipulated to bring the user to the next step of the policy wizard. As seen in FIG. 55, an itemized list 640 may be displayed in the pop-up window 612 including all of the receiving entities that have been established. The user may select (e.g., by clicking a check box) one or more of the receivers in the itemized list 642 to which the present distribution policy (e.g., the "generic policy") may be assigned to. After manipulating the next button 624, the user may be directed to additional steps of the policy wizard whereby, for instance, the user can choose which outbound IP address and port to be used when sending or distributing the logs and/or events to receiving entities (see FIG. 56), and/or provide a description of the present distribution policy (see FIG. 57). Once an "ok" or "apply" button (not labeled) has been manipulated, the log distribution services engine has been set up at which point incoming logs, events and/or alarms will be distributed to the selected receiving entities according to the associated distribution policy or policies.

It should be appreciated that the log distribution services engine or feature of the console may instruct the one or more log managers or processing platforms to distribute log messages and/or events to the receiving entities according to the selected distribution policies using any appropriate protocol. For instance, user datagram protocol ("UDP") based syslog or transmission control protocol ("TCP") based syslog may be utilized. Furthermore, the log managers or processing platforms may utilize contextual metadata of logs that have already been at least partially processed in making distribution determinations based on the particular policies. More specifically, and as previously discussed in relation to, for instance, FIGS. 4 and 5, metadata fields may be prepared for one or more logs upon such logs being initially received and processed after matching a log processing rule. In this regard, at least part of the determination as to whether a log messages matches a particular policy for distribution to one or more receiving entities may entail consideration of such metadata fields (e.g., fields related to log sources, direction, and the like).

Another of the tools available within the deployment manager may be a "global log processing rule manager" engine or feature that broadly allows an administrator or other user to perform a "contextual" log analysis by way of overriding settings (e.g., log distribution settings, data management settings, event management settings) based on the specific context of a log message (e.g., where that context is determined based on prepared meta-data values, such as those discussed above in relation to FIGS. 4-5) in addition to the classification of the log message. More specifically, the global log processing rule manager provides a way to apply data management settings (e.g., which logs are to be archived, indexed, stored in raw form, forwarded to a data warehouse or forwarded as an event; for which logs are aggregation settings to be customized; and the like) across all log managers, log sources and log processing policies to logs that meet specific criteria.

As will be discussed below, various types of global log processing "overrides" may be applied to log messages that match classification criteria (e.g., network/deny, authentication/failure, where the classification criteria may in some arrangements be gleaned from contextual metadata of the log messages) and can be customized with include and/or exclude filters for log metadata (e.g., as discussed above in relation to the log distribution services engine, see FIG. 54). For instance, a global log processing rule might be configured to forward all authentication logs from privileged users to the Event Manager. In this regard, a user may be provided a manageable manner of determining how logs will be processed around the data system regardless of various disparate settings used by various log sources and/or log processing policies. Furthermore, users may be provided with fine-grained control of the data management settings for a given log message (e.g., based on classification such as an event along with contextual metadata fields after a log has been at least initially processed). Stated differently, users can control specific data management settings on a log-by-log basis (e.g., instead of an "all or nothing" basis). It should be appreciated that logs that do not match the various global log processing filters can still be processed normally per classification based data management (CBDM) or standard data management settings.

Figure 58:
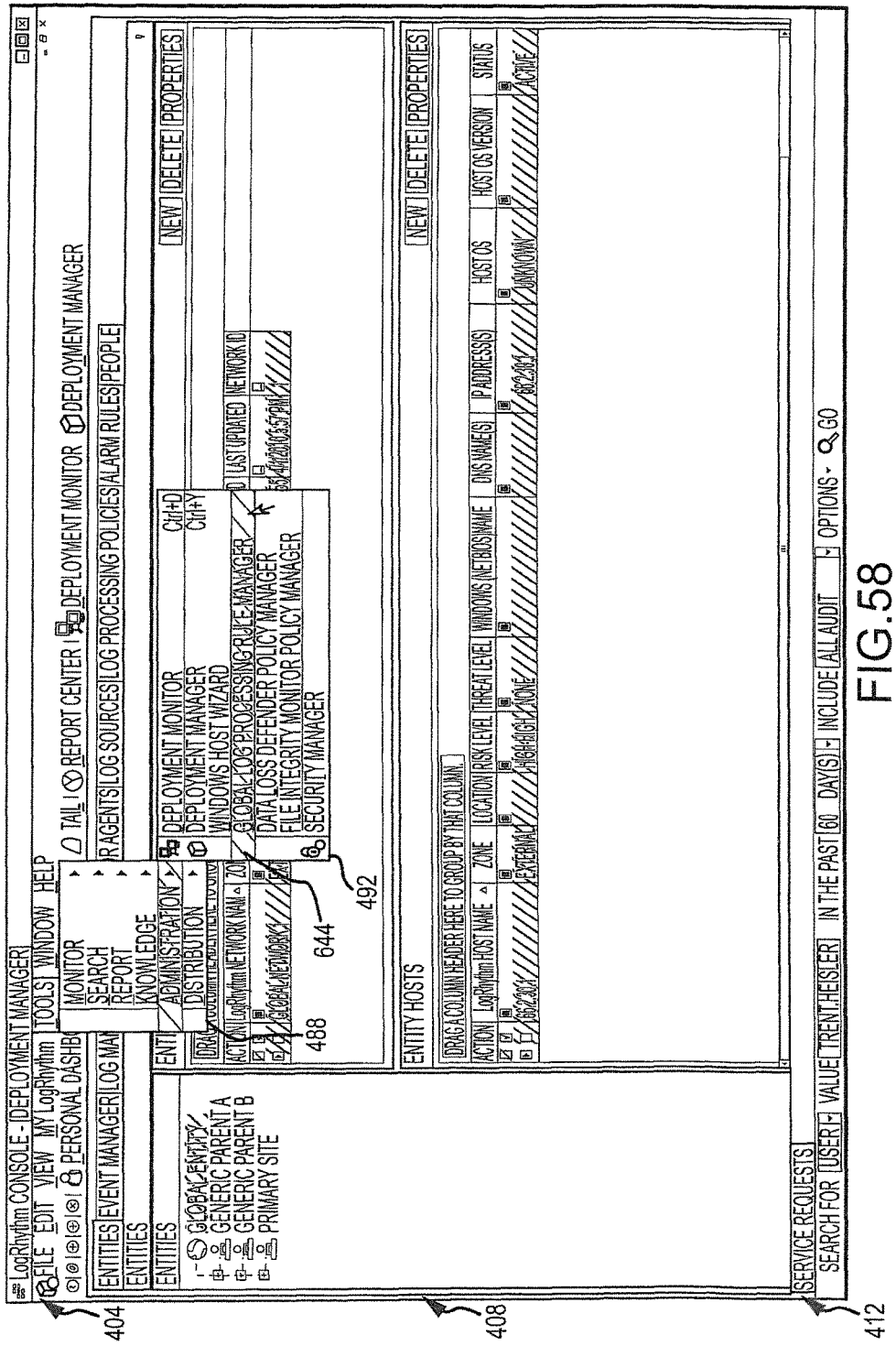
FIG. 58 illustrates various drop-down menus available after manipulation of the deployment manager button of FIG. 36.
Figure 59:
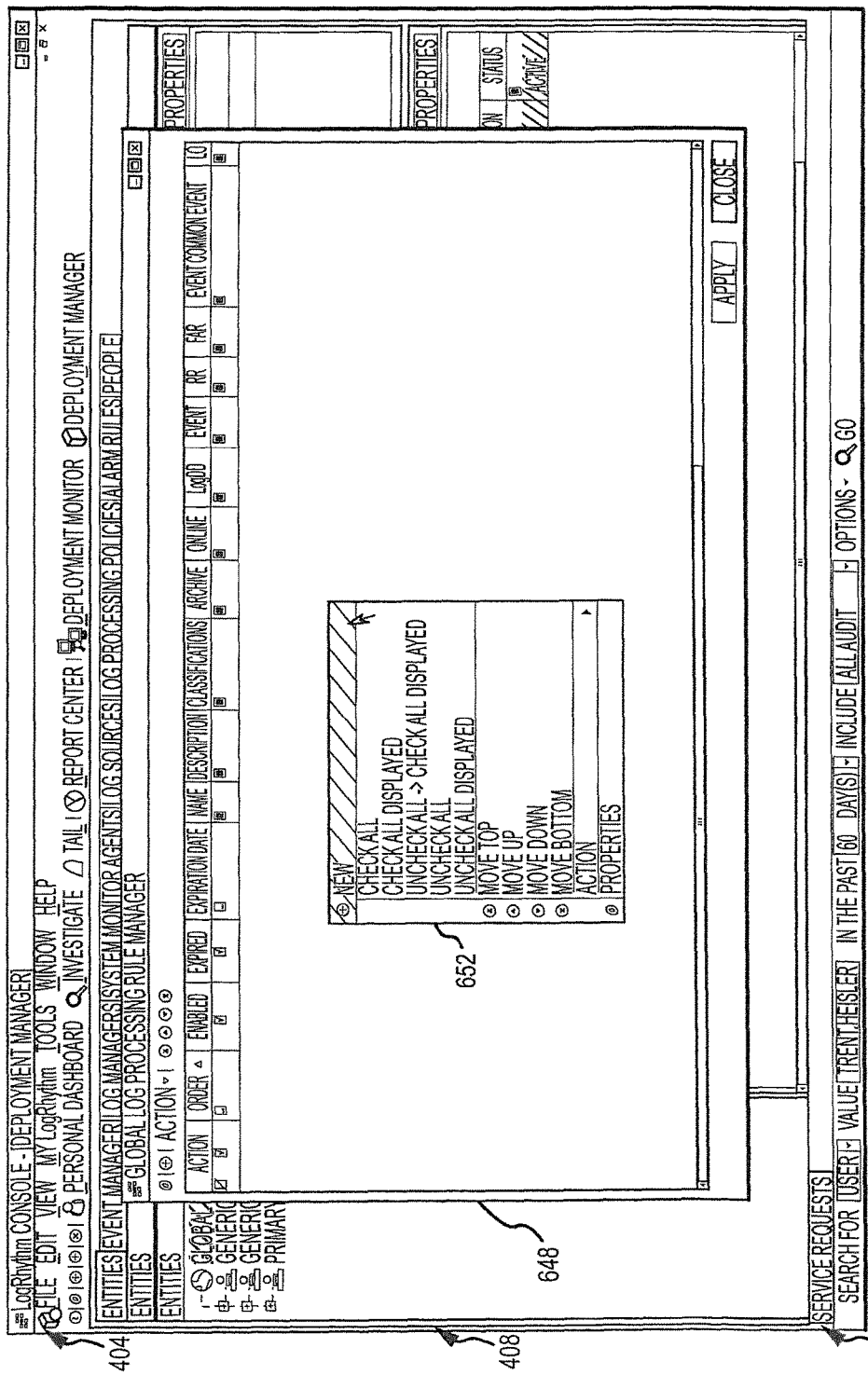
FIG. 59 illustrates a pop-up window resulting from the manipulation of a "global log processing rule manager" button of FIG. 58, where the pop-up window may include an itemized list of global log processing rules (not shown), and where the pop-up window has been manipulated to cause the display of a drop-down menu.

Turning now to FIG. 58, a global log processing rule manager button 644 may be accessed by manipulating the "tools" drop-down menu and then the "administration" drop-down menu 492. As seen in FIG. 59, manipulation of the global log processing rule manager button 644 may cause the display of a global log processing rule manager pop-up window 648 in the presentation area 408. Although not shown (because no global log processing rules have yet been created in the illustration), the pop-up window 648 may include an itemized list of all global log processing rules that have been created. As can be seen in the top of the pop-up window 648, each global log processing rule can be selectively enabled or expired, and corresponding information for each global log processing rule may be provided (e.g., expiration date, name, description, classifications). To create a new global on processing rule, the pop-up window 648 may be appropriately manipulated such as, for example, right clicking on the pop-up window 648 to bring up another pop-up window 652, or manipulating a "create new global log processing rule" icon in the pop-up window 640 (e.g., see the "plus" icon in the top left corner of the pop-up window 640).

Figure 60:
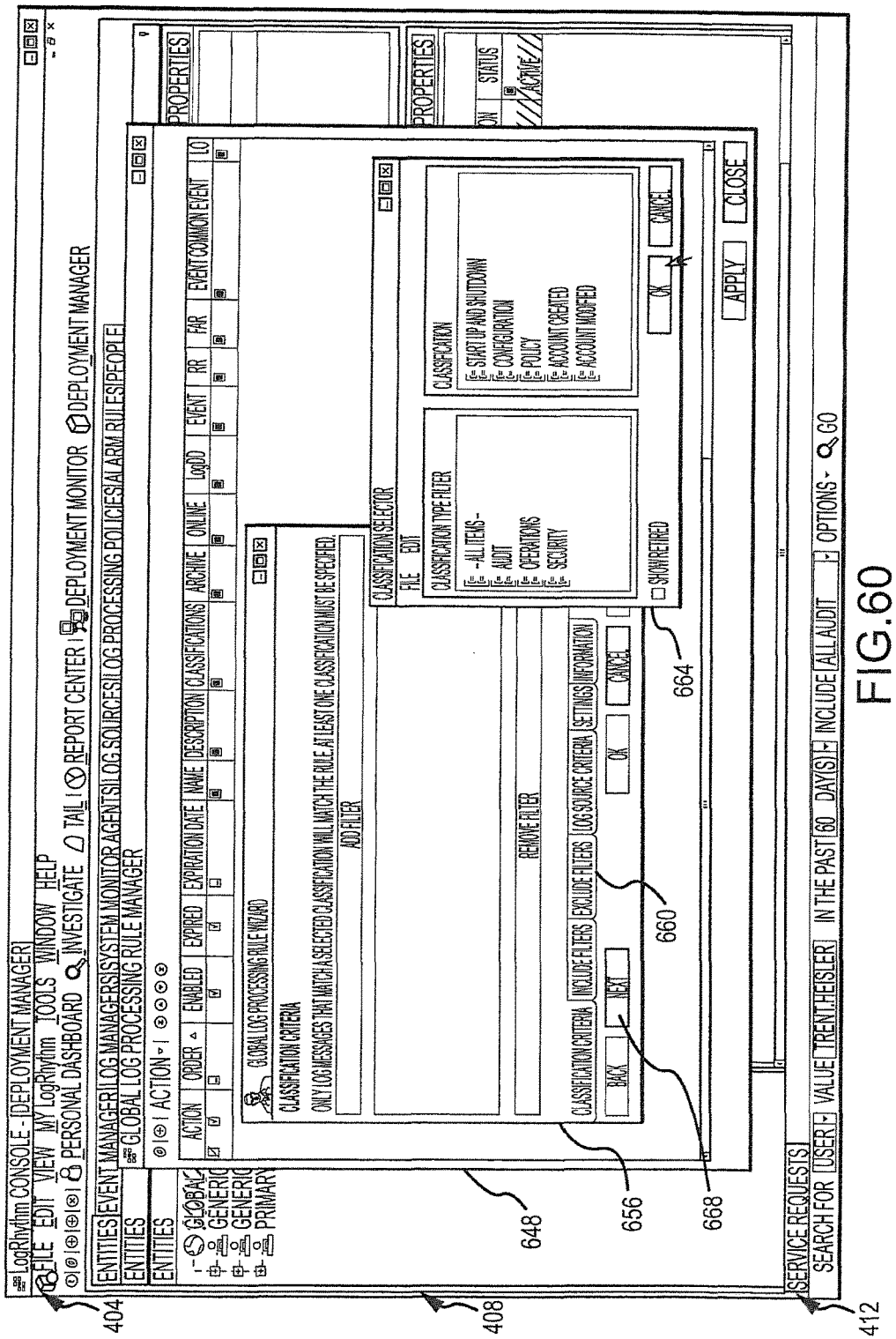

Upon deciding to create a new log processing rule, a "global log processing rule wizard" pop-up window 656 may be displayed in the presentation area 408 as seen in FIG. 60. It should be noted that the global log processing rule wizard can also be used to edit existing global log processing rules. In any case, and as with the log distribution policy wizard pop-up window 612 discussed previously (see FIGS. 53-57), the global log processing rule wizard may take an operator or user through a series of steps to create a global log processing rule which may be operable to override data and event management settings associated with log sources and/or log policies.

Initially, and as seen in FIG. 60, a user may initially specify those types of logs to which this new global log processing rule may apply (which the processing platform may implement in the form of one or more log processing rules). For instance, upon selecting a "classification criteria" tab in a group of tabs 660 in the pop-up window 656, a "classification selector" pop-up window 664 may be displayed in the presentation area 408. The classification selector pop-up window 664 allows the user to select one or more classifications (see classifications in views 416 in FIG. 23) that this new global log processing rule will be applied to. As discussed previously, logs may be classified according to audit, operations, or security, (each of which may include a number of sub-classifications, sub-sub-classifications, etc), and such classifications may be appended to a log or event message in the form of metadata fields. In addition to classification criteria, this new global log processing rule may be applied to particular logs via specifying include and/or exclude filters, various types of the log source criteria (see discussion in relation to FIG. 53), etc. (see tabs 660 in the pop-up window 656). The user may access such include/exclude filters and log source criteria by, for instance, manipulating a corresponding tab 660 or a "next" button 668. Upon finishing the selection of those types of logs to which this new global log processing rule will be applied to, the user may select the "next" button 668 to move to the next step in the log processing rule wizard.

Figure 61:
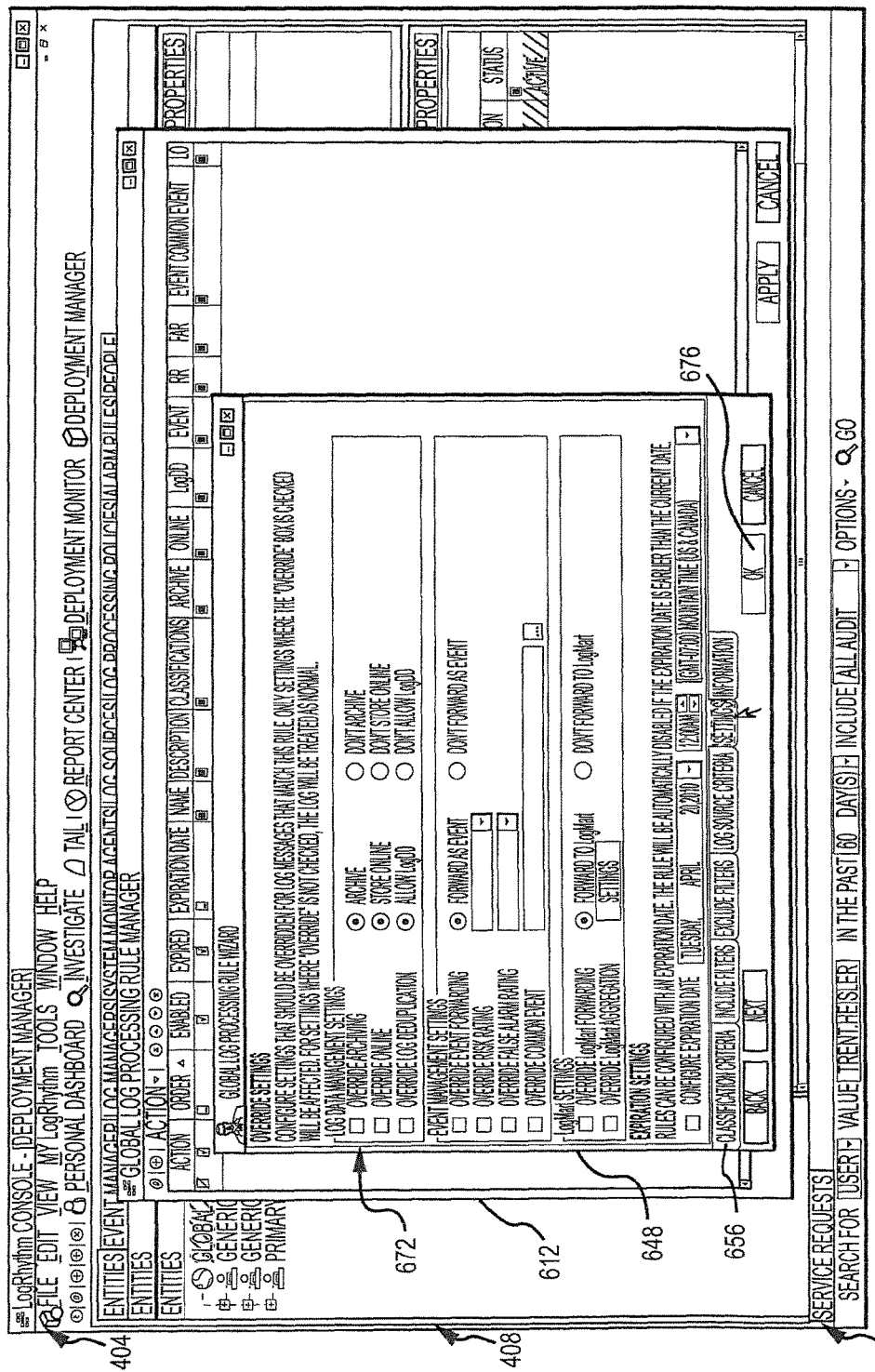
FIG. 61 illustrates one of the pop-up windows of FIG. 60, where one of the pop-up windows allows a user to specify override relationships in relation to actions to the taken for those types of log classifications selected in FIG. 60.

In the next step of the global log processing rule wizard as seen in FIG. 61, various data management settings may be configured that may be overridden for log messages matching this new global log processing rule. For example, one of the settings may be in relation to the archiving of logs (i.e., the storage of log messages in off-line archive files). When an "override archiving" checkbox 672 (or other user manipulable feature) is not checked (or not manipulated), any other or previous settings in relation to the archiving of those types of logs matching the one or more log processing rules (e.g., in relation to classification, include/exclude filters, etc.) will not be affected by this new global processing rule.

However, upon manipulation of the override archiving checkbox 672, a user may then specify or define an "override setting" in relation to matching logs. That is, and as seen near the override archiving checkbox 672, a user can specify whether all matching logs are to be archived or not archived. Similar types of override settings can be defined in relation to other types of settings such as but not limited to onlining (the storage of the logs in a log manager database), log deduplication (efficiently handling redundant data to reduce storage requirements and costs while allowing for quick searches), event forwarding (the forwarding and storing of logs classified as an event in an event manager database), the application of a risk rating (applying a custom risk rating to matching logs), the application of a false alarm rating (applying a false alarm reading to matching logs), and the like. Additionally, global log processing rules can be configured with an expiration date such that a global log processing rule may be automatically disabled when the expiration date is earlier than the current date. It should be appreciated that these override settings may be applied to previously created or later created data/event management settings.

Upon specifying any additional information (e.g., a description of the global log processing rule under an "information" tab in the group of tabs 656), an "okay" button 676 may be selected to end the global log processing rule wizard and thereby set or initiate the newly created global log processing rule. Currently existing global log processing rules may be edited and/or additional global log processing rules may be created. As can be appreciated, these global log processing rules may provide a more transparent manner of overriding data management settings for specific log messages when advanced processing is required. Additionally, global log processing rules may replace any need to create one or more complicated sub-rules in order to override settings.

Another tool that may be available within the deployment manager is a "global data management settings" engine or feature that broadly allows an administrator or other user to both globally configure common settings (e.g., without regard to classification of the logs) and enable classification based data management settings for logs (e.g., with regard to classification of the logs). Settings such as, but not limited to, archiving, onlining, and whether or not logs are to be stored in "LogMart" (a data warehouse operable to efficiently store millions, billions, etc. of log messages in support of trending and reporting). For instance, LogMart may be associated with a front-end tool (e.g., Log Miner) that may be used to analyze the information from LogMart (along with reports). may be configured based on log classification.

Figure 62:
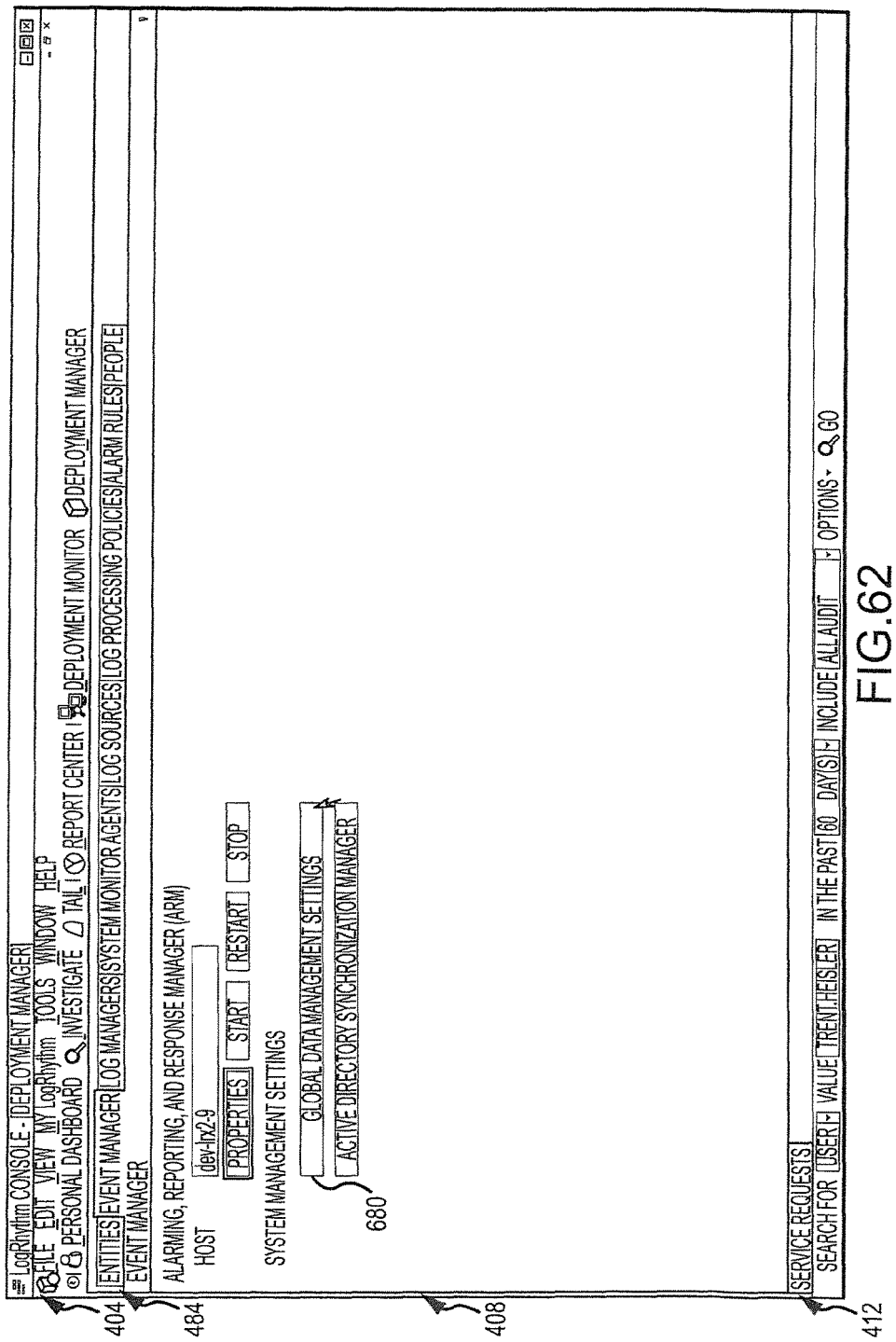
FIG. 62 is similar to FIG. 47, but with an "active directory synchronization manager" button having been selected.
Figure 63:
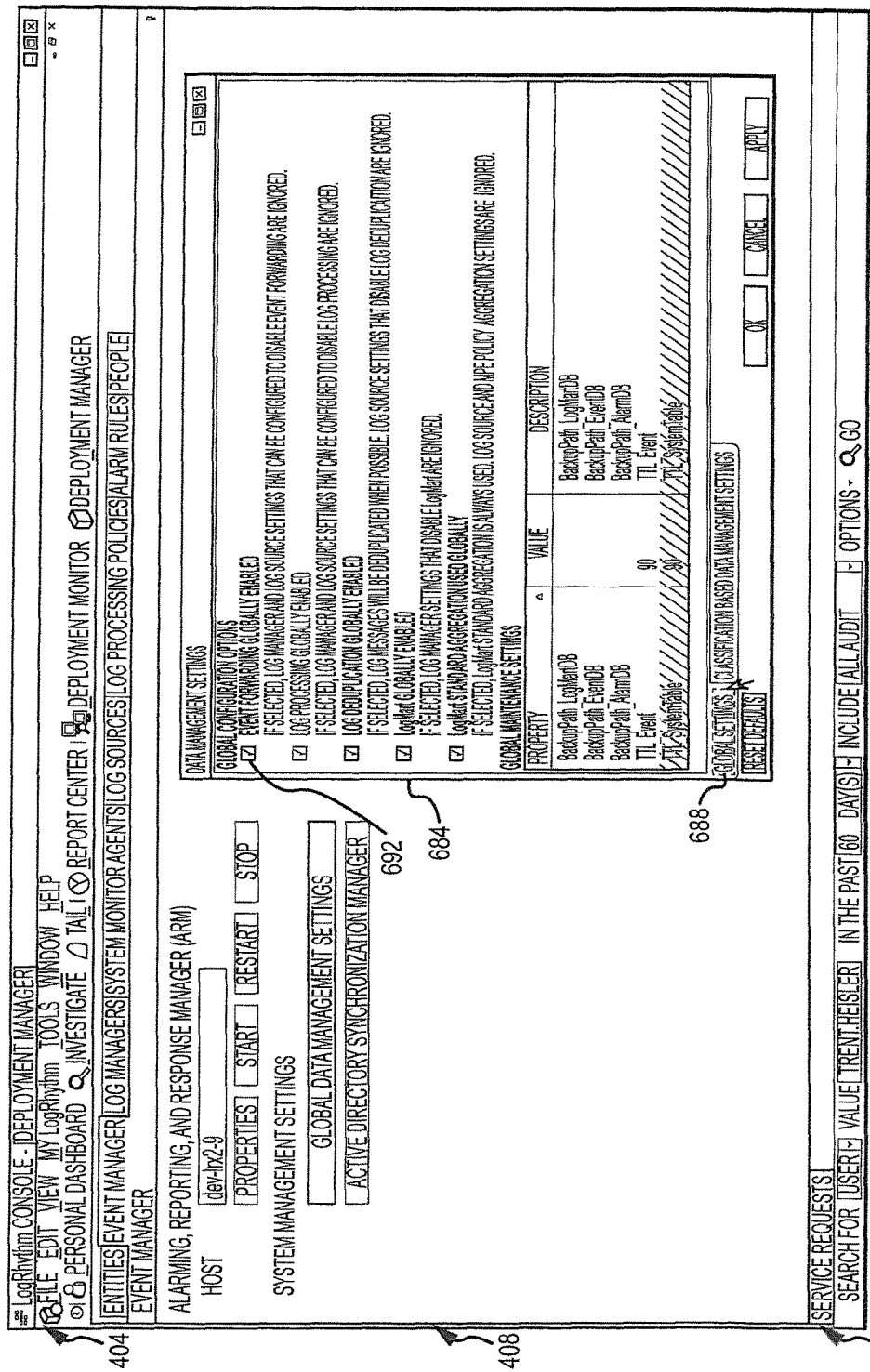
FIG. 63 illustrates a pop-up window resulting from manipulation of the active directory synchronization manager button of FIG. 62, where the pop-up window allows a user to globally enable various actions in relation to logs and/or events without regard to classification of the logs and/or events.

Turning now to FIG. 62, and upon manipulating an "event manager" tab in the number of tabs 484 in the control panel 404, a user may manipulate a "global data management settings" button 680 to cause the display of a "data management settings" pop-up window 684 in the presentation area 408. The data management settings pop-up window 684 may allow configuration of both "global" settings and "classification based data management (CBDM)" settings via manipulation of an appropriate tab 688. As seen in FIG. 63, the global settings tab 688 has been selected which allows for global configuration of logs (e.g., logs will be processed by the one or more log managers or processing platforms regardless of the classification of logs). As seen, a number of checkboxes 692 (or other user manipulable features) may be included in the pop-up window 684 for allowing a user to selectively globally enable a number of settings. For instance, one or more settings such as event forwarding, log processing, log deduplication, ignoring of any settings that disable LogMart, and LogMart standard aggregation may be globally enabled. That is, log manager and/or log source settings that can be configured to disable such settings will be ignored.

Figure 64:
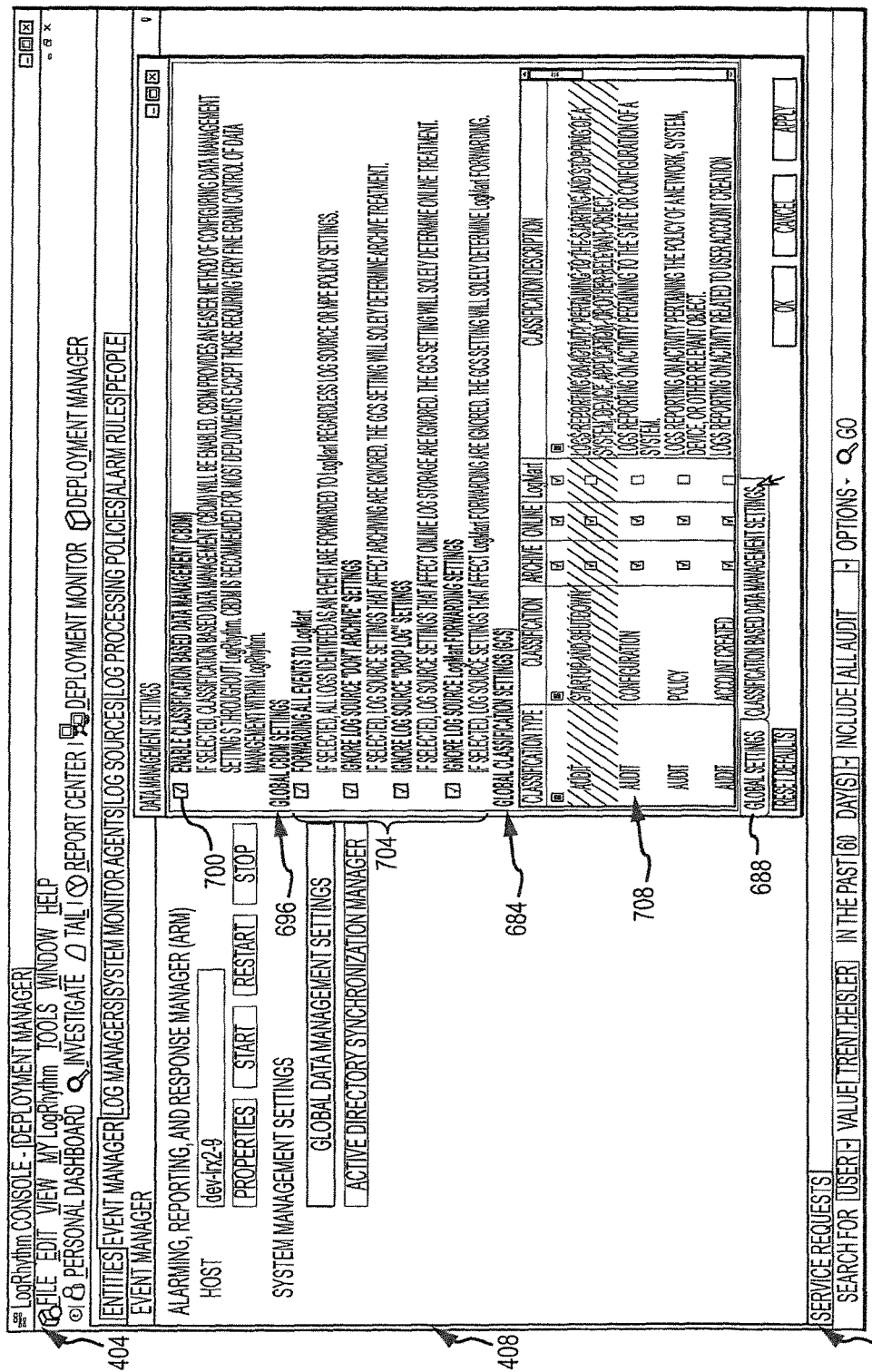
FIG. 64 illustrates the pop-up window FIG. 63, where the pop-up window allows a user to globally enable various actions relation to logs and/or events with regard to classification of logs and/or events.

With reference to FIG. 64, the classification based data management settings tab 688 has now been selected. Broadly, classification based data management allows administrators and other users to make data management decisions based on the high-level classification of incoming logs (e.g., such as whether to archive, index, forward, etc. the logs). In this regard, classification based data management allows for efficient configuration of data management settings based on classification while global log processing rules allow for such data management setting configuration based on a more fine-grained approach (i.e., allows for data management determinations on a log by log basis instead of merely on log classification). In any case, and for instance, one portion 696 of the pop-up window 684 may broadly allow a user to selectively enable classification based data management in relation to one or more specific actions (such as by checking/manipulating checkbox 700 or other user manipulable feature). Another portion 708 of the pop-up window 684 may allow the configuration of various data management actions (e.g., whether or not to perform various actions such as, but not limited to, archiving, onlining, and sending to LogMart) for various classifications of logs. In one arrangement, one or more other checkboxes 704 may be selectively checked to ignore any log source settings in relation to, for instance, archiving, onlining, and sending to LogMart. For instance, in the situation where a particular data management setting or action for a log associated with a particular log source conflicted with a data management setting or action for a log associated with a particular log classification, the data management setting or action associated with the log classification would prevail over that for the log sources when one of the checkboxes 704 is checked/manipulated (e.g., a particular log source setting stipulating no archiving of logs associated with the particular source that otherwise would apply to a particular incoming log would give way to a decision to archive the log based on a particular classification of the log). While only "audit" type logs have been shown in portion 708, it should be appreciated that by scrolling down, other types of classification (e.g., security, operations) may also be configured with respect to archiving, onlining and sending to LogMart. Furthermore, and as discussed previously, the global data management settings (e.g. CBDM) may be overridden by one or more global log processing rules.

In any case, the global data management settings may provide for consistent, "out of the box" configuration for new deployments. That is, by globally configuring settings (either with or without regard to log classification), a user or administrator need not be concerned whether some logs will be treated one-way and other logs will be treated another way. Additionally, such global data management facilitates understanding of how data is managed and where it is stored. Also, pre-sale requirements can be more easily mapped to post sale data management implementation. In other words, upon learning the requirements of an end user, an administrator or other technician can more easily implement such requirements by way of the global data management settings.

It will be readily appreciated that many deviations may be made from the specific embodiments disclosed in the specification without departing from the spirit and scope of the invention. In one arrangement, a user may be able to customize the appearance of the user interface 400 to more closely match the various tools disclosed herein to the particular analytical needs of the user. More specifically, a user may be able to select one or more particular combinations of tools that are more readily available to the user (e.g., upon initial start-up or access of the user interface 400). For example, one or more "layouts" may be stored and available to the user that persist the organization of charts, grids, and the like across various screenshots of the user interface 400. Such layouts may be manually created by a user and/or automatically available to the user (i.e., there may be one or more default layouts). For instance, various layouts are envisioned such as a PCI layout, a threat detection layout, a network operations layout, and the like.

In another arrangement, the user interface 400 may include or at least be associated with any appropriate browser that displays the various tools disclosed herein. More specifically, the browser may include one or more user manipulable features (e.g., buttons, drop-down menus, etc.) corresponding to each of the various tools that allow a user to manipulate one or more features of the tools (e.g., turn each tool on or off, modify include or exclude filters, etc.).

Furthermore, while this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

It should be appreciated throughout this disclosure that the various manners of access (e.g., right clicking on a line to bring up a particular drop down menu, and then selecting a particular tab or button, etc.) to the various tools and functionalities (e.g., log distribution services, global log processing rules) disclosed herein should not be seen as limiting such tools and functionalities to the particular manners of access discussed or even limiting such tools and functionalities to use with any manners of access at all. Rather, these manners of access have only been shown as examples to assist the reader in understanding how one may access such tools on a use interface. Other manners of access to the various tools and functionalities are also envisioned and encompassed within the scope of the present disclosure.

Certain elements have been described herein as having specific functions and being associated with particular reference numbers. For example, the log managers described herein have been referenced at different points in the text as the log manager 13, the log manager 31, the log managers 51-53, log manager 203, etc. These descriptions with varying reference numbers are merely intended to assist the reader in understanding various aspects of certain elements. It is not intended to limit any aspect of the invention to a particular embodiment. Rather, any element described herein may possess one or more features of another similarly named element. For example, the log manager 13 described in FIG. 1 may possess any of the capabilities of the log managers described herein (e.g., the log managers 31, 51-53, and 203).

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for use on a plurality of log manager devices of a data system, wherein each of the plurality of log manager devices is configured to monitor a plurality of devices of one or more platforms to identify events for handling by an event manager, the method comprising the steps of:

creating, at a first log manager device of the plurality of log manager devices, a first log processing rule having a filtering setting that identifies logs having a first of a plurality of classifications regarding a type of each log and a second log processing rule having a filtering setting that identifies logs received from a first source on the data system, wherein the first log processing rule includes a first data management setting that specifies to take or not take at least one action in relation to logs having the first classification, and wherein the second log processing rule includes a second data management setting that specifies the other of taking or not taking the at least one action in relation to logs having the first source;

establishing, at the first log manager device, a default setting stipulating that the second data management setting is to be applied instead of the first data management setting as to logs that match the filtering settings of both the first and second log processing rules;

receiving, at the first log manager device, an override setting indicating on that the default setting is to be ignored and the first data management setting is to be applied instead of the second data management setting as to logs that match the filtering settings of both the first and second log processing rules;

transmitting the override setting to each of the plurality of log manager devices based on a designation that the override setting is global;

receiving, at the first log manager device, logs generated at and transmitted from the plurality of devices of the one or more platforms;

identifying, at the first log manager device, at least a first of the received logs that matches the filtering settings of both the first and second log processing rules;

determining, at the first log manager device, that the first data management setting conflicts with the second data management setting; and operating, based on the determining that first data management setting conflicts with the second data management setting, the first log manager device to implement the first data management setting on the first received log and ignore the second data management setting according to the override setting.

2. The method of claim 1, wherein the first data management setting specifies to take the at least one action, and wherein the second data management setting specifies to not take the at least one action.

3. The method of claim 1, wherein the first data management setting specifies to not take the at least one action, and wherein the second data management setting specifies to take the at least one action.

4. The method of claim 1, wherein the override setting is received on an action by action basis.

5. The method of claim 4, wherein the at least one action includes a plurality of actions, and wherein the receiving the override setting is in relation to a first of the plurality of actions and not in relation to a second of the plurality of actions.

6. The method of claim 1, wherein the at least one action comprises at least one of archiving of the received logs, the storage of the received logs in a database associated with said first loci manager device, and the forwarding of the received logs to a tool that can aggregate numerous received logs in a single view on a user interface.

7. The method of claim 1, wherein said first classification comprises at least one of security, audit and operations.

8. The method of claim 1, wherein each of the received logs includes first and second metadata fields including respective content that identifies a classification and a source of each received log, and wherein the identifying includes parsing the content of the metadata fields and determining that the content matches the first classification and the first source.

9. A system for use in monitoring a plurality of devices of one or more platforms of a data system to identify events for handling by an event manager, the system comprising:
a processor;
a plurality of log manager devices; and
a non-transitory computer readable medium interconnected to the processor and including one or more non-transitory computer program products that are configured to:
create, at a first log manager device of the plurality of log manager devices, a first log processing rule having a filtering setting that identifies logs having a first of a plurality of classifications regarding a type of each of log and a second log processing rule having a filtering setting that identifies logs received from a first source on the data system, wherein the first log processing rule includes a first data management setting that specifies to take or not take at least one action in relation to logs having the first classification, and wherein the second log processing rule includes a second data management setting that specifies the other of taking or not taking the at least one action in relation to logs having the first source;
establish a default setting stipulating that the second data management setting is to be applied instead of the first data management setting as to logs that that match the filtering settings of both the first and second log processing rules;
receive, at the first log manager device, an override setting indicating that the default setting is to be ignored and the first data management setting is to be applied instead of the second data management setting as to logs that that match the filtering settings of both the first and second log processing rules;
transmit, as instructed by the processor, the override setting to each of the plurality of log manager devices based on a designation that the override setting is global;
receive, at the first log manager device, logs generated at and transmitted from the plurality of devices of said one or more platforms;
identify, at the first log manager device, at least a first of the received logs that matches the filtering settings of both the first and second log processing rules;
determine, at the first log manager device, that the first data management setting conflicts with the second data management setting; and
implement, by the first log manager device, the first data management setting on the first received log and ignore the second data management setting according to the override setting.

10. The system of claim 9, wherein the first data management setting specifies to take the at least one action, and wherein the second data management setting specifies to not take the at least one action.

11. The system of claim 9, wherein the first data management setting specifies to not take the at least one action, and wherein the second data management setting specifies to take the at least one action.

12. The system of claim 9, wherein the override setting is received on an action by action basis.

13. The system of claim 12, wherein the at least one action includes a plurality of actions, and wherein the receiving the override setting is in relation to a first of the plurality of actions and not in relation to a second of the plurality of actions.

14. The system of claim 9, wherein the at least one action comprises at least one of archiving of the received logs, the storage of the received logs in a database associated with said first loci manager device, and the forwarding of the received logs to a tool that can aggregate numerous received logs in a single view on a user interface.

15. The system of claim 9, wherein said first classification comprises at least one of security, audit and operations.

16. The system of claim 9, wherein each of the received logs includes first and second metadata fields including respective content that identifies a classification and a source of each received log, and wherein the identifying includes parsing the content of the metadata fields and determining that the content matches the first classification and the first source.

17. The method of claim 1, further including:
creating, at a second log manager device, the first log processing rule and a third log processing rule having a filtering setting that identifies logs received from a second source on the data system and a third data management setting that specifies to take or not take the at least one action in relation to logs having the second source;
establishing, at the second log manager device, a second default setting stipulating that the third data management setting is to be applied instead of the first data management setting as to logs that that match the filtering settings of both the first and third log processing rules;
receiving, at the second log manager device, a second override setting indicating that the second default setting is to be ignored and the first data management setting is to be applied and the third data management setting is to be ignored as to logs that match the filtering settings of both the first and third log processing rules;

receiving, at the second loci manager device, logs generated at and transmitted from the plurality of devices of the one or more platforms;

identifying, at the second log manager device, at least a second of the received logs that matches the filtering settings of both the first and third log processing rules; and operating the second log manager device to implement the first data management setting on the second received log according to the second override setting.

* * * * *

UNITED STATES PATENT AND TRADEMARK OFFICE
CERTIFICATE OF CORRECTION

PATENT NO. : 10,122,575 B2  
APPLICATION NO. : 15/179342  
DATED : November 6, 2018  
INVENTOR(S) : Petersen et al.

Page 1 of 1

It is certified that error appears in the above-identified patent and that said Letters Patent is hereby corrected as shown below:

In the Claims

Column 46, Line 51, Claim 1 delete "indicating on that" and insert therefore --indicating that--

Column 47, Line 25, Claim 6 delete "loci" and insert therefore --log--

Column 48, Line 39, Claim 14 delete "loci" and insert therefore --log--

Column 49, Line 4, Claim 17 delete "loci" and insert therefore --log--

Signed and Sealed this  
Nineteenth Day of February, 2019

Andrei Iancu  
*Director of the United States Patent and Trademark Office*